(12) United States Patent
Mashitani et al.

(10) Patent No.: US 7,277,121 B2
(45) Date of Patent: Oct. 2, 2007

(54) STEREOSCOPIC IMAGE PROCESSING AND DISPLAY SYSTEM

(75) Inventors: Ken Mashitani, Neyagawa (JP); Goro Hamagishi, Toyonaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 764 days.

(21) Appl. No.: 10/227,945

(22) Filed: Aug. 27, 2002

(65) Prior Publication Data

US 2003/0048354 A1     Mar. 13, 2003

(30) Foreign Application Priority Data

| Aug. 29, 2001 | (JP) | ............................. 2001-260142 |
| Sep. 21, 2001 | (JP) | ............................. 2001-289400 |
| Sep. 26, 2001 | (JP) | ............................. 2001-294981 |
| Sep. 28, 2001 | (JP) | ............................. 2001-303448 |

(51) Int. Cl.
    *H04N 15/00*     (2006.01)

(52) U.S. Cl. ..................................................... 348/51

(58) Field of Classification Search ................ 348/49, 348/51, 52, 47, 42; 345/415, 419; 351/201; 359/464, 462; *G06T 15/10; H04N 15/00*
See application file for complete search history.

(56) References Cited

U.S. PATENT DOCUMENTS

| 5,615,046 | A | * | 3/1997 | Gilchrist ..................... 359/464 |
| 5,642,171 | A | * | 6/1997 | Baumgartner et al. ...... 348/515 |
| 5,801,760 | A | * | 9/1998 | Uomori ........................ 348/47 |
| 5,825,456 | A | * | 10/1998 | Tabata et al. ................ 351/201 |
| 5,883,739 | A | * | 3/1999 | Ashihara et al. ............ 359/462 |
| 6,023,277 | A | * | 2/2000 | Osaka et al. ................. 345/419 |
| 6,225,979 | B1 | * | 5/2001 | Taima et al. ................. 345/157 |
| 6,765,568 | B2 | * | 7/2004 | Swift et al. .................. 345/419 |
| 6,967,651 | B2 | * | 11/2005 | Endoh et al. ................ 345/428 |

FOREIGN PATENT DOCUMENTS

| EP | 0 896 301 | * | 6/1997 |
| JP | 05-030538 A | | 2/1993 |
| JP | 05-122733 A | | 5/1993 |
| JP | 08-317425 A | | 11/1996 |
| JP | 09-102968 A | | 4/1997 |
| JP | 9-197343 | | 7/1997 |
| JP | 9-203980 | | 8/1997 |

(Continued)

OTHER PUBLICATIONS

Japanese Office Action dated Dec. 13, 2005.

(Continued)

*Primary Examiner*—Tung Vo
(74) *Attorney, Agent, or Firm*—Westerman, Hattori, Daniels & Adrian, LLP.

(57) ABSTRACT

An image processing apparatus includes an image obtaining unit and an information adding unit. The image obtaining unit obtains a base image for stereovision in a multiplex format or a side-by-side format, or obtains an original image and then converts it to such a base image. The information adding unit records information to be referred to for stereovision, such as the format of the base image and the number of assumed viewpoints, in a header of the image data.

4 Claims, 51 Drawing Sheets

FOREIGN PATENT DOCUMENTS

| | | |
|---|---|---|
| JP | 10-191400 A | 7/1998 |
| JP | 10-224825 | 8/1998 |
| JP | 10-232666 | 9/1998 |
| JP | 10-336706 | 12/1998 |
| JP | 11-018111 A | 1/1999 |
| JP | 2000-197074 A | 7/2000 |
| JP | 2001-197521 A | 7/2001 |
| JP | 2001-251403 | 9/2001 |
| JP | 2001-258051 | 9/2001 |
| WO | WO 00/10332 A1 | 2/2000 |

OTHER PUBLICATIONS

Japanese Office Action date Oct. 11, 2005.
Jp 2002-248476 Decision of Refusal dated Feb. 7, 2006.

\* cited by examiner

Fig.2

| (1,4) | (1,3) | (1,2) | (1,1) | (1,4) | (1,3) | (1,2) | (1,1) | (1,4) | (1,3) | (1,2) | (1,1) | (1,4) | (1,3) | (1,2) | (1,1) |
|---|---|---|---|---|---|---|---|---|---|---|---|---|---|---|---|
| (2,4) | (2,3) | (2,2) | (2,1) | (2,4) | (2,3) | (2,2) | (2,1) | (2,4) | (2,3) | (2,2) | (2,1) | (2,4) | (2,3) | (2,2) | (2,1) |
| (3,4) | (3,3) | (3,2) | (3,1) | (3,4) | (3,3) | (3,2) | (3,1) | (3,4) | (3,3) | (3,2) | (3,1) | (3,4) | (3,3) | (3,2) | (3,1) |
| (4,4) | (4,3) | (4,2) | (4,1) | (4,4) | (4,3) | (4,2) | (4,1) | (4,4) | (4,3) | (4,2) | (4,1) | (4,4) | (4,3) | (4,2) | (4,1) |
| (1,4) | (1,3) | (1,2) | (1,1) | (1,4) | (1,3) | (1,2) | (1,1) | (1,4) | (1,3) | (1,2) | (1,1) | (1,4) | (1,3) | (1,2) | (1,1) |
| (2,4) | (2,3) | (2,2) | (2,1) | (2,4) | (2,3) | (2,2) | (2,1) | (2,4) | (2,3) | (2,2) | (2,1) | (2,4) | (2,3) | (2,2) | (2,1) |
| (3,4) | (3,3) | (3,2) | (3,1) | (3,4) | (3,3) | (3,2) | (3,1) | (3,4) | (3,3) | (3,2) | (3,1) | (3,4) | (3,3) | (3,2) | (3,1) |
| (4,4) | (4,3) | (4,2) | (4,1) | (4,4) | (4,3) | (4,2) | (4,1) | (4,4) | (4,3) | (4,2) | (4,1) | (4,4) | (4,3) | (4,2) | (4,1) |
| (1,4) | (1,3) | (1,2) | (1,1) | (1,4) | (1,3) | (1,2) | (1,1) | (1,4) | (1,3) | (1,2) | (1,1) | (1,4) | (1,3) | (1,2) | (1,1) |
| (2,4) | (2,3) | (2,2) | (2,1) | (2,4) | (2,3) | (2,2) | (2,1) | (2,4) | (2,3) | (2,2) | (2,1) | (2,4) | (2,3) | (2,2) | (2,1) |
| (3,4) | (3,3) | (3,2) | (3,1) | (3,4) | (3,3) | (3,2) | (3,1) | (3,4) | (3,3) | (3,2) | (3,1) | (3,4) | (3,3) | (3,2) | (3,1) |
| (4,4) | (4,3) | (4,2) | (4,1) | (4,4) | (4,3) | (4,2) | (4,1) | (4,4) | (4,3) | (4,2) | (4,1) | (4,4) | (4,3) | (4,2) | (4,1) |
| (1,4) | (1,3) | (1,2) | (1,1) | (1,4) | (1,3) | (1,2) | (1,1) | (1,4) | (1,3) | (1,2) | (1,1) | (1,4) | (1,3) | (1,2) | (1,1) |
| (2,4) | (2,3) | (2,2) | (2,1) | (2,4) | (2,3) | (2,2) | (2,1) | (2,4) | (2,3) | (2,2) | (2,1) | (2,4) | (2,3) | (2,2) | (2,1) |
| (3,4) | (3,3) | (3,2) | (3,1) | (3,4) | (3,3) | (3,2) | (3,1) | (3,4) | (3,3) | (3,2) | (3,1) | (3,4) | (3,3) | (3,2) | (3,1) |
| (4,4) | (4,3) | (4,2) | (4,1) | (4,4) | (4,3) | (4,2) | (4,1) | (4,4) | (4,3) | (4,2) | (4,1) | (4,4) | (4,3) | (4,2) | (4,1) |

| (1, 4) | (2, 4) | (3, 4) | (4, 4) |
|--------|--------|--------|--------|
| (1, 3) | (2, 3) | (3, 3) | (4, 3) |
| (1, 2) | (2, 2) | (3, 2) | (4, 2) |
| (1, 1) | (2, 1) | (3, 1) | (4, 1) |

30

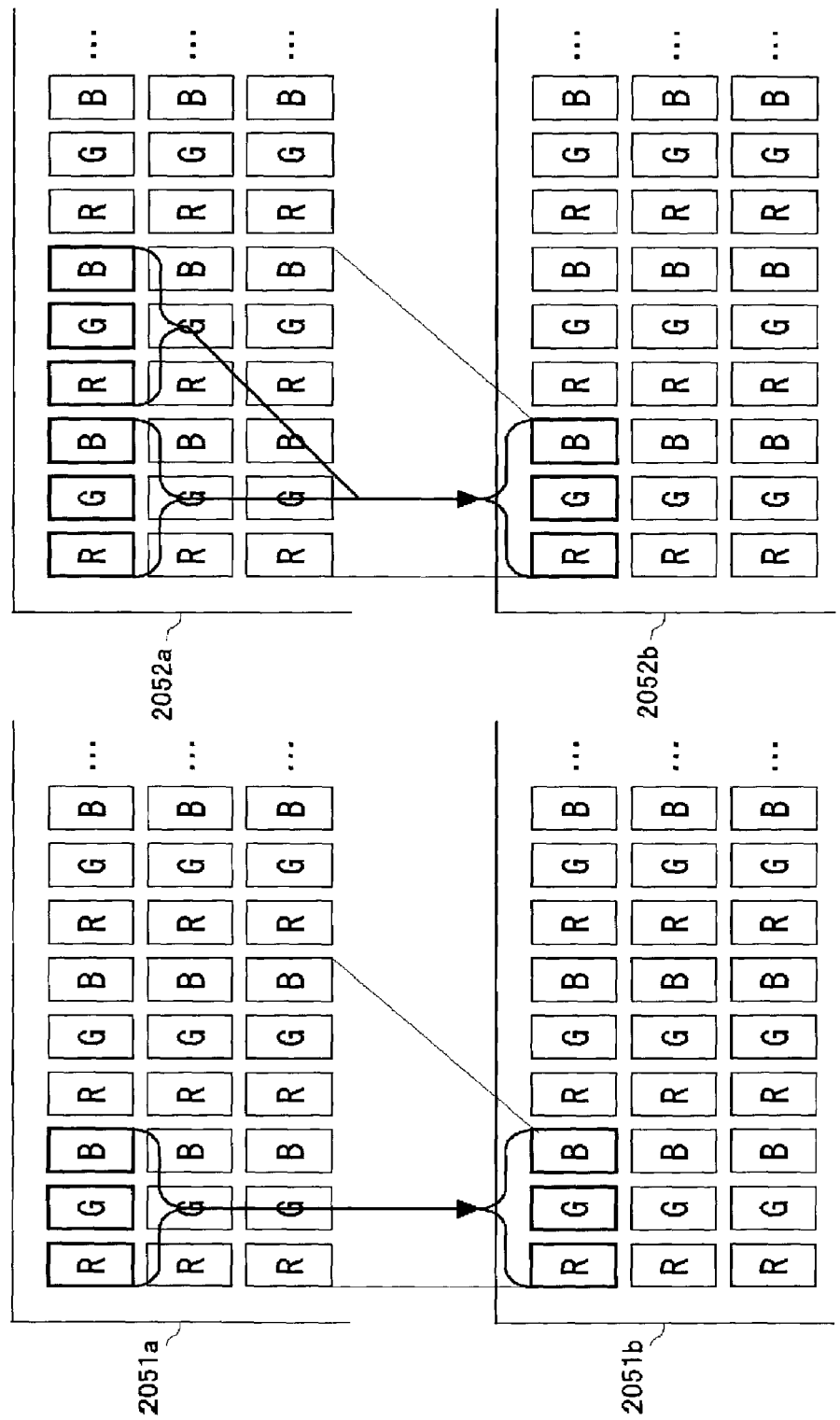

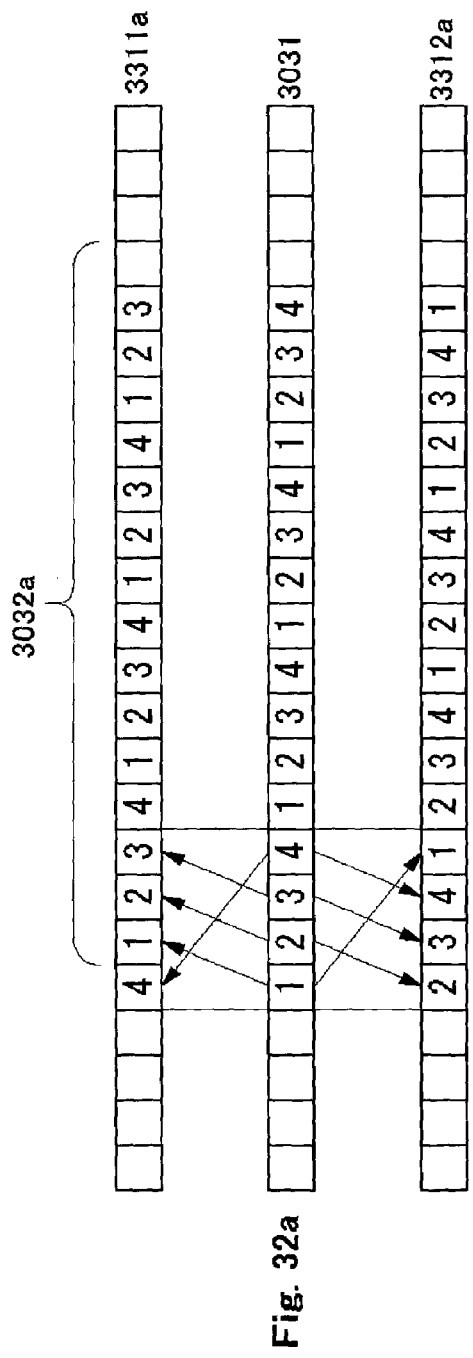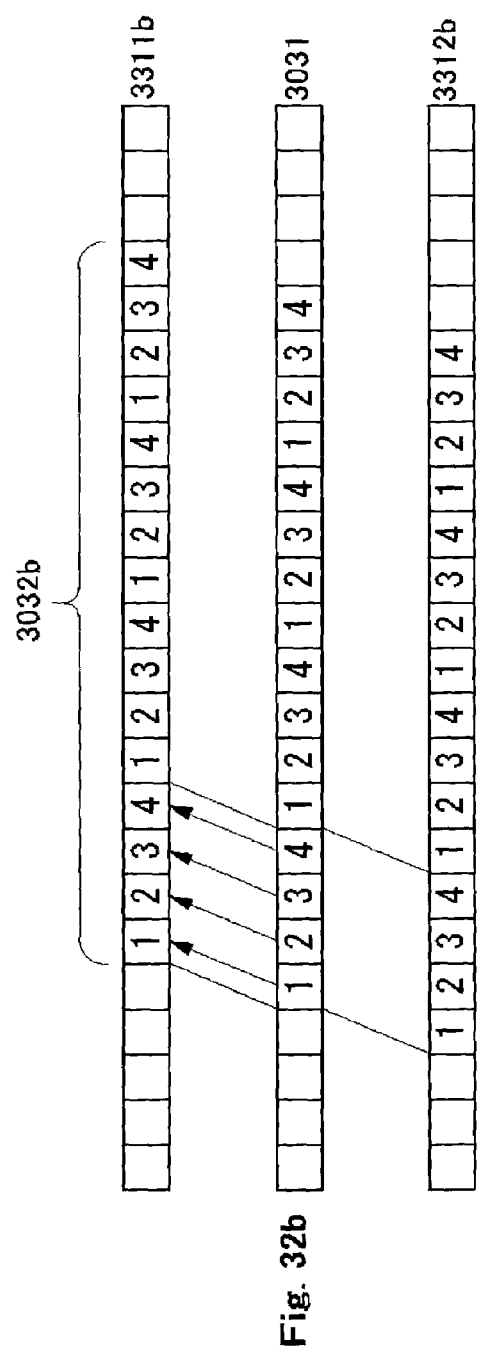

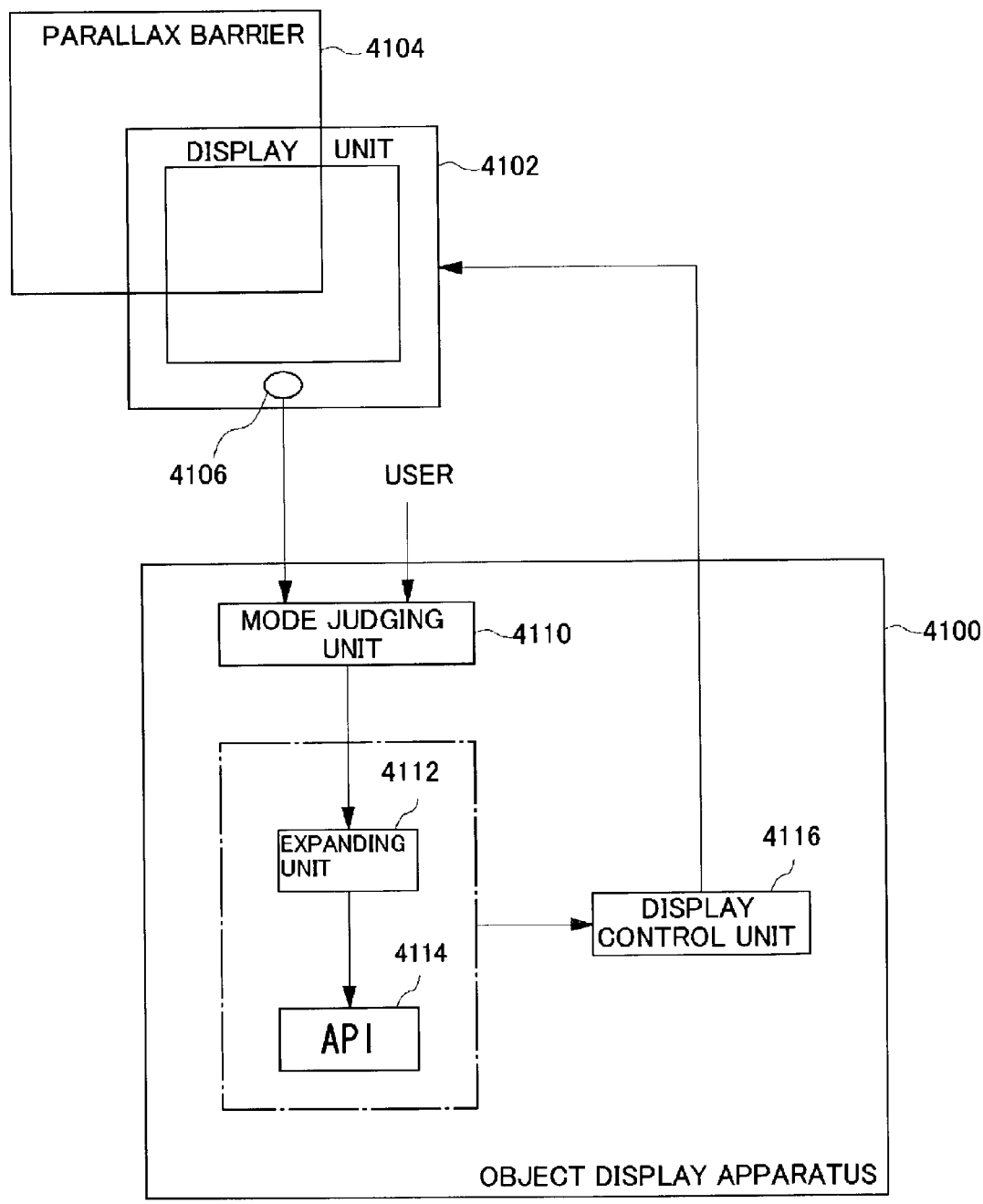

STEREOSCOPIC IMAGE PROCESSING AND DISPLAY SYSTEM

BACKGROUND OF THE INVENTION

1. Field of the Invention

The present invention relates to a stereoscopic image processing technology, and it particularly relates to method, apparatus, system, and related computer program and data structure for processing or displaying a stereoscopic image, and compressing a stereoscopic image by reducing the amount of information therein. The present invention also relates to an object display technology, and it particularly relates to method, apparatus, and related computer program for displaying an object such as an icon.

2. Description of the Related Art

The number of Internet users has rapidly increased in recent years and we are now entering the age of the broadband, or a new stage of the utilization of the Internet. Since communication bandwidth has greatly expanded in broadband communication, the distribution of heavy image data, which has largely been neglected until now, is bound to become more popular. Although such concepts as "multimedia" and "video on demand" have been around for a long time, the situation has now arisen that for the first time general users can actually experience them.

When the distribution of images, especially moving pictures, is widely accepted, users will demand enrichment of the contents and improvement of image quality. Satisfying these demands will depend greatly on digitalization of the existing movie software, the development of authoring tools for such digitalization, the pursuit of more efficient and less lossy image coding technology and so on.

In this situation, the distribution of a pseudo three-dimensional image (hereinafter simply referred to as a "stereoscopic image") has drawn technical attention as one of the styles of image distribution services likely to become available in the near future and it is expected that it will gain a considerable share of the market. Such a stereoscopic image meets the user's desire for more realistic images and is attractive for an application such as a movie or a game that aims at producing a feeling of presence. Furthermore, the stereoscopic image is useful for realistic display of commodities in commodity presentation in EC (electronic commerce) which will be standard in commerce in the twenty-first century.

However, it could be said that no infrastructure or models exist to promote a new network business on the basis of the distribution of stereoscopic images.

As a method for displaying stereoscopic images, a parallax barrier method is already in existence. In this method, right-eye and left-eye images are alternately arranged in a stripe pattern, and thereby a stereoscopic image is synthesized and displayed on a color liquid crystal panel or the like. Stereovision is possible when this stereoscopic image is viewed through a parallax barrier. Since stereovision is possible to achieve by such an easy method, a wide range of possible applications has been considered.

When a stereoscopic image is composed from right and left parallax images by a parallax barrier method, if the parallax images have the same resolution as the stereoscopic image, the original image used to compose the stereoscopic image has twice the amount of data of the stereoscopic image. In particular, when a multi-viewpoint stereoscopic image is composed from the parallax images viewed from over three viewpoints, the amount of the data increases in proportion to the number of the viewpoints. Therefore it is necessary somehow to reduce the amount of the original image data with a view to capacity of storage area and data transmission.

There is also such a situation that a user-friendly display technique has not been yet proposed for popularizing stereoscopic images.

SUMMARY OF THE INVENTION

The present inventor, in view of the foregoing situations, has made the present invention and an object thereof is to provide a stereoscopic image processing technique which provides the technical means for the promotion of the distribution of stereoscopic images.

Another object of the present invention is to provide a stereoscopic image compression technique which reduces the amount of data of a parallax image, which is a base for displaying a stereoscopic image, and which efficiently composes a stereoscopic image.

Yet another object of the present invention is to provide a stereoscopic image processing technique which supports a user in a operation of displaying a stereoscopic image properly.

Yet another object of the present invention is to provide an object display technique which solves a problem that could occur when a stereoscopic image is displayed.

The following conceptual definitions are provided to facilitate understanding of the present invention.

A stereoscopic image: this does not refer to image data themselves but an ideal image projected to the eyes of a user as a result of being stereoscopically displayed. On the other hand, the image that can be displayed as a stereoscopic image is called a "multiplex image" and is described below. In other words, when a multiplex image is displayed, a stereoscopic image can be viewed.

A parallax image: normally it is necessary for an image to be projected to the right eye (hereinafter simply referred to as a right-eye image) and an image to be projected to the left eye (hereinafter simply referred to as a left-eye image) in order to achieve stereovision with a sense of depth, so that a parallax can be produced. A pair of images such as right-eye and left-eye images is often generically called a parallax image, however, in this specification, each of such images that cause the parallax is called a parallax image. That is to say, here, both the right-eye and left-eye images are parallax images. Generally, each of the images from different viewpoints assumed on the stereoscopic image is a parallax image.

A base image: this refers to an image to which a process necessary for stereovision is applied or an image to which such a process has already been applied. As a concrete example, this might include a parallax image in a separate format (which is described later), and an image which is formed, as in a multiplex format or a side-by-side format, in such a manner that a plurality of parallax images is synthesized in any form. (Such an image is also referred to as a composed image.)

A side-by-side format: this is one of the styles of configuration of a base image. It is a format in which a plurality of parallax images are arranged alongside each other, either in a horizontal direction or a vertical direction, or in both directions and thus synthesized. Normally, parallax images which have been thinned out are arranged alongside each other. For instance, when two parallax images are arranged alongside each other in a horizontal direction, each of the parallax images is thinned out dot by dot in the horizontal direction. The base image in a side-by-side format is also simply called a "side-by-side image".

A multiplex format: this is another one of the styles of configuration of a base image. It is a format of image data by which a stereoscopic image is finally displayed. The base image in a multiplex format is also simply called a "multiplex image".

A separate format: this is also one of the styles of configuration of the base image. It is a format of image data that is an independent two-dimensional image, but one for which stereovision is achieved in combination with other two-dimensional images. It refers to each of such a plurality of two-dimensional images. A base image in a separate format is also simply called a "separate image". Unlike the multiplex image and the side-by-side image, the separate image is not a synthesized image.

A viewpoint: a stereoscopic image employs different viewpoints from which the image is viewed. The number of viewpoints and the number of parallax images are normally equal. If there are two parallax images, a left-eye image and a right-eye image, the number of viewpoints is "2". It is to be noted that there is just one assumed head position of a user even when two viewpoints exist. Likewise, in order that a stereoscopic image can be displayed along with the movement of the user in a right-and-left direction, if four viewpoints va, vb, vc and vd, for instance, are assumed and the parallax images Ia, Ib, Ic and Id viewed from each of the viewpoints are provided, a stereoscopic image with a feeling of depth can be displayed by using the three pairs of parallax images (Ia, Ib), (Ib, Ic) and (Ic, Id) for instance. In such a situation, in order to enhance a stereoscopic image by giving a sense of depth in an up-and-down direction, if the four images viewed from relatively upper locations and the four images viewed from lower locations are utilized, the number of viewpoints becomes "8".

An optical filter: it generally indicates any means which functions optically so that only desired dots are projected into the eyes of a user according to the viewpoint of the user. The optical filter may be arranged in front of a screen or behind a screen of a display apparatus. The optical filter may be stuck on the screen. Any kinds of optical filter, for instance a lenticular lens or a parallax barrier, are applicable.

An object: It generally means a unit such as an icon displayed on a screen, however, in this specification it includes anything which forms a substance when it is displayed, such as text data or image data, and also includes a background of a screen such as an initial screen of a computer or the like.

In terms of these definitions, according to one aspect of the present invention, a stereoscopic image processing method is provided. The method can be understood as an encoding technique that may be regarded as a starting point for the distribution of stereoscopic images. This method comprises adding information to be referred to (hereinafter also called "stereoscopic information") at a prescribed scene during a sequence of processes to display a stereoscopic image to a base image to display the stereoscopic image.

"Adding" may mean incorporating into the base image, incorporating into a header or other regions of the base image, or incorporating into another file associated with the base image, and in short it may mean that any correspondence relationship with the base image might be provided. "A prescribed scene during a sequence of processes to display a stereoscopic image" might be for instance a scene in which a side-by-side image is converted into a multiplex image.

According to this method, a stereoscopic image can be displayed appropriately by referring to the stereoscopic information. When a large number of base images are prepared by this method, various information terminals can retrieve the image data and display the image stereoscopically, and therefore this method can function as a base technology. This method can be utilized in a stereoscopic image server, for instance.

According to another aspect of the present invention, a data structure for image data generated by the above-mentioned method is provided. This data structure comprises a combination of the main data of a base image to display a stereoscopic image, and sub-data which retain information to be referred to at a prescribed scene during a sequence of processes to display the stereoscopic image, namely stereoscopic information. The main data comprise the base image compressed by a prescribed method. The "combination" not only means that the main data and the sub-data are formed into one body, but also means that some association between these data is provided. By means of this data structure, a stereoscopic display can be successfully displayed, as described above.

According to still another aspect of the present invention, a stereoscopic image processing method is also provided. This method can be understood as a decoding technique which interprets the above-mentioned data structure and utilizes the data, for generally displaying a stereoscopic image. This method comprises searching information to be referred to at a prescribed scene during a sequence of processes to display a stereoscopic image, namely stereoscopic information, which is added to a base image to display the stereoscopic image. In order to facilitate the searching, the stereoscopic information may be included in a previously agreed prescribed coding format. The method may further comprise converting a configuration style of the base image into another style.

According to still another aspect of the present invention, a stereoscopic image processing method is also provided. This method is for dealing with a stereoscopic image on an apparatus with a memory, and comprises storing in the memory a base image, whose configuration style is different from that of the base image to be finally displayed on a screen, and retrieving the stored image appropriately and utilizing the image. For instance, even if a multiplex image is utilized for displaying a stereoscopic image, a side-by-side format can be more convenient than a multiplex format for conducting an enlargement or other processes on the stereoscopic image. In this case, if a side-by-side image is stored in the memory, the processes can be accelerated.

According to still another aspect of the present invention, a stereoscopic image processing method is also provided. The method comprises searching information to be referred to at a prescribed scene during a sequence of processes to display a stereoscopic image, namely stereoscopic information, which is added to a base image to display the stereoscopic image, and adjusting the brightness of a screen employed to display the stereoscopic image using such information. For instance, the stereoscopic information may include information on the number of viewpoints assumed for the stereoscopic image and the brightness may be adjusted according to this number.

If the number of viewpoints is "4", four parallax images are synthesized and a multiplex image is formed. The number of dots visible from any one of four viewpoints remains one-fourth of the number visible when a normal two-dimensional image is viewed. Therefore, the brightness of the screen is theoretically one-fourth of the normal brightness. For this reason, the process employed to increase the brightness of the screen of a display apparatus according to the number of the viewpoints will prove effective. This process is, for instance, conducted by linking software to determine the number of viewpoints with a circuit to adjust the brightness.

According to another aspect of the present invention, a stereoscopic image processing apparatus is provided. The apparatus is for use in preparing a stereoscopic image by encoding, and comprises an image obtaining unit which obtains a base image to display as a stereoscopic image, and an information adding unit which adds information to be referred to at a prescribed scene during a sequence of processes to display the stereoscopic image, namely stereoscopic information, to the obtained base image. The image obtaining unit may generate the base image on its own, or may input an existing base image.

According to still another aspect of the present invention, a stereoscopic image processing apparatus is also provided. The apparatus is for actually displaying a stereoscopic image or conducting a preprocess for displaying, and comprises an image obtaining unit which obtains a base image to display a stereoscopic image, and an information searching unit which searches information to be referred to at a prescribed scene during a sequence of processes to display the stereoscopic image, namely stereoscopic information, which is added to the obtained base image. The image obtaining unit may obtain or input the base image via a network or from a record medium. The image obtaining unit may include an image input unit which inputs the image data compressed beforehand and an image enlargement unit which generates the base image by enlarging this image data, and may include a brightness adjusting unit which adjusts the brightness of the screen employed to display the stereoscopic image using the searched information.

According to still another aspect of the present invention, a stereoscopic image processing system is provided. The system comprises a composing apparatus and a display apparatus for a stereoscopic image, wherein the composing apparatus incorporates information to be referred to at a prescribed scene during a sequence of processes to display a stereoscopic image, namely stereoscopic information, into a base image to display the stereoscopic image, and the display apparatus searches the stereoscopic information and applies appropriate image process to the base image on the basis of the searched information and then displays the stereoscopic image. An example of such an image processing is altering the configuration style of the base image. The system may be a server-client system. The system can contribute to the distribution of the stereoscopic image.

According to still another aspect of the present invention, a stereoscopic image processing method is provided. This method comprises obtaining a base image to display a stereoscopic image and evaluating information to be referred to at a prescribed scene during a sequence of processes to display the stereoscopic image, namely stereoscopic information, by examining a part of the base image. This method differs from those mentioned thus far, in that in this case the stereoscopic information is not explicitly added. To achieve its end, a part of the base image is actually examined. As an example, this method determines whether the base image is a side-by-side image or not, by examining some regions on the image.

According to this method, even if the stereoscopic information is given explicitly, the relevant information can be recognized from the base image. Therefore existing images created by a general method can be used and thereby an effective utilization of software resources can be achieved.

According to one aspect of the present invention, a stereoscopic image compression method is provided. The method comprises selecting display elements, which are actually used in a stereoscopic image, from a parallax image, and composing drawing elements by a combination of the display elements to reduce the volume of information in the parallax image.

For stereovision, two images viewed respectively from the right and left eyes of a user are necessary. These images are generically called parallax images, however, the term is here extended to embrace the multi-viewpoint method and 3 or more images viewed from 3 or more viewpoints are thus also called parallax images. In this specification, a "parallax image" means each of a plurality of images viewed from a plurality of viewpoints, although a set of these images can be generically called a "parallax image". In this specification, a "stereoscopic image" is an image in which the parallax images are synthesized so that an observer can experience a stereoscopic view.

The display element herein is the minimum element required to display the image, namely a dot, while the drawing element is the minimum unit required to draw the image, namely a pixel. For instance, when the image is displayed in RGB on a liquid crystal display, the three dots of RGB compose a pixel. Hereinafter, the reduction of the amount of data is called "compression" in a broad sense, however, this does not mean encoding and compressing image such as JPEG compression, but means degrading the resolution by such a process as thinning out the data or averaging the data and thereby reducing the amount of data.

According to another aspect of the present invention, a stereoscopic image compression method is also provided. The method comprises selecting display elements, which are actually used in a stereoscopic image, from each of a plurality of parallax images, and composing drawing elements by a combination of the display elements, and thereby generating a plurality of new parallax images, and then composing the stereoscopic image by extracting the drawing elements from each of the plurality of the generated parallax images. Since the display elements that are not used in the stereoscopic image are discarded, the amount of data of the parallax image newly generated is less than that of the original.

According to still another aspect of the present invention, a stereoscopic image compression apparatus is provided. This apparatus comprises a compressing unit which selects display elements, which are actually used in a stereoscopic image, from an input parallax image, and subsequently composes drawing elements by a combination of the display elements, and thereby compresses the parallax image, a storage unit which stores the compressed parallax image, and a composing unit which composes the stereoscopic image by extracting the drawing elements from each of a plurality of parallax images with different viewpoints stored in the storage unit.

The compressing unit may select dots, which are actually used in a stereoscopic image, from a parallax image which is composed of lines of RGB dots, and compress the parallax image by forming new lines of RGB dots by a combination of the selected dots. These new RGB dots may compose a new pixel different from the pixel which consists of RGB dots of the original parallax images.

The compressing unit may select every n-th display elements from each of n parallax images viewed from n different viewpoints and compose the drawing elements by a combination thereof. The line of these display elements may be a line of three dots of RGB, and the compressing unit may select a new set of RGB dots by thinning out R, G, or B dot at intervals of n dots, and compose a new pixel by combining these new RGB dots.

According to still another aspect of the present invention, a stereoscopic image compression system is provided. This system comprises a terminal and a server. The server comprises a compressing unit which selects display elements, which are actually used in a stereoscopic image, from an input parallax image, and composes drawing elements by means of a combination of the display elements, and thereby compresses the parallax image, and a transmitting unit which transmits a plurality of the compressed parallax images with different viewpoints to the terminal. The terminal comprises a receiving unit which receives the plurality of parallax images transmitted by the server, and a composing unit which composes the stereoscopic image by extracting the drawing elements from each of the plurality of the received parallax images.

According to one aspect of the present invention, a stereoscopic image display method is provided. The method comprises displaying a first image to be stereoviewed in a display apparatus and adjusting a display position of the image and storing a proper position for stereovision which is determined by the adjustment, reading out the proper position in displaying a second image to be stereoviewed, and displaying the second image by arranging the image in accordance with the proper position read out.

The first image and the second image may be displayed in a window in the display apparatus, and said storing may store a pair of a position of the window displaying the first image and the display position of the first image in the window as the proper position.

Namely, a proper position, where the multiplex image after the adjustment of its display position is displayed in the window, is stored, and if the display position of the multiplex image is later out of the proper position for any reason, the multiplex image is moved back to the proper position. In addition, when a new multiplex image is displayed as a stereoscopic image, the new multiplex image may be displayed on the basis of the proper position stored beforehand for another image.

An interface for starting up each of said storing and said reading out may be provided and the interface may receive an instruction from a user and then said storing and said reading out may be conducted. Herein the interface means objects such as a button that is generally displayed on a screen and accepts an instruction from a user, and the like. The storing the display position and the shifting the image to the display position may be easily conducted by the operation of such buttons.

According to another aspect of the present invention, a stereoscopic image display apparatus is provided. This apparatus comprises a position writing unit which obtains a display position when a first image to be stereoviewed is displayed as a proper position for stereovision and records the position to a memory, a position reading unit which reads out the proper position when a second image to be stereoviewed is displayed, and a position adjusting unit which adjusts a display position of the second image to the proper position read out.

The apparatus may further include an optical filter which is stuck on a screen in order that the first and the second images can be stereoviewed, and the proper position may be defined by matching between a geometric characteristic of the optical filter and a geometric characteristic of the screen.

Herein a parallax barrier or a lenticular lens is considered as the optical filter, however, such a restriction is not intended. For instance, if a parallax barrier is stuck on the LCD (Liquid Crystal Display), the parallax barrier suitable for the dot pitch of the LCD needs to be prepared.

According to still another aspect of the present invention, a stereoscopic image display method is also provided. This method comprises displaying an image to be stereoviewed in a display apparatus, detecting a notification that a display condition of the image is not appropriate, and changing a way of displaying the image when the notification is detected. If a user cannot view any stereoscopic image, a process such as sorting the data composing the image or shifting the image to a proper position will be conducted on a multiplex image for instance, in response to an instruction from the user.

In general, attribute information is incorporated in or attached to the image data, such as the image size, the number of the used colors and so on. The base image is generated on the assumption that it is utilized in the original resolution or size. Therefore, since a process such as enlargement, reduction, or the like has been conducted on the base image, a user cannot view any stereoscopic image. Therefore, on the basis of such information, the user may be notified that the way of displaying is not appropriate.

In changing the way of displaying, the image may be shifted on the screen by a prescribed number of drawing elements of the image. In changing the way of displaying, relative positions of drawing elements of the image may be reversed. If the image is displayed in a window, the position of the window may be adjusted in changing the way of displaying. Herein the drawing element generally consists of three dots of red (R), green (G) and blue (B) for color display, however, such a restriction is not intended.

According to still another aspect of the present invention, a stereoscopic display apparatus is provided. The apparatus comprises an adjustment instruction obtaining unit which detects a notification that a display condition when an image to be stereoviewed is displayed is not appropriate, and an adjusting unit which changes a way of displaying the image when the notification is detected.

The adjusting unit may change the way of displaying the image independently within each region which covers a space of the number of drawing elements multiplied by n, where n is the number of different parallax images which compose the image. If the drawing element is formed by a unit of three dots of RGB and the number of the parallax images is 4, the way of displaying may be changed by a unit of a group of 12 (=3×4) dots.

According to still another aspect of the present invention, a stereoscopic image display method is provided. The method comprises displaying an image to be stereoviewed on a screen of a display apparatus, and shifting the image on the screen, and a shift unit of the image is restricted to a value defined according to the number of different parallax images which compose the image.

The shift unit may be an integer multiplication of the number of the parallax images multiplied by the number of drawing units, the number of display units, or the number of dots of the image. If the drawing elements are three dots of RGB and the number of the viewpoints is 4, the shift unit of the image is an integer multiplication of 12. If the image is displayed in a window, the shift unit may be referred to at least on the occasion of scrolling the image in the window.

According to still another aspect of the present invention, a stereoscopic image display apparatus is provided. The apparatus comprises a shift instruction obtaining unit which obtains an instruction to shift an image to be stereoviewed on a screen, and a shift processing unit which shifts the image according to the instruction, and the shift processing unit shifts the image in such a manner that a shift unit of the image is restricted to a value defined according to the number of different parallax images which compose the image.

The apparatus may further include a window display unit which displays a window for displaying the image on the screen, and the shift processing unit may put a restriction by the shift unit on scrolling the image in the window.

According to one aspect of the present invention, an object display method is provided. The method comprises displaying an object to be two-dimensionally displayed on a display unit with an optical filter attached after conducting an enlargement process on the object.

When an image is stereoscopically displayed with an optical filter attached, some dots of the image are invisible from the user's viewpoint. It is actually a part of a principle of stereovision, however, it is inconvenient for displaying objects for which the stereovision is not intended, for instance, two-dimensional objects such as icons or characters. Namely, since a part of the object is missed, a serious situation may occur in which a very small character becomes unreadable or an icon pattern becomes unclear, for instance. Since the two-dimensional object is enlarged by the present method, the inconvenience in displaying can be reduced.

According to another aspect of the present invention, an object display apparatus is provided. The apparatus comprises an expanding unit which enlarges an object to be two-dimensionally displayed before the object is displayed on a display unit with an optical filter attached.

The expanding unit may determine an enlargement ratio of the object on the basis of design specification of the optical filter. For instance, if the optical filter is designed on the assumption that the numbers of horizontal and vertical viewpoints of parallax images to be stereoscopically displayed on the display unit are m and n respectively, where m and n are integers, the expanding unit may enlarge each dot of the object m times in a horizontal direction and n times in a vertical direction. When the number of the horizontal viewpoints is m, generally one of m parallax images is projected into the user's eyes. Microscopically it means that one of m dots is seen. Therefore if each dot is enlarged m times in the horizontal direction and changed into m dots, one of the m dots is visible regardless of the user's head position and the visibility can be secured. The same is the case with the vertical direction.

Moreover, any arbitrary replacement or substitution of the above-described structural components and the steps, expressions replaced or substituted in part or whole between a method and an apparatus as well as addition thereof, and expressions changed to a system, a computer program, a data structure, a storage medium, a transmission medium or the like are all effective as and are encompassed by the present invention.

This summary of the invention does not necessarily describe all necessary features, so that the invention may also be a sub-combination of these described features.

BRIEF DESCRIPTION OF THE DRAWINGS

FIG. 2 shows a multiplex image.

FIG. 3 shows a side-by-side image.

FIGS. 17a and 17b illustrate how a parallax image is generally compressed.

FIGS. 32a and 32b show two examples of a method for shifting an image display region by one dot.

FIG. 55 shows a structure of an object display apparatus according to the eighth embodiment.

DETAILED DESCRIPTION OF THE INVENTION

The invention will now be described by reference to the preferred embodiments. This does not intend to limit the scope of the present invention, but to exemplify the invention.

Embodiment 1

When an image is displayed on a LCD, the minimum display unit is normally a dot. However, one pixel is composed of three dots that correspond to RGB, and the pixel is recognized as the minimum process unit in normal image display or image processing.

However, when a stereoscopic image is displayed on an LCD, another consideration is necessary. A right-eye image and a left-eye image reach the eyes of a user with parallax through an optical filter such as a lenticular lens or a parallax barrier. If the right-eye and the left-eye images are arranged alternately pixel by pixel, namely by every three dots, a region could be produced in which both the right-eye and the left-eye images are visible between the region where only the right-eye image is visible and the region where only the left-eye image is visible, and the color might be mixed and the image very difficult to view. Therefore, it is desirable that the image be arranged alternately dot by dot, namely on the basis of the physical minimum display unit. Thus, as a base image to be displayed stereoscopically, a multiplex image is often used in which the right-eye image and the left-eye image are arranged alternately dot by dot.

Figure 1:
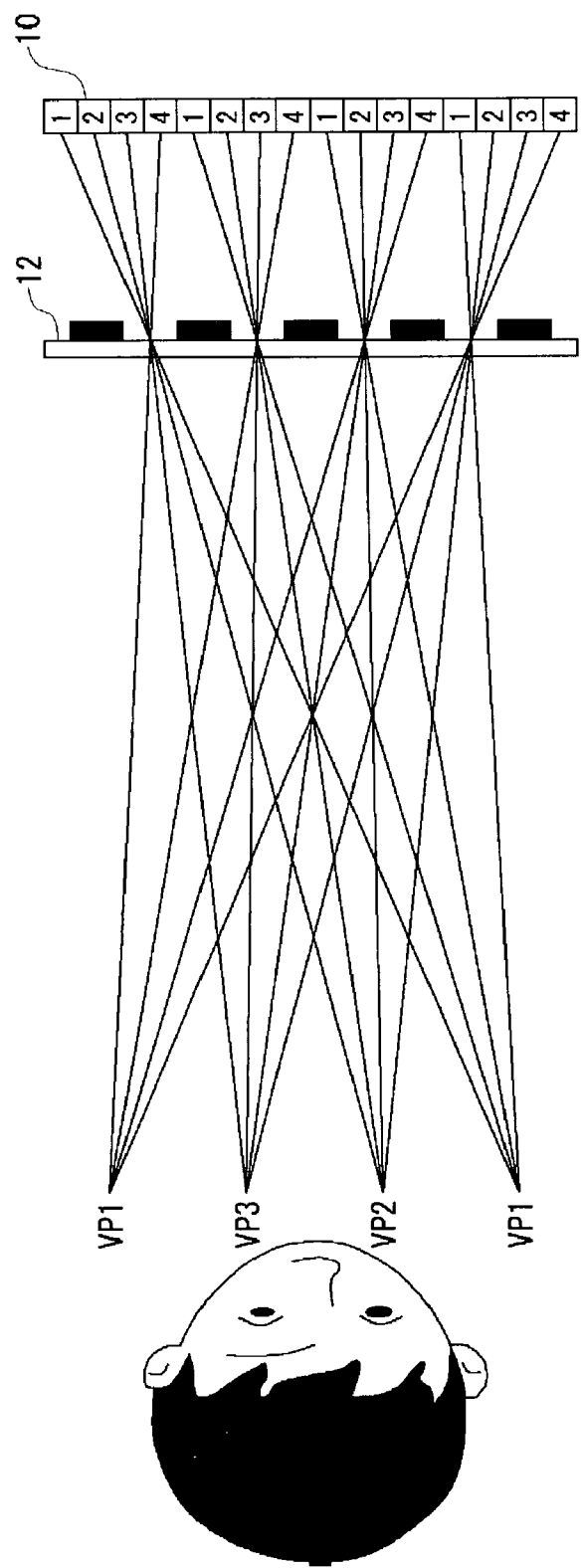
FIG. 1 shows how a user views four multiplex parallax images stereoscopically in a horizontal direction.

If the parallax images are composed of the right-eye and left-eye images, namely, the number of the horizontal viewpoints is "2", the multiplex image can be formed by arranging the right-eye and left-eye images dot by dot in a stripe shape. However, if the number of the viewpoints is "4", and a stereoscopic image is displayed by four parallax images along with the horizontal movement of the viewpoint, only the dots of the parallax image corresponding to each of the first to the fourth viewpoints VP1 to VP4 are visible from each of these viewpoints through a parallax barrier 12 placed in front of a screen 10, as shown in FIG. 1. On the screen 10, the dots of the first parallax image corresponding to the first viewpoint VP1 are indicated by "1", as is the case with the other viewpoints. In this example, the first to the fourth parallax images are alternately arranged dot by dot in a stripe shape and thus the multiplex image is formed.

Furthermore, when the vertical movement of the viewpoint is considered, the parallax barrier 12 is a set of pinholes arranged not in a stripe shape but in a matrix shape and the multiplex image is also in a matrix form in which the images are arranged alternately dot by dot. FIG. 2 shows an example of a multiplex image 20 when both the number of the horizontal viewpoints and the vertical viewpoints are "4". Herein the region denoted by (i,j) indicates a dot to be viewed from the point defined by the i-th horizontal viewpoint and the j-th vertical viewpoint. As shown in the figure, the number i changes cyclically as 1, 2, 3, 4, 1, ... in the horizontal direction and likewise the number j changes cyclically as 1, 2, 3, 4, 1, ... in the vertical direction.

The multiplex image 20 may be sent to a terminal which requires the image in order to utilize the stereoscopic image. Since the multiplex image 20 is already in a final format for stereovision, the terminal can simply display it as it is. As a matter of course, the use of an optical filter such as a parallax barrier for the stereovision is herein assumed.

However, the present inventor has recognized that one problem is likely to arise with this method. Namely, the image data need to be compressed for transmission, and normal nonreversible compression such as JPEG (Joint Photographic Expert Group) cannot be utilized for the multiplex image 20. Since the plural parallax images being multiplexed are images with different viewpoints, they are independent of each other at a dot level. If the multiplex image is compressed in a manner based on spatial frequency such as JPEG and the like, although the independent parallax images from different viewpoints are utilized, high frequency components between the parallax images are cut off and as a result a stereoscopic image cannot be displayed correctly. In particular, if the independent images are arranged alternately dot by dot, a large number of very fine high frequency components would be produced and in some situations disastrous problems might arise. Increases in network bandwidth notwithstanding, if the base image for a stereoscopic image cannot be compressed while normal images can be compressed without any problem, a serious obstruction to the popularization of the stereoscopic image is likely to eventuate.

Figure 3:
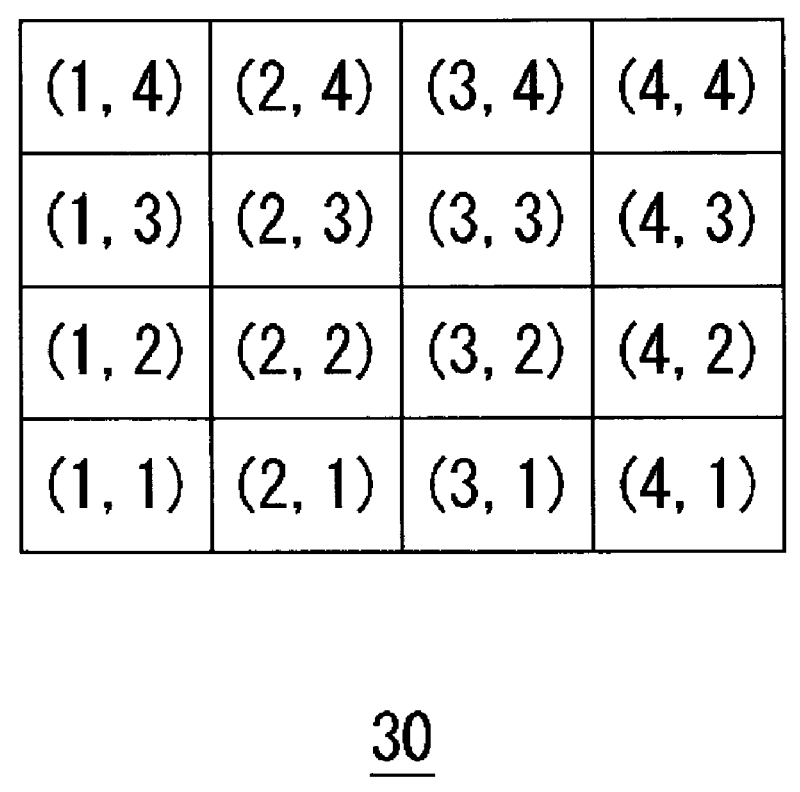

Therefore it is very likely that the use of the side-by-side image as a compressible format for transmission and storage will increase. FIG. 3 shows the side-by-side image 30 with four viewpoints in both horizontal and vertical directions. The region herein denoted by (i, j) indicates a single parallax image to be observed from a point defined by the i-th horizontal viewpoint and the j-th vertical viewpoint. Namely, the side-by-side image 30 is synthesized in such a format that the parallax images are arranged alongside each other in either a horizontal or a vertical direction, or in both directions. Each of the parallax images functions as a single image when it is cut out of the side-by-side image 30.

Since each of the parallax images corresponds to just one of the 16 (=4×4) viewpoints, its image size can be one-sixteenth of the size of the stereoscopic image to be displayed and the image is normally generated by selecting one dot of every four dots of the original image in both horizontal and vertical directions, the size of which is the same as the stereoscopic image. As an example to clarify this point, for a multiplex image that is composed of right-eye and left-eye images with two viewpoints, only the dots on the odd columns should be visible to the right eye and only the dots on the even columns should be visible to the left eye. Therefore the right-eye image can be the image thinned out to half size in the horizontal direction in which only the odd columns of the original image are previously picked up, and likewise the left-eye image can be the image in which only the even columns are picked up. Generally, if the number of the viewpoints is "n", the size of each of the parallax images that compose a side-by-side image can be one-nth the size of the original image, and if all the parallax images are arranged alongside each other like tiles, its image size returns to just the original image size.

Since parallax images are independent of each other in the side-by-side image 30 except on its boundary, at worst, nonreversible compression can produce bad effects only on the boundary parts. Therefore the side-by-side image 30 can be compressed in the normal way using JPEG and the like, and easily transmitted via a network and in addition, a large number of images can be stored in a small storage space. Thus, in this way the side-by-side image 30 has an advantage which might tend to make it popular. However it has a drawback, in that it requires a special viewer. Namely unless it is eventually converted to a multiplex image, no display apparatus can display the image stereoscopically and thus a conversion process from the side-by-side image 30 to the multiplex image is needed.

Figure 4:
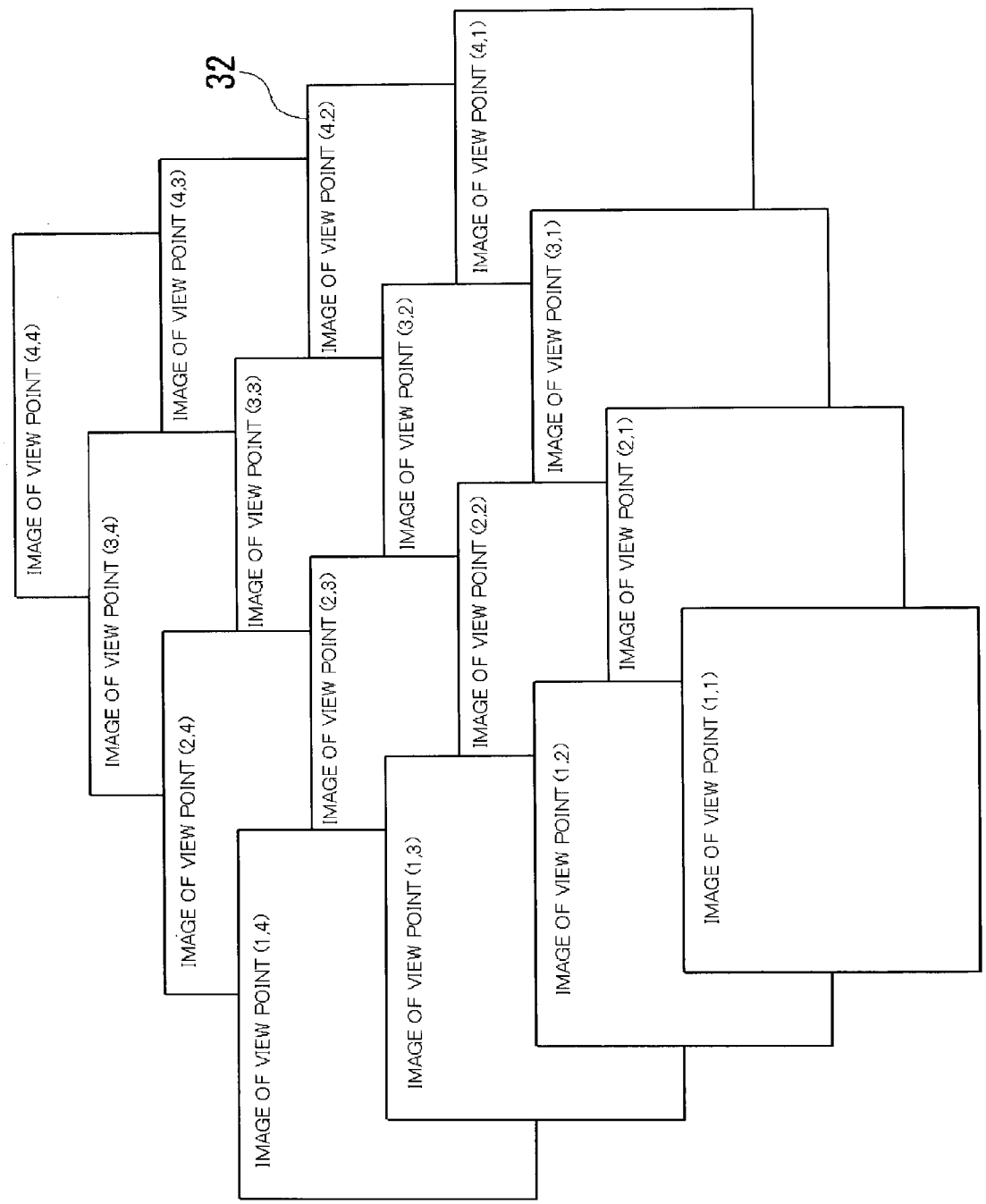
FIG. 4 shows a set of separate images.

In addition to the above-mentioned two formats that have advantages and disadvantages, a separate image can be considered as the third format which might tend towards popularization, especially from the point of view of preparing the image. A set of separate images can form a stereoscopic image, however each separate image itself is just a normal two-dimensional image. FIG. 4 shows a relationship between 16 separate images and a stereoscopic image. A separate image 32 denoted as the "image of viewpoint (4, 2)" of the 16 images assumes the viewpoint (4, 2) and its size is the same as the original image. Therefore this will be easily understood if the 16 separate images are regarded as being like camera images shot along with the movement of a user.

Since the size of the separate image remains the same as when it was shot, such a process as thinning out or synthesizing is not required and thereby the preparation of the image is rendered easy. Since each of the images remains original, it can be utilized as itself. However, for displaying stereoscopically, a total of 16 parallax images are required, and therefore this format is also disadvantageous in terms of transmission and storage, and a special viewer is again required.

The above-mentioned three formats are mainly considered with a view to the popularization of the stereoscopic images. The variations in these formats will be described below. Hereinafter, assuming that the base image is represented in any one of these formats, a stereoscopic image processing method for technically realizing the popularization and promotion and the stereoscopic display will be explained. The case in which the number of the horizontal viewpoints is "2" and the number of the vertical viewpoints is "1" will be illustrated hereinafter.

Figure 5:
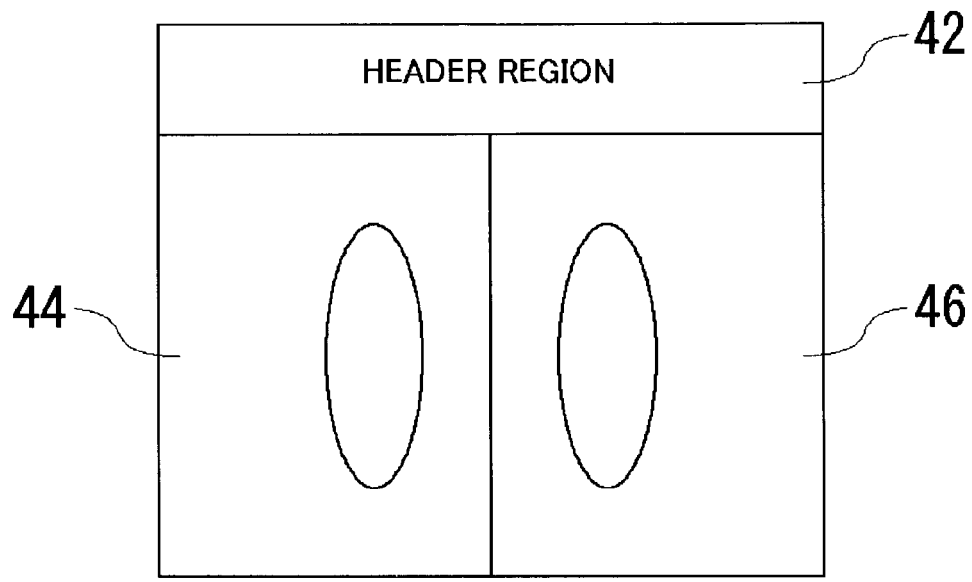
FIG. 5 schematically shows a data structure of a side-by-side image according to the first embodiment.
Figure 6:
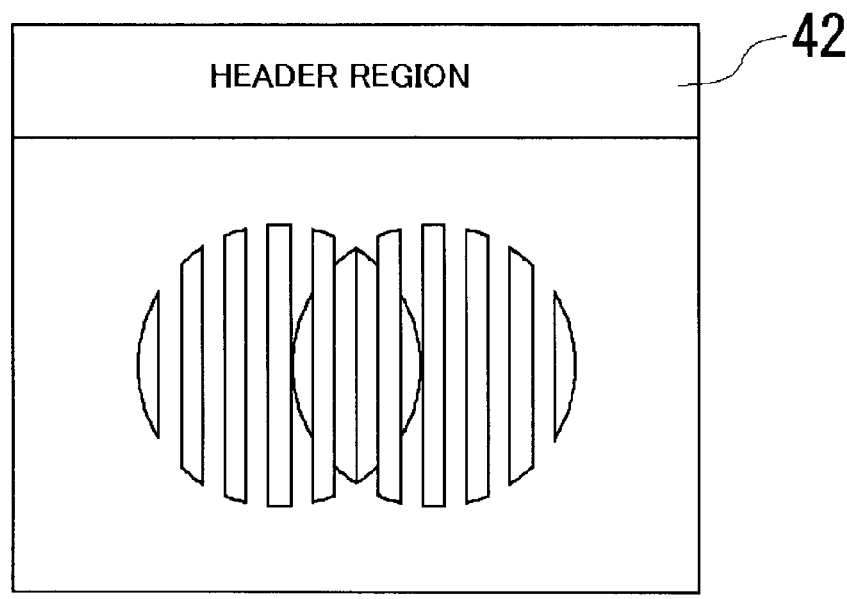
FIG. 6 schematically shows a data structure of a multiplex image according to the first embodiment.
Figure 7:
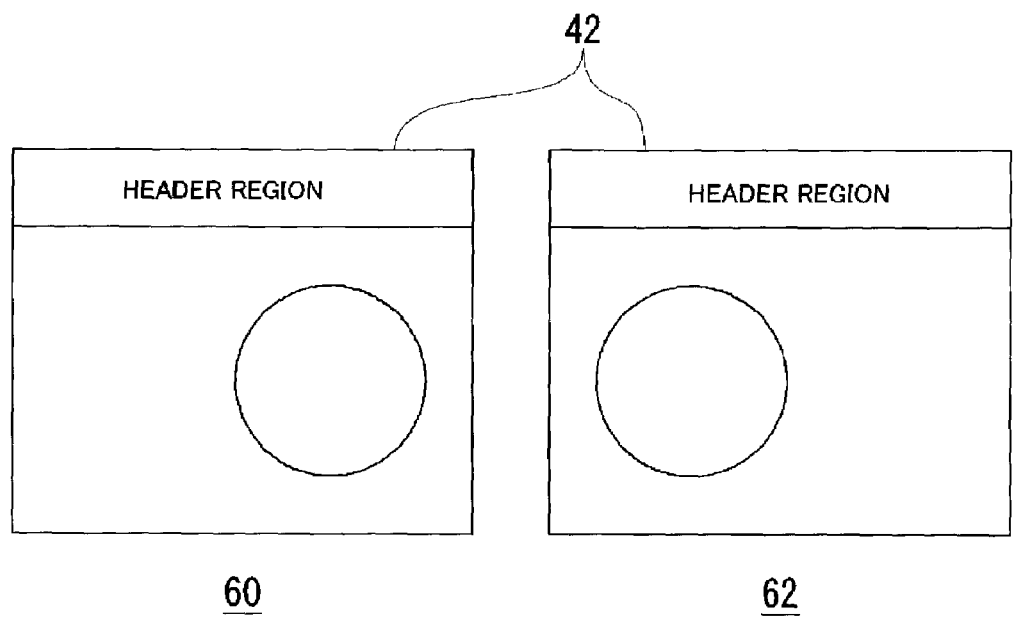
FIG. 7 schematically shows a data structure of a separate image according to the first embodiment.

FIG. 5, FIG. 6 and FIG. 7 schematically show the data structures of a side-by-side image 40, a multiplex image 50, and a set of two separate images 60 and 62 respectively.

As shown in FIG. 5, the side-by-side image 40 is formed in such a manner that the first parallax image 44, that is a left-eye image, and the second parallax image 46, that is a right-eye image, are horizontally synthesized, and a header region 42 to be described later is attached to the image data. Likewise, the header region 42 conforming to the same format is attached to the multiplex image 50 of FIG. 6. The header region 42 is attached to each of the two separate images 60 and 62 of FIG. 7. In both cases, this data structure can be regarded as a combination of the main data that is the base image to display a stereoscopic image and the sub-data that retain information to be referred to at a prescribed scene during a sequence of processes to display the stereoscopic image. It is to be noted that if the main data consist of the base image compressed by a prescribed method, the sub data may be stored in a header region prescribed in the compression method. If any prescribed header region already exists, a user-defined region in the header region, for instance, can be utilized.

Figure 8:
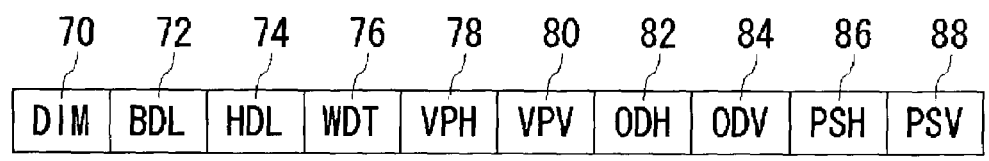
FIG. 8 shows a structure of a header region added to a base image according to the first embodiment.

FIG. 8 shows the detailed structure of the header region 42 schematically. In the figure each region retains the following stereoscopic information.

(1) DIM region 70: this indicates in three bits the dimension and the configuration style of the base image as follows.

000: separate image, or two-dimensional image in general for which no stereovision is possible.

001: multiplex image as a style of three-dimensional images.

010: side-by-side image as a style of three-dimensional images.

011: reserved.

1xx: reserved.

As an example of the reserved formats, there are a "joint image" in which a plurality of parallax images are arranged alongside each other as side-by-side images, but these parallax images are not thinned out of the original image at all and arranged adjacent to each other just as they are, and a "field sequential image" which implies that an even field and an odd field of the image is to be displayed alternately as a parallax image in a time-division manner, and so on. The "joint image" is often viewed in Uncrossed-Parallax method or Crossed-Parallax method. However, since a viewer can convert it to a side-by-side image by thinning out or can convert directly to a multiplex image, it is effective as one of the possible formats.

(2) BDL region 72: this indicates in one bit whether there is any boundary process of the side-by-side images. This is significant when the DIM value is "01x".

0: no boundary process exists.
   1: a boundary process exists.

As described above, when nonreversible compression is conducted on the side-by-side image, its boundary part may produce an undesirable effect. This item indicates whether the process to reduce this effect, as shown in the next item, should be conducted or not.

(3) HDL region 74: this indicates in two bits the content of the boundary process for the side-by-side image in two bits. This is significant when the BDL value is "1".

00: a white frame is inserted.
   01: a black frame is inserted.
   10: the dots at the edge are copied and inserted.
   11: reserved.

In order to reduce any unwanted effect caused by compression, the white frame, the black frame and the like are inserted and thereby the amount of mixing of the plural parallax images is reduced. The copying of the dots at the edge of the image has a similar effect.

(4) WDT region 76: this item indicates in two bits the number of dots in the boundary process for the side-by-side image. It is significant when the BDL value is "1".

00 to 11: the number of dots.

(5) VPH region 78: this indicates in eight bits the number of horizontal viewpoints assumed in a stereoscopic image. It may be manually set when the base image is generated or may be automatically generated by software employed to generate the base image.

00000000: unclear or reserved.
   00000001 to 11111111: the number of horizontal viewpoints.

(6) VPV region 80: this indicates in eight bits the number of vertical viewpoints assumed in a stereoscopic image.

00000000: unclear or reserved.
   00000001 to 11111111: the number of vertical viewpoints.

If the VPH and VPV values are both 00000001, the base image may be judged as a normal two-dimensional image for which any stereovision is impossible.

(7) ODH region 82: this indicates in one bit the arrangement of a plurality of parallax images in a horizontal direction.

0: the same as the arrangement of cameras in shooting.
   1: opposite to the arrangement of cameras in shooting.

Namely, when the ODH value is "0", the parallax image shot by the camera farthest to the left is recorded farthest to the left in the base image and the others are recorded left to right in order. Since their arrangement cannot be possibly random, it is sufficient to prescribe these two types.

(8) ODV region 84: this indicates in one bit the arrangement of a plurality of parallax images in a vertical direction.

0: the same as the arrangement of cameras in shooting.
   1: opposite to the arrangement of cameras in shooting.

Since the above-mentioned VPH and VPV regarding the number of viewpoints are both 8 bits and this number of bits would be normally sufficient, the most significant bits of these values may be allocated to the ODH and ODV respectively.

(9) PSH region 86: this indicates in eight bits which number of viewpoints each separate image corresponds to in a horizontal direction. This is significant when the DIM value is "000".

00000000: unclear or reserved.
   00000001 to 11111111: a position in a horizontal direction Absolute values such as coordinates of an origin defined on each separate image, for instance, the point at the upper left corner of the image, may be stored in the header region 42. In this way the process will be accelerated.

(10) PSV region 88: this indicates in 8 bits which number of viewpoints each separate image corresponds to in a vertical direction.

00000000: unclear or reserved.
   00000001 to 11111111: a position in a vertical direction.

For instance, the separate image denoted by "image from viewpoint (4, 2)" has such a description as PSH=4, PSV=2.

An example of the header region 42 is described above. An apparatus to realize the distribution of the stereoscopic image by utilizing this region is now described.

Figure 9:
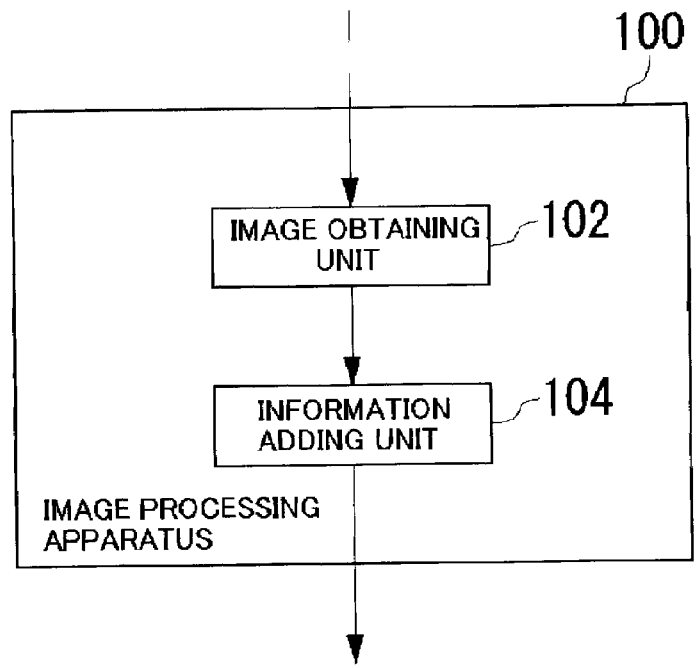
FIG. 9 is a block diagram of an image processing apparatus which is a starting point for the distribution of images according to the first embodiment.

FIG. 9 shows a structure of an image processing apparatus 100 which generates this region. This apparatus 100 includes an image obtaining unit 102 which obtains a base image to display a stereoscopic image, and an information adding unit 104 which adds to the obtained base image stereoscopic information to be referred to at a prescribed scene during a sequence of the processes to display the stereoscopic image, for instance at the scene of generating a multiplex image later on a display apparatus. This structure can be realized by hardware, such as a CPU, memory and other LSIs of arbitrary computers, or by software, such as a program or the like loaded in the memory, which has functions enabling it to generate the base image and add the stereoscopic information. In the figure, however, functions only, which are realized by combinations of such hardware and software, are shown in blocks. Thus, it should be understood by those skilled in the art that these functional blocks can be realized by various modes such as hardware only, software only or a combination thereof. Therefore, it can be considered that any structure, the name of which is not specified hereinafter, is realized by a control unit that mainly consists of the CPU.

The image obtaining unit 102 inputs an original image from a network or an image source such as a digital camera, and uses it as a base image or generates a base image by processing it. For instance, if a separate image is necessary, the original image can be simply used as a base image. On the other hand, if a side-by-side image is needed, the image is synthesized by means of a plurality of the original images being arranged alongside each other. If a multiplex image is needed, a plurality of parallax images viewed from different viewpoints can be recomposed into a stripe shape or a matrix shape.

The image obtaining unit 102 compresses the obtained base image according to the necessity of a given case. Before compressing, the unit may assess whether such compression might have any effect on the quality of the stereoscopic image, and may restrict the compression when it appears that some negative effect might occur. For instance, for compressing a multiplex image in respect of spatial frequency components, the compression may be restricted or the image may be compressed after it is converted to a side-by-side image.

The information adding unit 104 adds the above-mentioned header information to the base image thus obtained, and records the image data for the stereoscopic vision obtained as a result thereof to a storage device not shown in the figure, or distributes it to a prescribed location via a network. According to this apparatus 100 described thus far, the base image to which the stereoscopic information is added previously can be prepared for users who desire the stereoscopic vision.

It is to be noted that the image which the image obtaining unit 102 first obtains is not always an original image. An image that is already in a multiplex format can be input via a network. Its stereoscopic information can be determined, and it will be recognized as being a multiplex image and therefore not suitable for compression. Then the image can be compressed after being converted to a side-by-side image and the stereoscopic information can be altered accordingly. In this case, this apparatus 100 can be utilized as a relay point for the distribution of the stereoscopic image.

Figure 10:
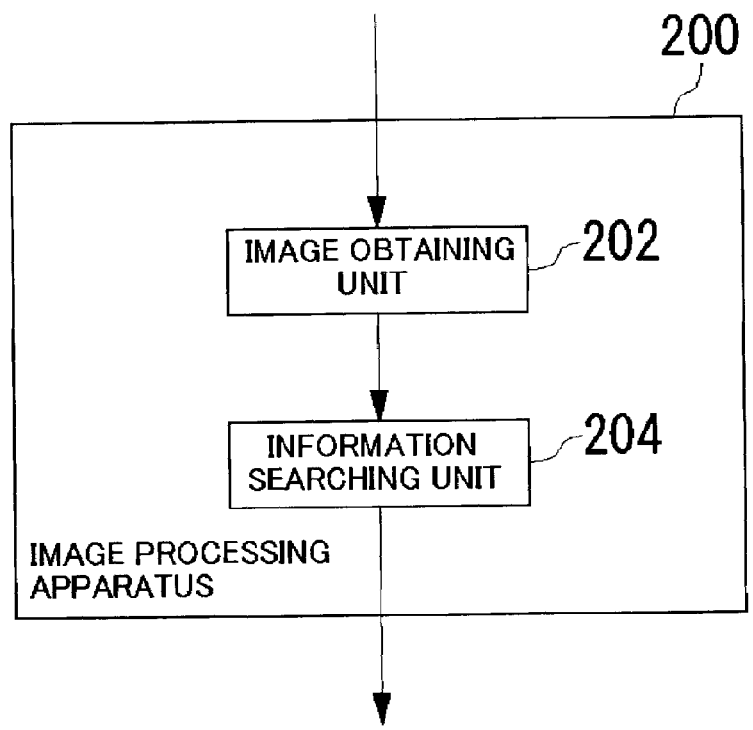
FIG. 10 is a block diagram of an image processing apparatus which is an end point for the distribution of images according to the first embodiment.

On the other hand, FIG. 10 shows a structure of an image processing apparatus 200 on a decoding side which actually displays the image stereoscopically. This apparatus 200 includes an image obtaining unit 202 which obtains a base image to display as a stereoscopic image, and an information searching unit 20 which searches stereoscopic information to be referred to at a prescribed scene during a sequence of processes to display the stereoscopic image. This apparatus 200 is typically a user terminal, and when the image obtaining unit 202 inputs the previously compressed image data, the unit 202 may generate or restore the base image by expanding the input image.

Then the information searching unit 204 parses the header region added to the base image and obtains the stereoscopic information. If it is confirmed from the stereoscopic information thus searched that this base image is not a multiplex image, this apparatus 200 converts the base image into a multiplex image and displays it as a stereoscopic image. As an optional function, this apparatus 200 may increase the brightness of the display screen (not shown in the figure) of this apparatus 200 according to the above-mentioned consideration regarding the brightness, on the basis of the particular stereoscopic information, especially the number of horizontal viewpoints and the number of vertical viewpoints.

This apparatus 200 can not only simply display the stereoscopic image but also save and edit the base image as a matter of course. In saving the base image, if it is a multiplex image, the image may be saved after it is converted to a side-by-side image or others and its stereoscopic information is altered. During editing of the base image, the image may need to be enlarged or reduced. In this case, if it is a multiplex image, the process is complicated. Therefore it is converted to a side-by-side image and a prescribed image process is then applied to the image, and finally it may be restored to the multiplex image and displayed.

For the convenience of image processing such as editing and others, this apparatus 200 may always retain an image in various formats other than a multiplex image, especially as a side-by-side image in memory or other storage devices, retrieve the image according to the necessity of the particular case and utilize it appropriately.

As an additional structure within this apparatus 200, it is provided with a characteristic obtaining unit which obtains data on characteristics such as the number of viewpoints of the display apparatus and an optimal viewing distance, and its convenience is thus further enhanced. For instance, if the number of the assumed viewpoints of the base image and that of the displaying apparatus are different, a display image selecting unit may be provided, which automatically selects the parallax image to be displayed from the base image based on the given characteristics. If the number of the assumed viewpoints of the base image is "4" and that of the display apparatus is "2", two of the four parallax images are selected. It is not necessary for these two parallax images to be images corresponding to the continuous viewpoints, and two images with discontinuous viewpoints may rather be selected in order to emphasize a three-dimensional effect. If the number of the viewpoints of the base image is "2" and that of the display apparatus is "4", it is possible to secure a region where stereovision can be realized in front of the screen by displaying the same parallax image twice.

If this image processing apparatus 200 further comprises a location detecting unit which detects the head position of an observer who looks at the display screen, the display image selecting unit can show the observer an image with a sense of depth by changing the parallax images to be selected in accordance with the head position.

If the optical filter is replaceable, a sensing unit, for instance, which optically senses an indication including information such as the number of the viewpoints printed as a pattern on the optical filter, may be provided in the display unit of this apparatus 200. If the sensed data suggest inconsistency with the number of the viewpoints of the parallax images, the parallax images may be selected appropriately and optimally and then displayed, or an indication to recommend the replacement of the optical filter may be displayed.

Figure 11:
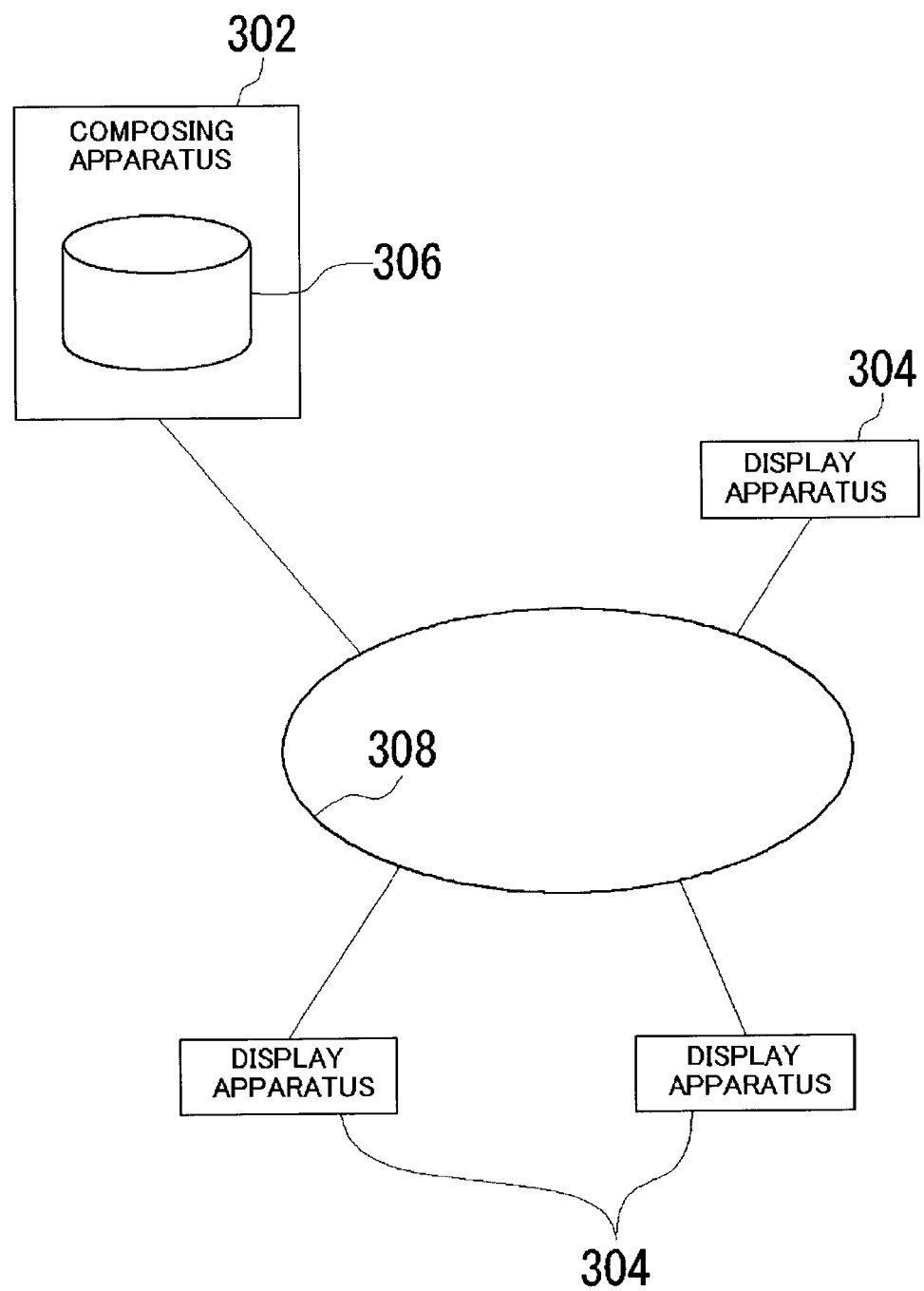
FIG. 11 is a block diagram of a network system for the distribution of images, which includes the image processing apparatus of FIG. 9 as a composing apparatus and the image processing apparatus of FIG. 10 as a display apparatus.

FIG. 11 shows a structure of the network system 300 for the distribution of the stereoscopic images. A composing apparatus 302 herein is the image processing apparatus 100 of FIG. 9 and functions as a starting point for the distribution. On the other hand, a display apparatus 304 is the image processing apparatus 200 of FIG. 10 and functions as an end point for the distribution. As shown in the figure, the composing apparatus 302 has a storage apparatus 306 which records a large number of base images and functions as an image server, and thereby a user can readily obtain a desired stereoscopic image via a network 308 such as the Internet or the like.

Although the present invention has been described by way of exemplary embodiments, it should be understood that many changes and substitutions may be made by those skilled in the art without departing from the scope of the present invention which is defined by the appended claims. Some such alterations are stated as follows.

The functions of each of the image processing apparatus 100 and 200 of FIG. 9 and FIG. 10 can be offered to a user in the form of a computer program. If the user wishes to generate a base image on his/her own, the functions of the image processing apparatus 100 of FIG. 9 can be prepared and offered to the user as an authoring tool.

The structure of the header region 42 shown in FIG. 8 allows a high degree of freedom including changing the number of bits. For instance, the structure may include copyright information of the base image observed by a user as a stereoscopic image, conditions to be satisfied by an optical filter such as a parallax barrier or a lenticular lens suitable to observe the base image and so on. As examples of the conditions to be satisfied by the optical filter, there are distances between the viewpoints of the parallax images, namely distance between the eyes, an angle of view of the camera while shooting, and so on. These conditions are essential parameters for designing the optical filter in order to restore the stereoscopic images on a proper scale in the direction of depth. In selecting the images when the number of viewpoints of the base image is larger than the number of viewpoints of the display apparatus as described above, these conditions can be also referred to in order to select automatically an image which will offer a more natural three-dimensional effect.

In the embodiment the stereoscopic image to be finally displayed is a multiplex image, however, the image to be displayed may change according to viewing methods. Therefore, various images may be converted to images appropriate to different viewing methods and then displayed.

For instance, when liquid crystal shutter glasses are used, the image displayed is a field-sequential image. In the case of a head mounted display, that is a type having two separate display devices, one each for the left eye and the right eye respectively, separate images are used as the stereoscopic image to be displayed and they are sent to either of the display devices via two separate image output paths. If the display apparatus is one head mounted display, a side-by-side image can be displayed. In this case, the apparatus may be so configured that the image to be observed is divided into the right and left halves by an optical means and enlarged in a horizontal direction. Furthermore, a joint image may be displayed for such a viewing method as Crossed-Parallax or Uncrossed-Parallax.

In the embodiment, the apparatus on the side displaying the stereoscopic image, namely the image apparatus 200 of FIG. 10, starts the process on the assumption that the stereoscopic information is added to the base image. However, the base image, which does not conform to the present embodiment, has no header region characteristic of the embodiment, so that an examination and assessment process unit that examines the base image may be provided and on the side of the image processing apparatus 200 the stereoscopic information may be assessed. For instance, in order to determine whether it is a side-by-side image or not, the image may be divided into m equal parts horizontally and n equal parts vertically and the degree of density of the divided regions of the image may be evaluated as the values of m and n change. If the regions or some parts of the regions have a high degree of density, this image can be defined as a side-by-side image with m horizontal viewpoints and n vertical viewpoints. The degree of density is evaluated by a sum of the squares of the differences between the values of the dots, for instance. In addition, it can be considered that the boundary of the regions may emerge when a differential filter is applied to the base image, and it could in this manner be determined to be a side-by-side image or not.

Embodiment 2

Firstly a general structure to reduce the amount of data of a parallax image is explained, and then improvement of the technology is described.

It is considered that a stereoscopic image for a parallax barrier method is composed of right and left parallax images. Let two parallax images have the same resolution as the stereoscopic image. The parallax images or original images have twice the resolution when they are displayed as a stereoscopic image. When these original images are synthesized into a stereoscopic image, information by pixel unit on different parallax images is used.

However, in order to display an image stereoscopically, much of the double information of the original image is superfluous, and therefore the image is compressed in a horizontal direction and then stored. The color liquid crystal panel retains three display elements (hereinafter called "dots") in different colors arranged alongside each other in a horizontal direction as a drawing element (hereinafter called "pixel") and displays each of the pixels on the basis of the information on the three dots thus united. Therefore, when the two-viewpoint parallax images are compressed in the horizontal direction, the compression is conducted by a unit of a pixel column. For instance, as shown in FIG. 17*a*, a pixel is composed of three dots of RGB in a parallax image 2051*a*, a thinning process is conducted by this pixel unit, and thereby a compressed image 2051*b* is formed from the remaining pixels while every other pixel is discarded. As another method, as shown in FIG. 17*b*, a compressed image 2052*b* in which the pixel columns are reduced by half is generated by determining the pixel data to be retained on the basis of the average of the adjacent pixels in the parallax image 2052*a* or the like. By any method, for stereoscopic display, the pixels are alternately extracted from the two parallax images thus compressed and then arranged alongside each other, and thereby a stereoscopic image is composed.

The stereoscopic image composed by the parallax barrier method can be configured as a multi-viewpoint type. The multi-viewpoint stereoscopic image is an image in which the parallax images viewed from 3 or more different viewpoints are synthesized as the original images. These parallax images can be obtained, for instance, in such a manner that an object is shot from a number of different camera positions. When the stereoscopic image displayed is viewed from different positions by an observer, different stereoscopic images are visible according to the number of the viewpoints from which they are shot. Such a multi-viewpoint stereoscopic image is effectively used to display a rotating stereoscopic image. For instance, if parallax images viewed relatively from the right side and the left side of the object are used, an impression of viewing the object turning around into the right and left directions can be obtained. If the parallax images viewed from the top and from the bottom are used, the number of the viewpoints is doubled, and a vertically rotating stereoscopic image can be displayed when the observer changes his/her view position in the up-and-down direction.

Figure 18:
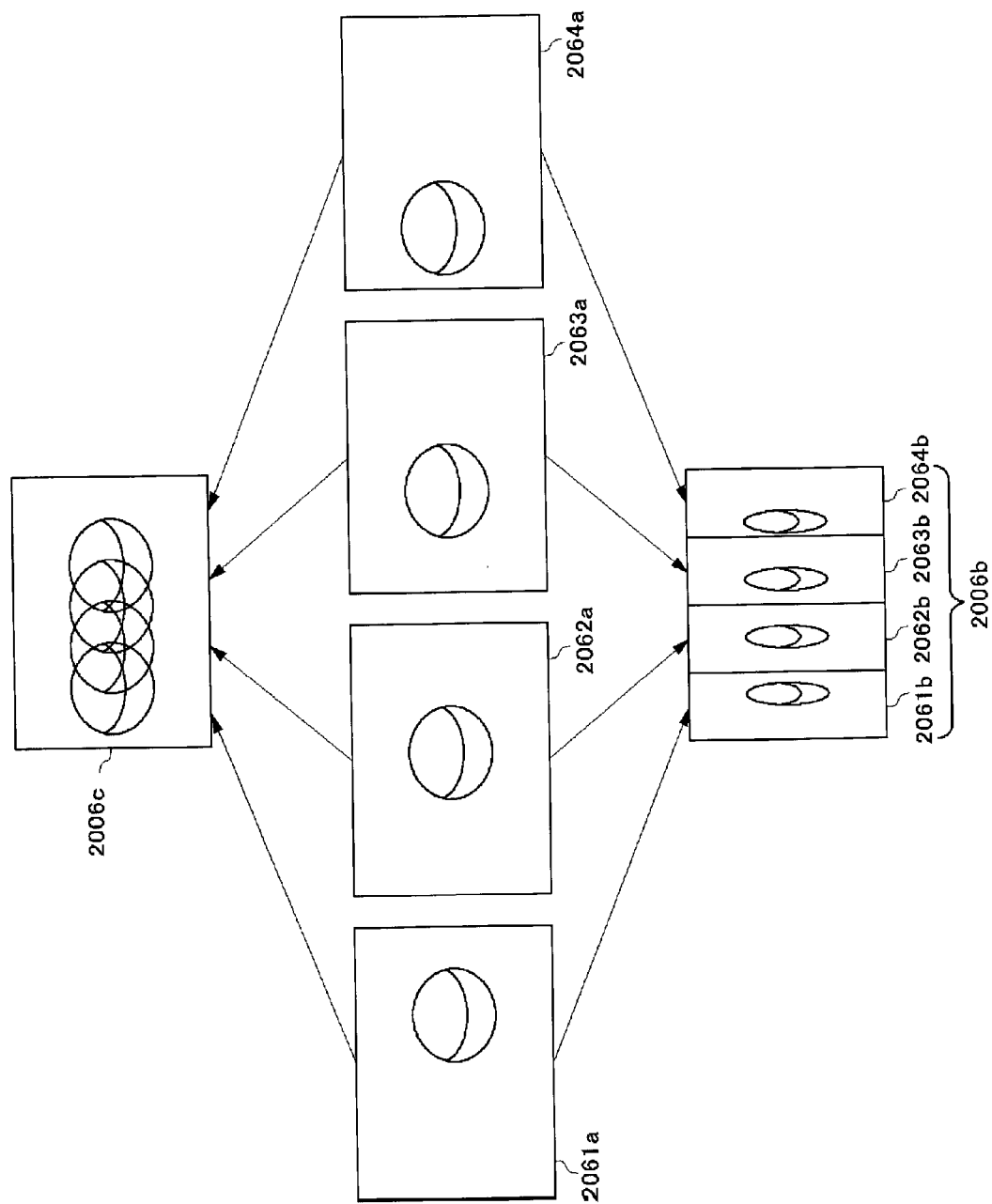
FIG. 18 illustrates how a four-viewpoint type of a parallax image is generally compressed.

Likewise, it is possible to reduce the amount of data required for the multi-viewpoint stereoscopic image. FIG. 18 shows an example of a four-viewpoint type. Each of four parallax images 2061*a*, 2062*a*, 2063*a*, and 2064*a* which compose a stereoscopic image 2006*c* is thinned out and compressed to one-fourth. Then the four compressed parallax images 2061*b*, 2062*b*, 2063*b*, and 2064*b* are arranged alongside each other in a horizontal direction and retained as a single image 2006*b*. This is called "side-by-side compression" of the parallax images.

The stereoscopic image produced by the parallax barrier method is so composed that the dots are extracted from each of the parallax images and the dots data are arranged alternately dot-by-dot. Therefore, if the stereoscopic image is composed by the parallax images thinned out pixel-by-pixel, the data of dots to be used are different from the dots in the case when the stereoscopic image is composed by the uncompressed parallax images, and inconsistency occurs. Namely, originally, the stereoscopic image should be composed by selecting the dots from the parallax images dot-by-dot, however, the parallax images are thinned out pixel-by-pixel and the necessary dot data are lost along with the thinned out pixels. In the case of an n-viewpoint type, (n-1) pixels are thinned out and if a pixel is composed of three dots of RGB, the data of 3(n-1) dots are lost. Therefore, the effect of thinning out pixel-by-pixel becomes larger as the number of viewpoints n increases. The present inventor has recognized this problem and has created further improved technology to compress the parallax images as stated below.

Figure 12:
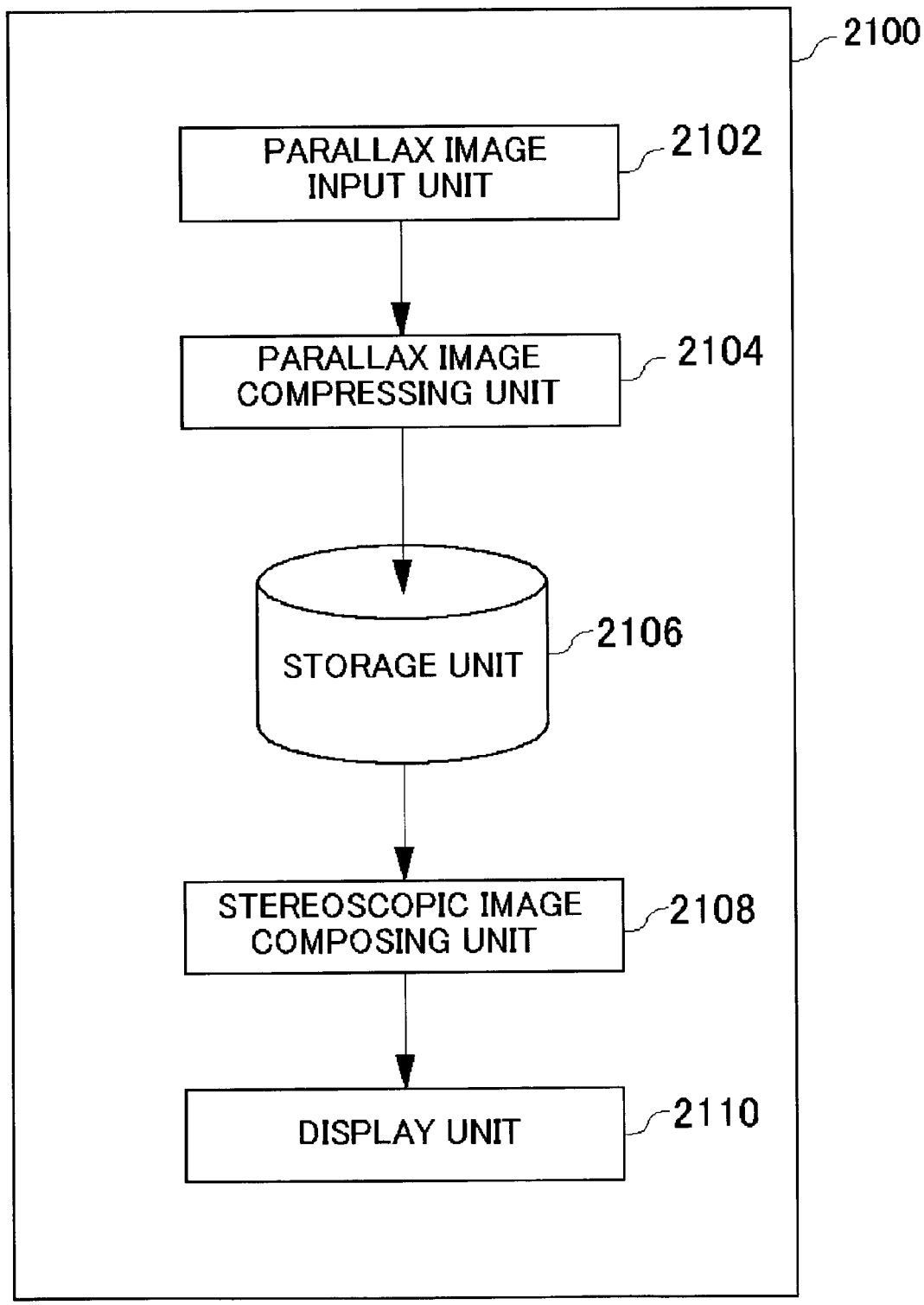
FIG. 12 shows a structure of a stereoscopic image compression apparatus according to the second embodiment.

FIG. 12 shows a structure of a stereoscopic image compression apparatus 2100 according to Embodiment 2. This structure can be realized by hardware, such as a CPU, memory and other LSIs of arbitrary computers, or by software, such as a program or the like loaded in the memory, which has functions capable of stereoscopic image compression. In the figure, however, functions only, which are realized by combination of such hardware and software, are shown in blocks. Thus, it should be understood by those skilled in the art that these functional blocks can be realized by various modes such as hardware only, software only or a combination thereof.

A parallax image input unit 2102 inputs data of parallax images viewed from different viewpoints. For instance, the parallax images shot by a camera whose shooting position has been changed are input. A parallax image compressing unit 2104 compresses the input parallax images by a method to be described later. The compressed parallax images are retained in a storage unit 2106. A stereoscopic image composing unit 2108 retrieves dot information from the parallax images retained in the storage unit 2106 and composes a stereoscopic image by a method to be described later. A display unit 2110 outputs the composed stereoscopic image to a display apparatus. The stereoscopic image displayed is observed through a parallax barrier or a lenticular lens.

Figure 13:
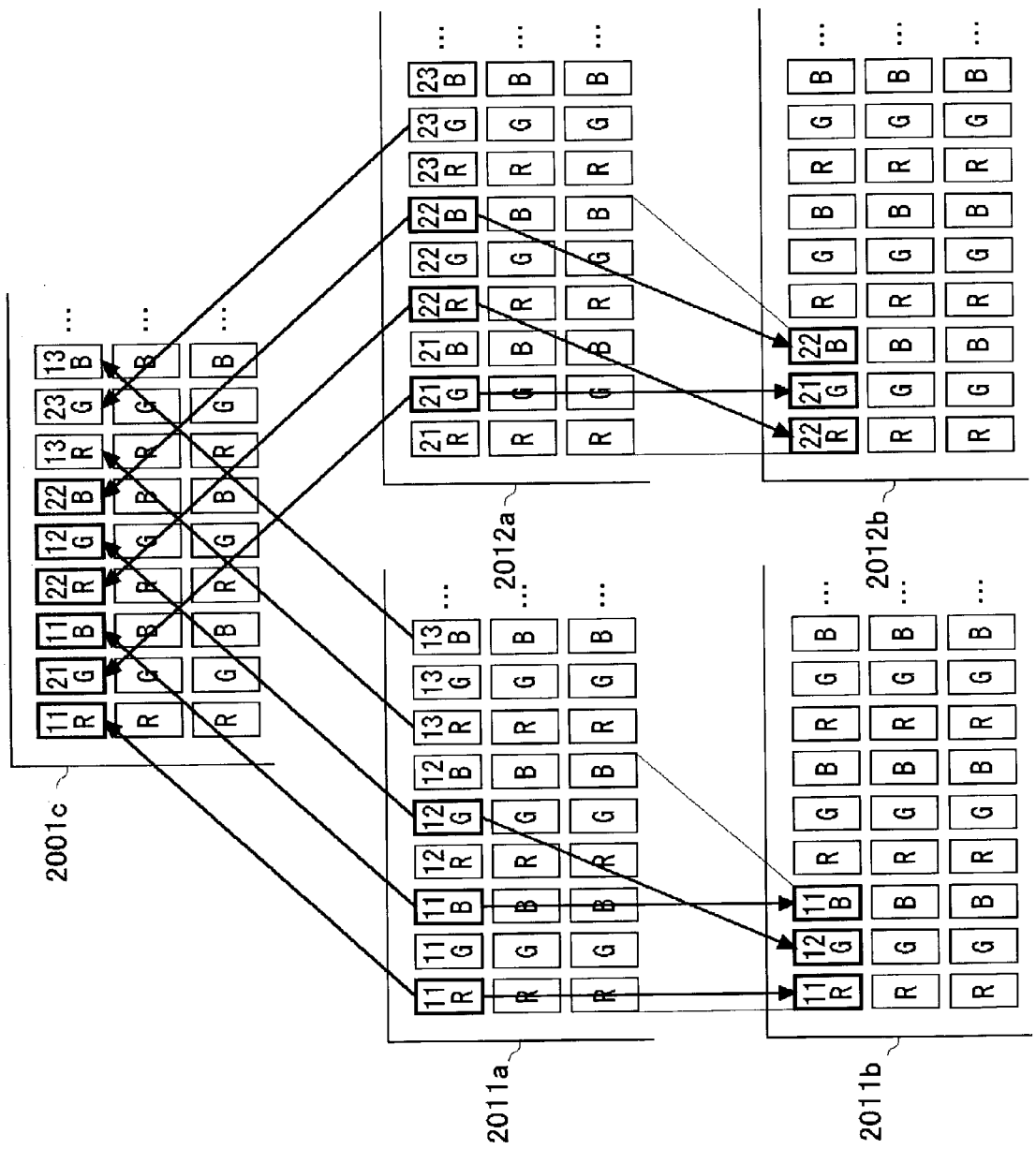
FIG. 13 illustrates how a parallax image is compressed by the stereoscopic image compression apparatus of FIG. 12.

FIG. 13 shows how a parallax image is compressed by the stereoscopic image compression apparatus 2100. An example of a two-viewpoint type is herein explained. Two original images 2011a and 2012a with some degree of parallax are input. If a stereoscopic image 2001c is composed by these uncompressed original images, a sequence of the dots is selected and synthesized in the order of 11R, 21G, 11B, 22R, 12G, 22B and so on. From the second original image 2012a, the dots are selected in the order of 21G, 22R, 22B and so on, being shifted by one dot. Thus the stereoscopic image 2001c is composed in which the parallax images are arranged alternately dot-by-dot.

The parallax image compressing unit 2104, in consideration of the sequence of the dots to be actually used for stereoscopic display, compresses the image by composing a pixel from these dots to be used. For instance, the pixels of the first column of the compressed image 2011b corresponding to the original image 2011a are composed of three dots of the original image 2011a: 11R, 12G and 11B to be actually used. These are originally dot information from a different point belonging to a different pixel, however, the composed pixel is formed in disregard of this fact. The information on the dots 11G, 12R and 12B, which are not used for the stereoscopic display, is discarded. The compressed image 2011b thus obtained is retained in the storage unit 2106. Likewise, in the compressed image 2012b corresponding to the second original image 2012a, the three dots of the original image 2012a: 21G, 22R and 22B to be actually used are employed to compose the pixel of the first column of the compressed image 2012b.

Figure 14:
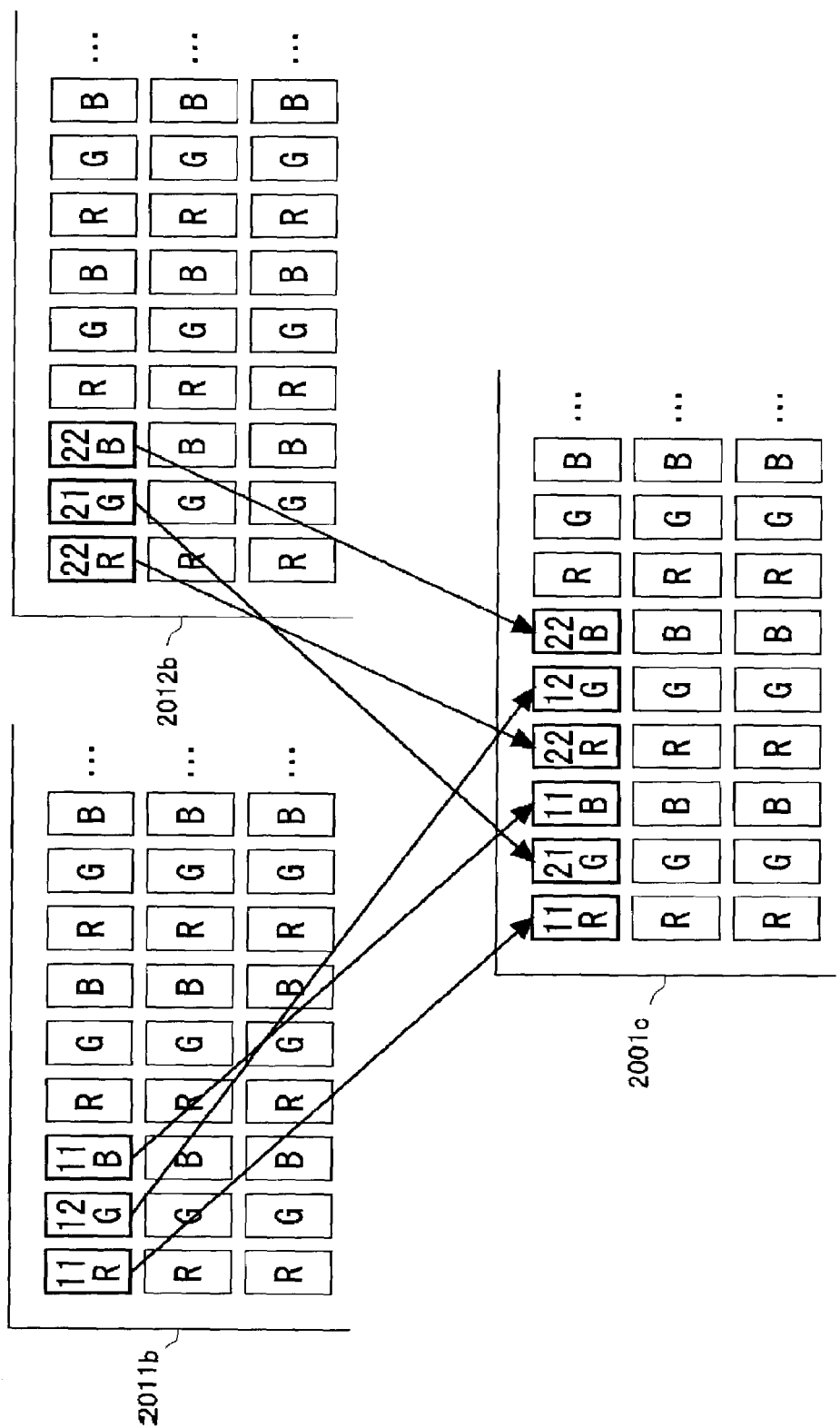
FIG. 14 illustrates how a stereoscopic image is composed by the stereoscopic image compression apparatus of FIG. 12.

As shown in FIG. 14, the stereoscopic image composing unit 2108 alternately reads dots from either of the two compressed image 2011b and 2012b retained in the storage unit 2106, and composes the stereoscopic image 2001c. The dot information is read out in the order of 11R from the first compressed image 2011b, 21G from the second compressed image 2012b, 11B from the first compressed image 2011b, 22R from the second compressed image 2012b, 12G from the first compressed image 2011b, and 22B from the second compressed image 2012b. The stereoscopic image 2001c thus composed has the same dot information as the stereoscopic image 2001c shown in FIG. 13, which is obtained by means of synthesizing the uncompressed parallax images.

Figure 15:
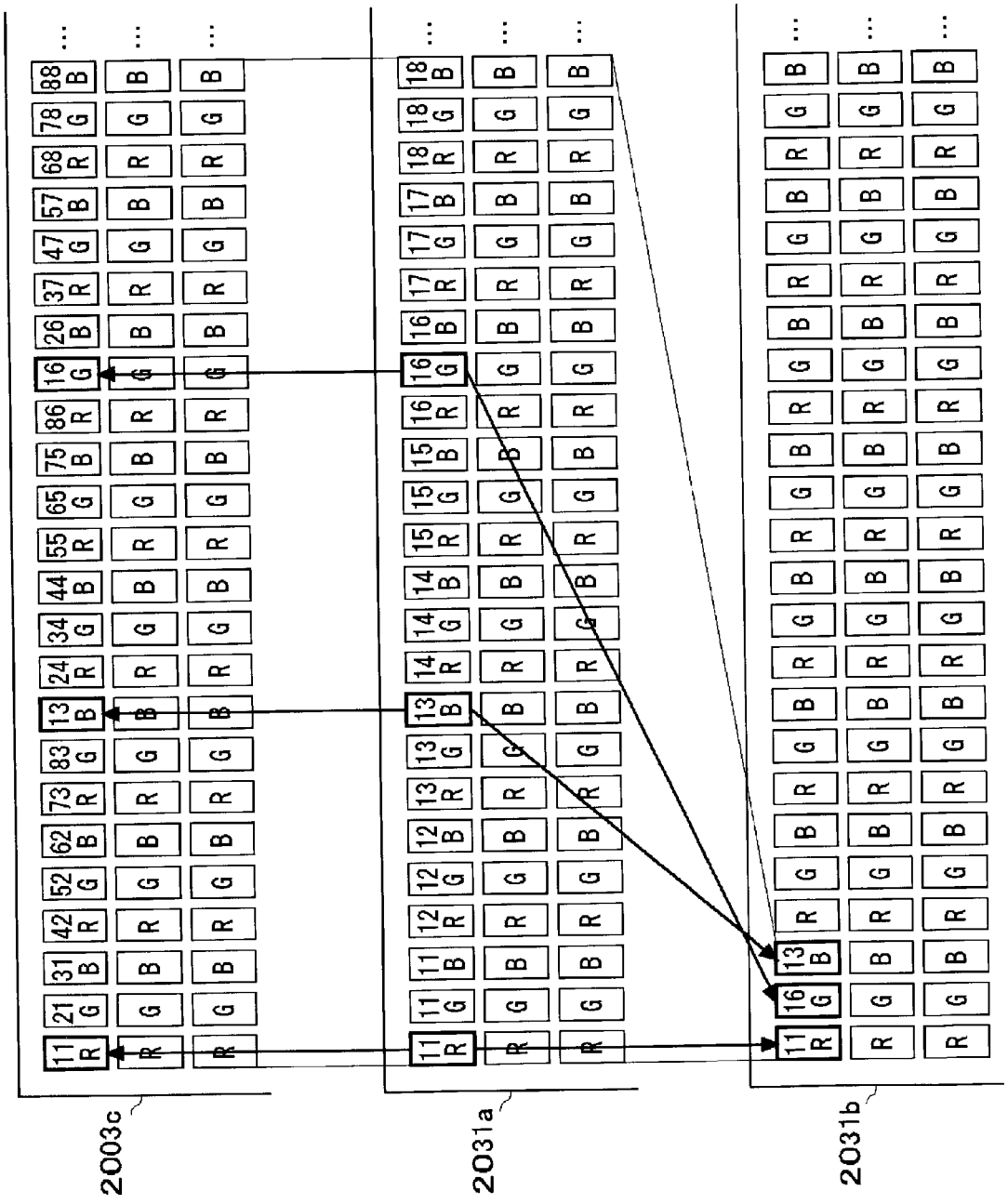
FIG. 15 illustrates a compression method in the case of an eight-viewpoint type.

FIG. 15 illustrates the compression method in the case of an eight-viewpoint type. The sequence of dots of the original image 2031a, which is one of eight original images with some parallax, is illustrated. Since the dots thinned out at intervals of eight dots, 11R, 13B and 16G, are actually used in the stereoscopic image 2003c, the pixel of the first column of a compressed image 2031b is composed of these dots as shown in the figure. Likewise, for the other seven original images, the dots are thinned out at intervals of eight dots and thereby the compressed images are formed.

Figure 16A:
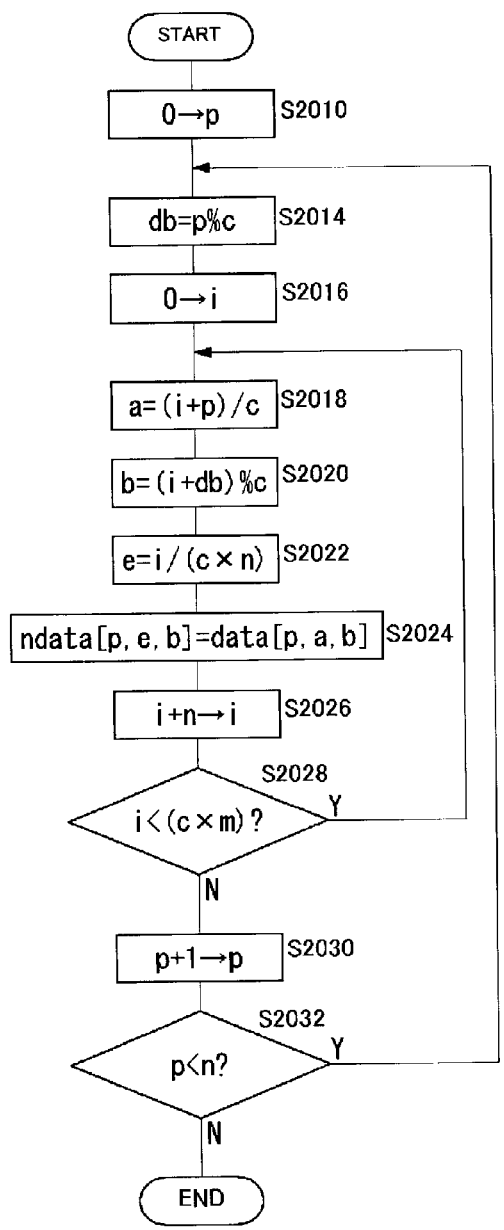
FIG. 16a shows a procedure for compressing parallax images by the stereoscopic image compression apparatus of FIG. 12.
Figure 16B:
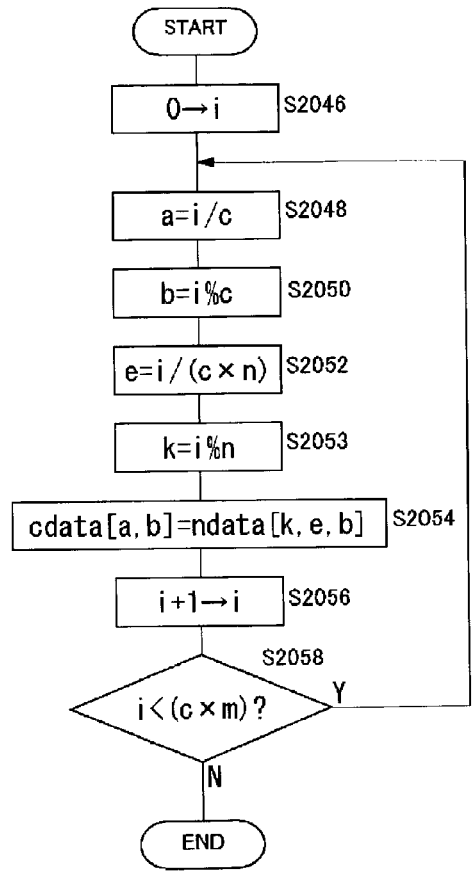
FIG. 16b shows a procedure for composing a stereoscopic image by the stereoscopic image compression apparatus of FIG. 12.

FIGS. 16a and 16b are flowcharts which show the procedure of the parallax image compression and the stereoscopic image composition by the stereoscopic image compression apparatus 2100. Let n be the number of parallax images, m the number of pixels in a horizontal direction, c the number of dots which compose a pixel, let data[f,g,h] be the h-th dot data in the g-th pixel of the f-th original image, ndata[u,v,w] be the w-th dot data in the v-th pixel of the u-th compressed image, and cdata[p,q] the q-th dot data in the p-th pixel of the composed stereoscopic image. Let X/Y be a quotient (integer) when X is divided by Y, and let X % Y be a remainder (integer) when X is divided by Y.

FIG. 16a shows the procedure for compressing the parallax images. It is noted that n=2 for the two-viewpoint type and n=8 for the eight-viewpoint type, and c=3 for a crystal liquid panel in which three dots of RGB compose a pixel. First, a variable p indicating the original image number is initialized to be zero (S2010). The value of p % c is assigned to a variable db (S2014). A variable i indicating the pixel number in the horizontal direction is initialized to be zero (S2016).

For the current value of the variable i, the value of (i+p)/c is assigned to a variable a (S2018), and the value of (i+db) % c is assigned to a variable b (S2020). The value of i/cn is assigned to a variable e (S2022). The value of the dot data data[p,a,b] selected from the original image is assigned to the dot data ndata[p,e,b] of the compressed image (S2024). The variable i is incremented by the number n of the parallax images (S2026). If the variable i is less than cm (Y of S2028), the steps S2018 to S2026 are repeated for the incremented variable i. In the case of three dots of RGB, by repeating the steps S2018 to S2026, any one dot of RGB is selected from the original image at an interval of n, that is the number of the parallax images, and sorted in the order of RGB and thus synthesized into one pixel of the compressed image.

When the variable i reaches cm (N of S2028), the procedure moves forward to the step S2030, and the variable p is incremented by 1. If the variable p is less than n (Y of S2032), the procedure goes back to the step S2014 and the succeeding processes are repeated on the next original image. When the variable p reaches n (N of S2032), the compression process ends.

FIG. 16b shows the procedure for composing the stereoscopic image from the parallax images. First, the variable i indicating the dot number in the horizontal direction is initialized to be zero (S2046).

For the current variable i, the value of i/c is assigned to the variable a (S2048), and the value of i % c is assigned to the variable b (S2050). The value of i/cn is assigned to the variable e (S2052). The value of i % n is assigned to the variable k indicating the compressed image number (S2053). The value of the dot data ndata[k,e,b] of the k-th compressed image is assigned to the dot data cdata[a,b] of the stereoscopic image (S2054). The variable i is incremented by 1 (S2056). If the variable i is less than cm (Y of S2058), the steps S2048 to S2056 are repeated for the incremented varible i.

When the variable i reaches cm (N of S2058), the composition process of the stereoscopic image ends. In the case of three dots of RGB, any one dot of RGB is alternately selected from the n compressed images, and sorted in order of RGB so that one pixel can be composed.

It is to be noted that if the images have some parallax in a vertical direction, since the pixel is generally less likely to be divided into the dots in the vertical direction, such composition as in the horizontal direction is not required and it is sufficient that only the pixel rows necessary for the stereoscopic display are retained.

Embodiment 3

Figure 19:
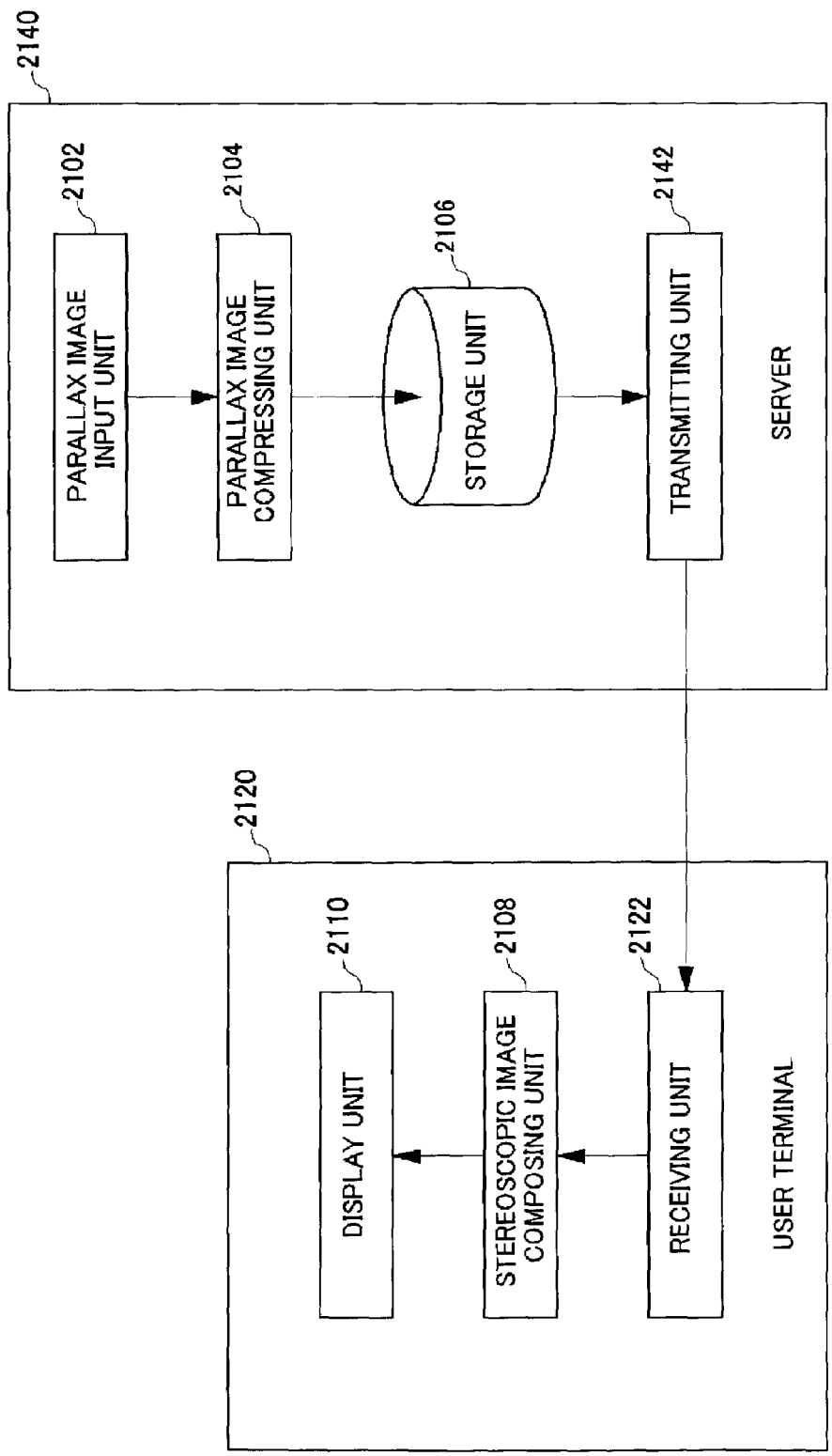
FIG. 19 shows a structure of a stereoscopic image compression system according to the third embodiment.

FIG. 19 shows a structure of a stereoscopic image compression system according to Embodiment 3. This system includes a user terminal 2120 and a server 2140 which are connected via a network such as the Internet which is not shown in the figure. At a request from the user terminal 2120, the server 2140 transmits parallax images thinned out and compressed to the user terminal 2120. The user terminal 2120 composes a stereoscopic image from the parallax images transmitted from the server 2140 and displays the image on a display device or the like.

The server 2140 includes a parallax image input unit 2102, a parallax image compressing unit 2104, a storage unit 2106, and a transmitting unit 2142. The components denoted by the same numerals as in Embodiment 2 behave like those of Embodiment 2. The transmitting unit 2142 reads the parallax images compressed by the parallax image compressing unit 2104 from the storage unit 2106 and transmits the images to the user terminal 2120.

The user terminal 2120 includes a receiving unit 2122, a stereoscopic image composing unit 2108, and a display unit 2110. The receiving unit 2122 receives the compressed parallax images from the server 2140. As in Embodiment 2, the stereoscopic image composing unit 2108 composes a stereoscopic image using the received compressed image and the display unit 2110 displays the composed stereoscopic image.

The server-client system is thus configured and the parallax image compression and the stereoscopic image composition are distributed into the server and the client, and thereby load can be distributed and network traffic can be reduced. For instance, in the case of an eight-viewpoint type of stereoscopic image, since the server 2140 compresses each of the eight parallax images into one-eighth of its original size and transmits it to the user terminal 2120, the amount of data transmitted can be the same as in the case when the single original image is transmitted. The process of composing the stereoscopic image from the compressed image requires sorting of the dots and the load on the CPU may thereby increase. However, this process is conducted on the user terminal 2120 and therefore excessive load concentration on the server 2140 can be avoided.

As described thus far, according to the embodiments of the present invention, when the parallax images are thinned out, the dots to be actually used in composing the stereoscopic image are reserved, and therefore the stereoscopic image composed from the compressed parallax images has the same dot information as the stereoscopic image composed from the uncompressed original image and a proper stereoscopic display can be realized. Since the image is compressed with dot information necessary for displaying the stereoscopic image reserved and unnecessary dot information is discarded, there is no loss of data. By this method of compression, the amount of storage necessary for storing the image data can be reduced, and the network traffic can also be reduced when the operation is conducted as a server-client system.

In Embodiments 2 and 3, many changes and substitutions may be made by those skilled in the art. Some such alterations are stated as follows.

In Embodiment 3 the user terminal 2120 may not have functions for composing the stereoscopic image and may just display the received stereoscopic image. In this case, the server 2140 has a role of offering the stereoscopic image prepared beforehand to the user terminal 2120. The user terminal 2120 may transmit uncompressed parallax images to the server 2140 and the parallax image compressing unit 2104 provided in the server 2140 may compress the images transmitted from the user terminal 2120 and retain them in the storage unit 2106.

In any embodiments, the data format of the compressed images may be a side-by-side format in which a plurality of compressed parallax images is arranged alongside each other and thereby a single image data is formed. Furthermore, a coding unit which encodes and compresses the compressed image in the side-by-side format by JPEG compression may be provided and the parallax images thinned out may be encoded and compressed, and then stored in the storage unit 2106. The transmitting unit 2142 of the server 2140 in Embodiment 3 may transmit the parallax image thus encoded and compressed to the user terminal 2120. In this case, the user terminal 2120 composes the stereoscopic image after decoding the received parallax images. The server 2140 may have a receiving unit which receives the compressed image in the side-by-side format from the user terminal 2120 and may be configured so as to receive the parallax images offered from a user. The server 2140 may have a receiving unit which receives a plurality of parallax images from the user terminal 2120 and may be configured so as to conduct the compression process at the parallax image compressing unit 2104 after receiving the plurality of parallax images offered by a user.

In the above explanation the observer stereoviews the composed stereoscopic image using a parallax barrier or a lenticular lens, however, an optical filter which functions as an image separation device for separating the right-eye image from the left-eye image will suffice as the means of viewing the stereoscopic image, and the present invention is applicable regardless of the concrete methods applied to achieve stereovision.

Embodiment 4

As a method for displaying a stereoscopic image, the case is considered in which a multiplex image is displayed on an LCD screen and a parallax barrier is stuck on the LCD. The positional relationship between the parallax barrier and the multiplex image needs to be adjusted at a dot pitch level. The dot pitch of a standard LCD is about 0.1 millimeter and it is a very difficult and troublesome task to adjust it by a mouse. If the positional relationship between the multiplex image and the parallax barrier goes wrong, a user cannot view the stereoscopic image. For this reason, the positional relationship needs to be adjusted, and the present embodiment relates to a viewer exclusively used for a stereoscopic image, which makes the adjustment easier.

Figure 20:
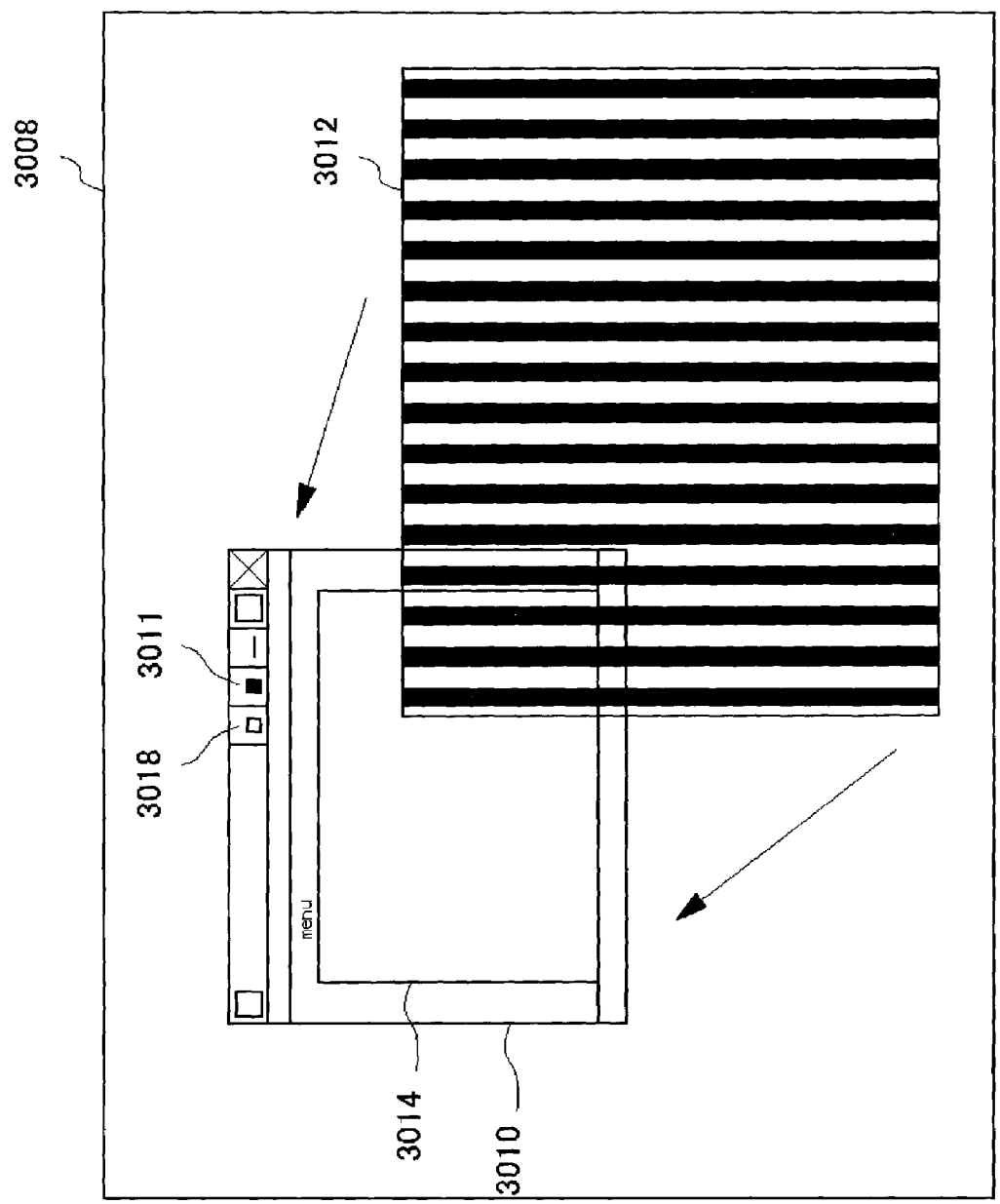
FIG. 20 shows a situation in which a viewer according to the fourth embodiment is displayed on an LCD and a parallax barrier is stuck on the LCD.
Figure 21:
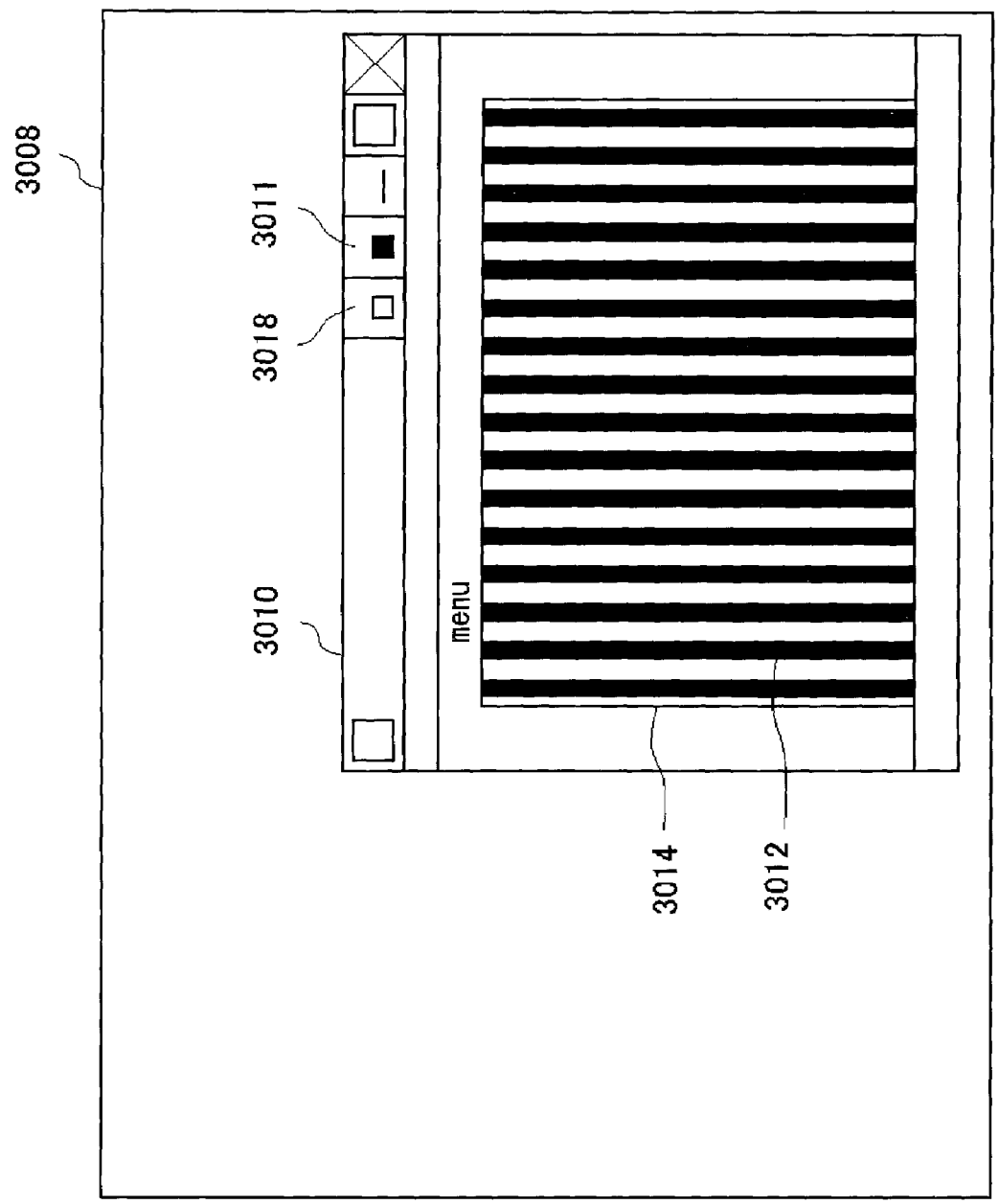
FIG. 21 shows a situation in which a positional relationship between a viewer and a parallax barrier according to the fourth embodiment is adjusted.

FIG. 20 shows a situation in which a viewer 3010 according to the present embodiment is displayed on an LCD 3008 and a parallax barrier 3012 is stuck on the LCD 3008. It is assumed that a multiplex image is displayed in the viewer 3010. At this point, since the viewer 3010 is in a wrong position to the parallax barrier 3012, a user cannot view any stereoscopic image. As shown in FIG. 21, the viewer 3010 is adjusted into a proper position to the parallax barrier 3012 and window information of the viewer 3010 such as its start position, size and image display region 3014 is saved. It is desirable that the destination of the saving should be a location that can retain data when software terminates, such as an initial file for the viewer 3010.

After the proper position as in FIG. 21 is determined, the position or the size of the viewer 3010 might change as in FIG. 20 and the proper positional relationship between the multiplex image and the parallax barrier 3012 might go wrong again. At this point, if a button 3018 is operated, the saved window information is read in and the viewer 3010 matches the parallax barrier 3012 as in FIG. 21. Since the start position of the viewer 3010 and the start position of the image display region 3014 are restored to the same state, the first dot is placed in the proper position to the parallax barrier 3012. As a result, the multiplex image has a proper positional relationship with the parallax barrier 3012. Even if the state of the viewer 3010 thus established is changed, the state can be restored to the original one.

The same information can be utilized for a new viewer 3010 which displays another stereoscopic image. Since the change in the size of the viewer 3010 is accepted while the start positions of the viewer 3010 and the image display region 3014 are kept unchanged, a new multiplex image can be placed in a proper position to the parallax barrier 3012 even in case that the size of the viewer 3010 must be changed.

Thus, this window information can be utilized not only for the viewer 3010 for which the information is saved, but also for another opened viewer 3010 or an initial window in starting up software. The information may be also utilized in another software which is different from one that conducted the setting. Furthermore, the window information thus saved may have not only a single state but also a plurality of states. In this case, any one of the states of the window information will be selected in the reading-in.

In general, there is a plurality of appropriate start positions of the image, and if an appropriate start position of the image is determined, other appropriate start positions are also determined. For instance, in a four-viewpoint case in which there are four viewpoints, once a certain position is found to be an appropriate start position, the dot that is 12 dots away from the position is also an appropriate start position. This number 12 is 4 or the number of the viewpoints multiplied by 3 or the number of dots which composes a pixel. The dots that are a 12 multiplication away from there are all the appropriate start positions. Therefore, in case of moving the window for instance, an optimal start position may be calculated on the basis of the start positions thus recorded and the image may be displayed by using the calculated position as a new start position. When a new image of a different size is displayed, if the setting has been made so that the image can be always displayed in the middle of the screen, an appropriate start position is newly calculated and the image may be displayed by using the calculated position as a new start position.

Figure 22:
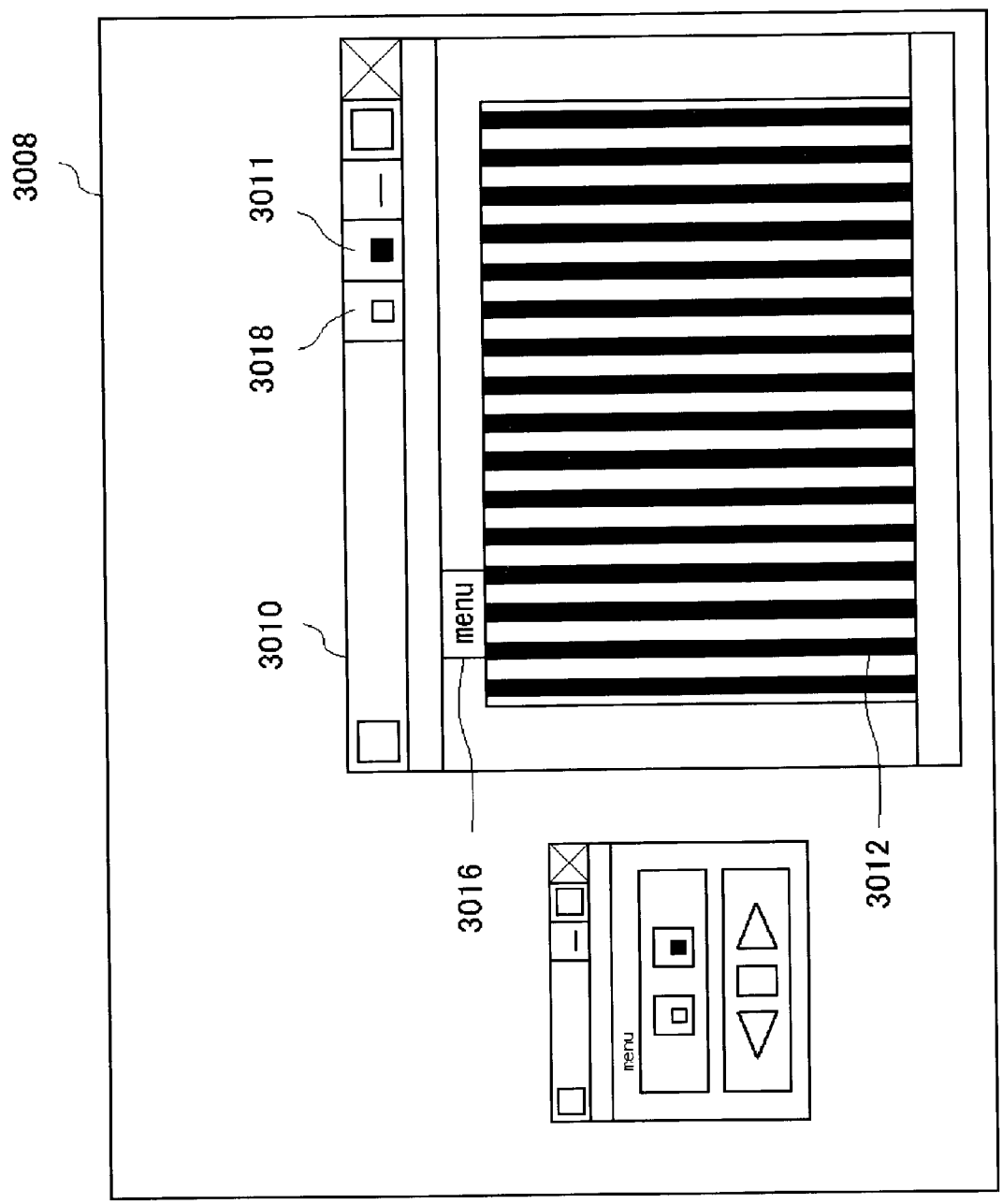
FIG. 22 shows another configuration of a viewer according to the fourth embodiment.

In addition to the button operation, the command of saving or reading-in may be selected from a list menu 3016 on the viewer 3010, which functions by a mouse operation, as shown in FIG. 22, or may be selected by a key operation on a keyboard or a voice.

The button may not be on the viewer 3010 and may be in any position for which operations can be made, such as on the other windows or the like.

Figure 23:
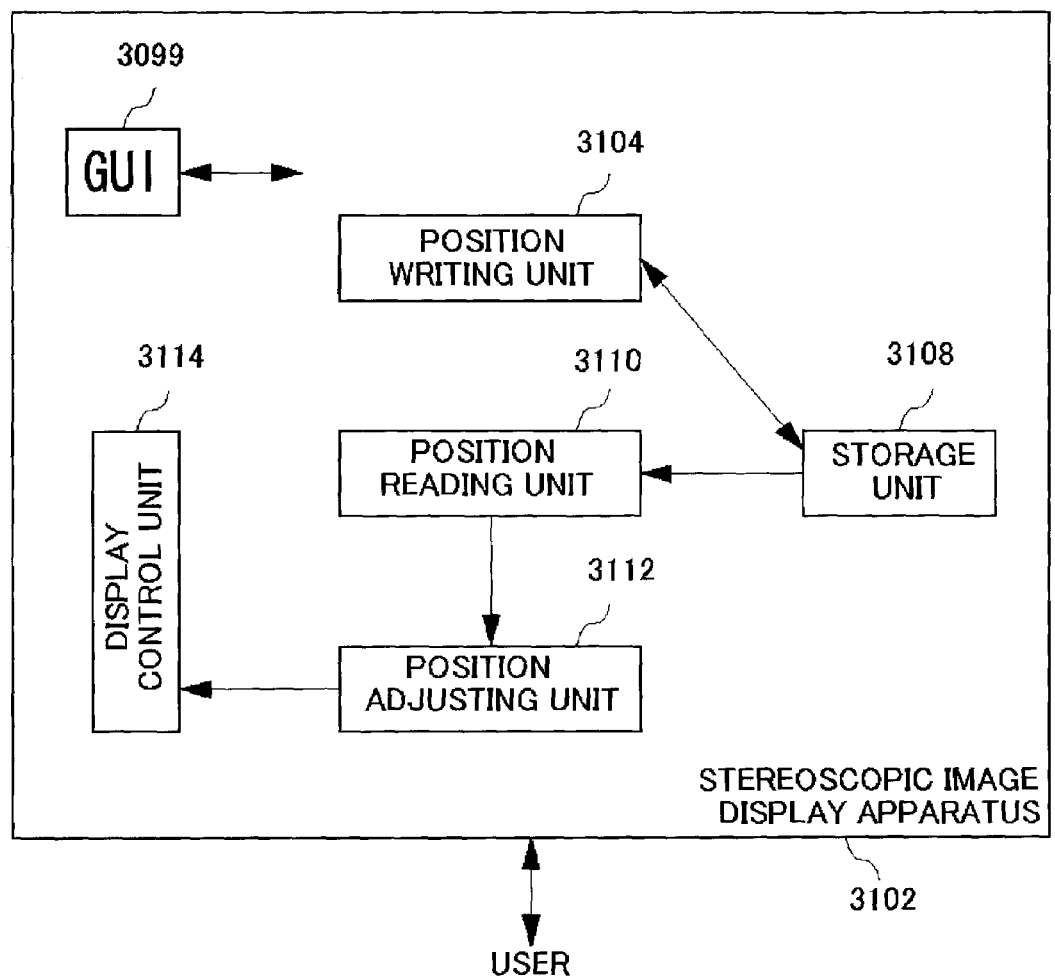
FIG. 23 shows a stereoscopic image display apparatus according to the fourth embodiment.

FIG. 23 shows a stereoscopic image display apparatus 3102 to realize the above-mentioned functions. The stereoscopic image display apparatus 3102 includes a position writing unit 3104 which obtains window information such as the display position and the size of the viewer 3010, and saves it as a proper position into a storage unit 3108, a position reading unit 3110 which reads out the proper position saved in the storage unit 3108 in response to an instruction from a user, a position adjusting unit 3112 which moves the viewer 3010 to the proper position read out, a display control unit 3114 which displays the viewer 3010 in the proper position, and a GUI (Graphical User Interface) 3099 which receives instructions from a user.

This structure can be realized by hardware, such as a CPU, memory and other LSIs of arbitrary computers, or by software, such as a program or the like loaded in the memory, which has a function of adjusting an image position. In the figure, however, functions only, which are realized by combination of such hardware and software, are shown in blocks. Thus, it should be understood by those skilled in the art that these functional blocks can be realized by various modes such as hardware only, software only or a combination thereof.

Figure 24:
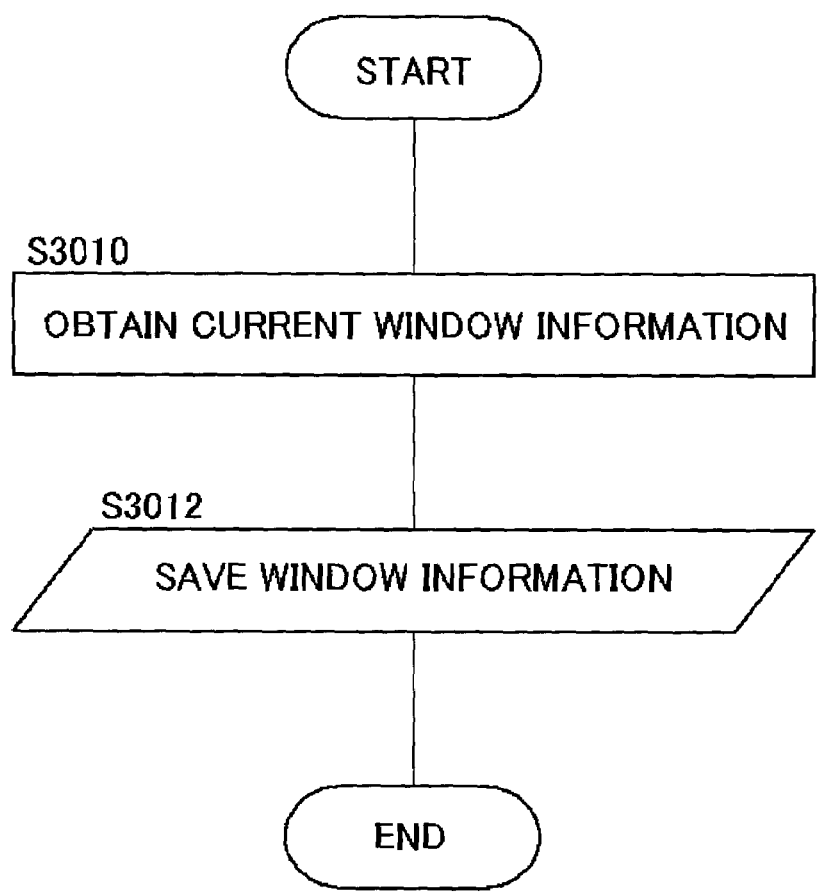
FIG. 24 is a flowchart showing a process of saving window information.
Figure 25:
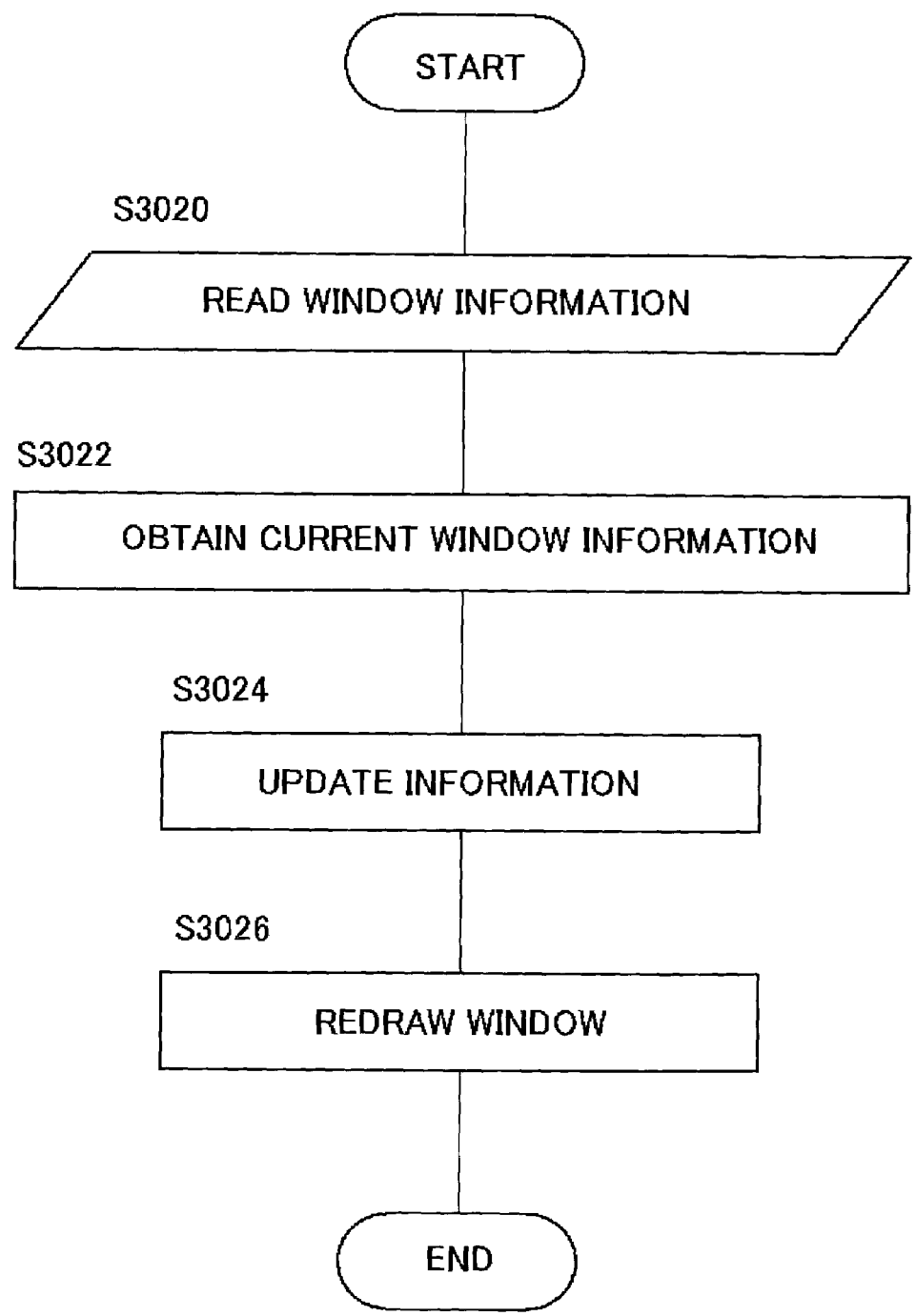
FIG. 25 is a flowchart showing a process of reading in window information.

The processes by this configuration of the stereoscopic image display apparatus 3102 is explained according to the flowcharts of FIG. 24 and FIG. 25. FIG. 24 is a flowchart showing a process of saving the window information. When a user presses down the button 11, the window information is obtained by the position writing unit 3104 (S3010). Moreover, the obtained information is updated in the initial file of the viewer 3010 and saved into the storage unit 3108 (S3012).

FIG. 25 is a flowchart showing a process of reading in the window information. The position reading unit 3110 reads the saved window information (S3020), and then obtains the current window information (S3022), and updates the information in case of necessity (S3024). According to the updated information, the position adjusting unit 3112 adjusts the position of the viewer 3010 and redraws the viewer 3010 with a multiplex image (S3026).

According to Embodiment 4 described thus far, even if the position of the multiplex image to the parallax barrier goes wrong, the multiplex image can be moved to a proper position without any troublesome adjustment task of the user. Furthermore, when another new multiplex image is displayed, the image can be readily displayed in a proper position.

Embodiment 5

Some problems to be overcome are first described. It is herein assumed that a multiplex image is displayed inside a window whose position and size can be freely changed. The relationship between the multiplex image and the parallax barrier is closely related to the viewing position of a user, and therefore if a stereoscopic image is out of a proper position, the relation can break.

Figure 26:
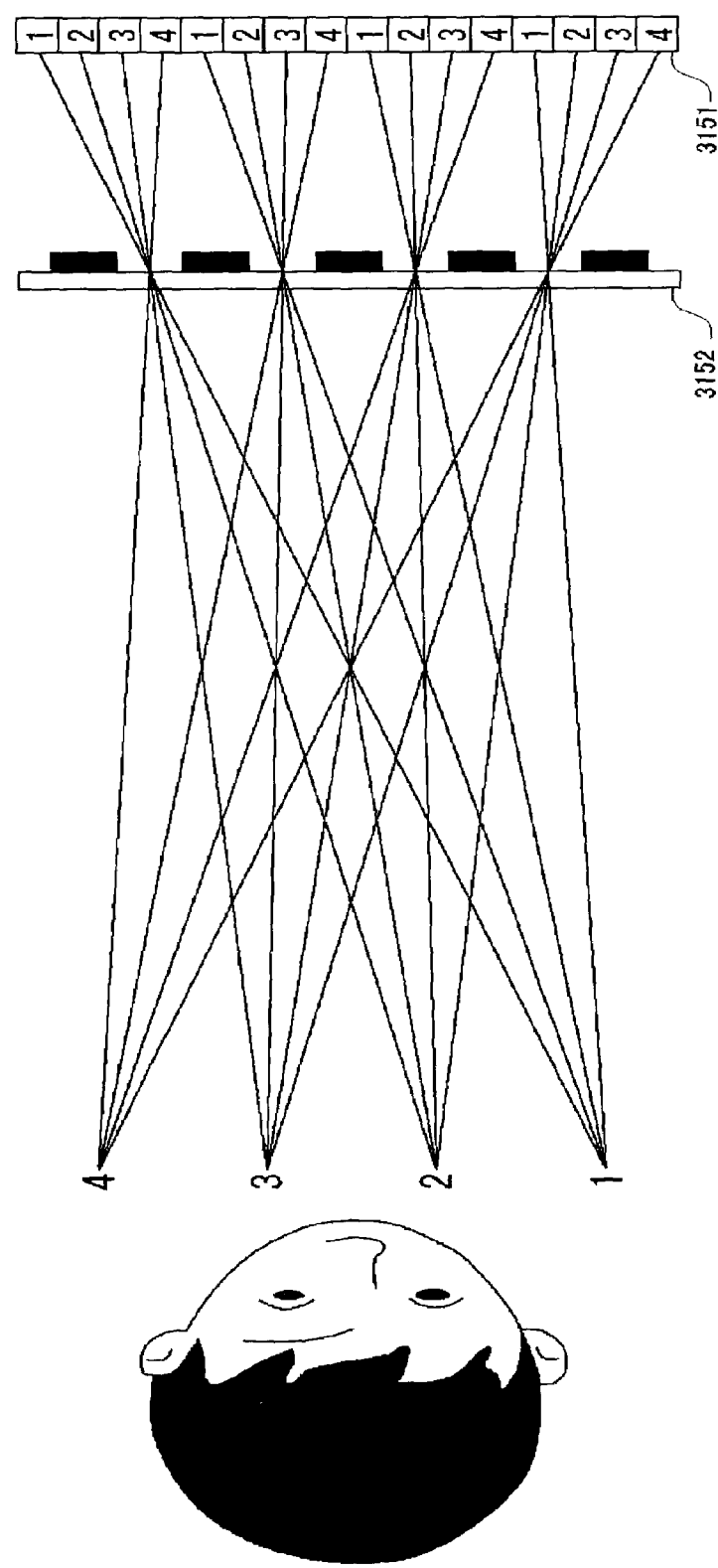
FIG. 26 shows a relationship between an observer, and a multiplex image and a parallax barrier which are in a proper position.
Figure 27:
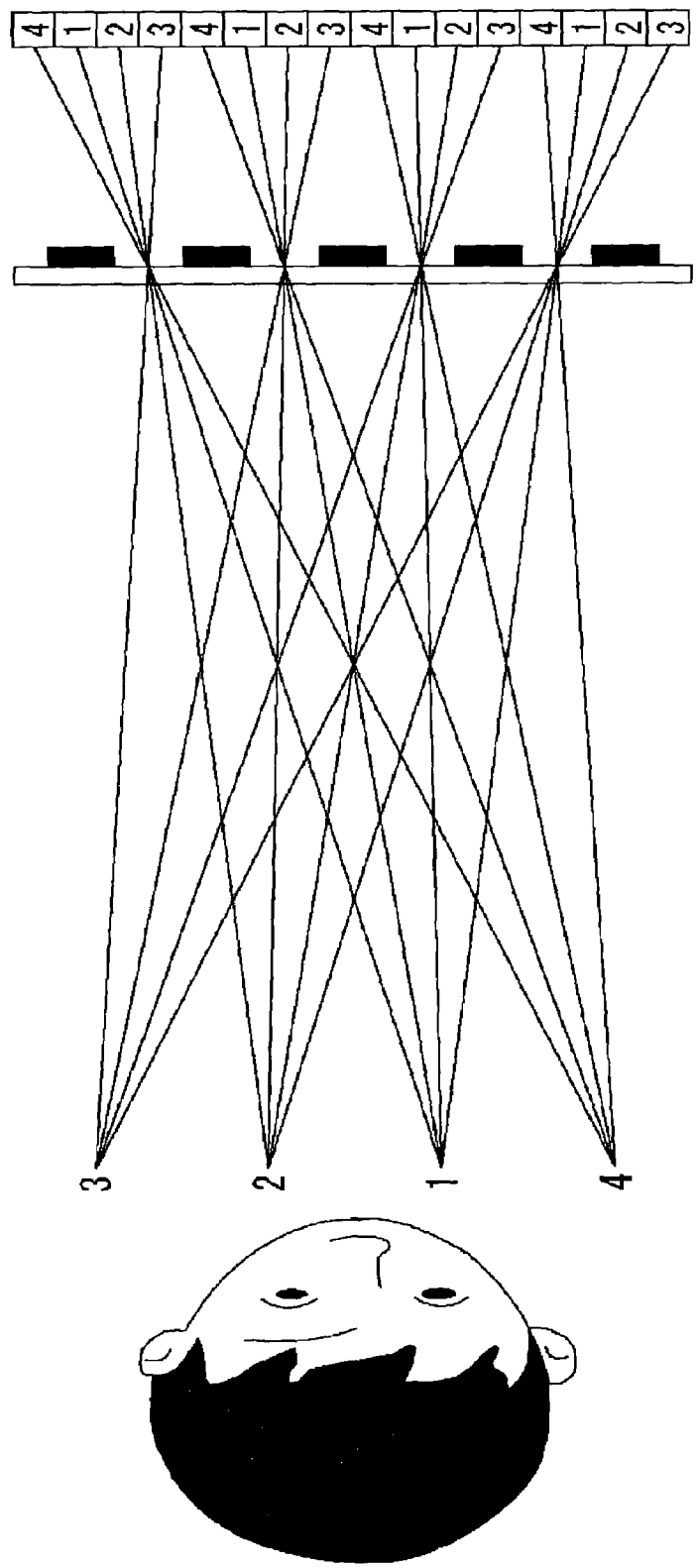
FIG. 27 shows a relationship between an observer, and a multiplex image and a parallax barrier which are not in; a proper position.
Figure 28:
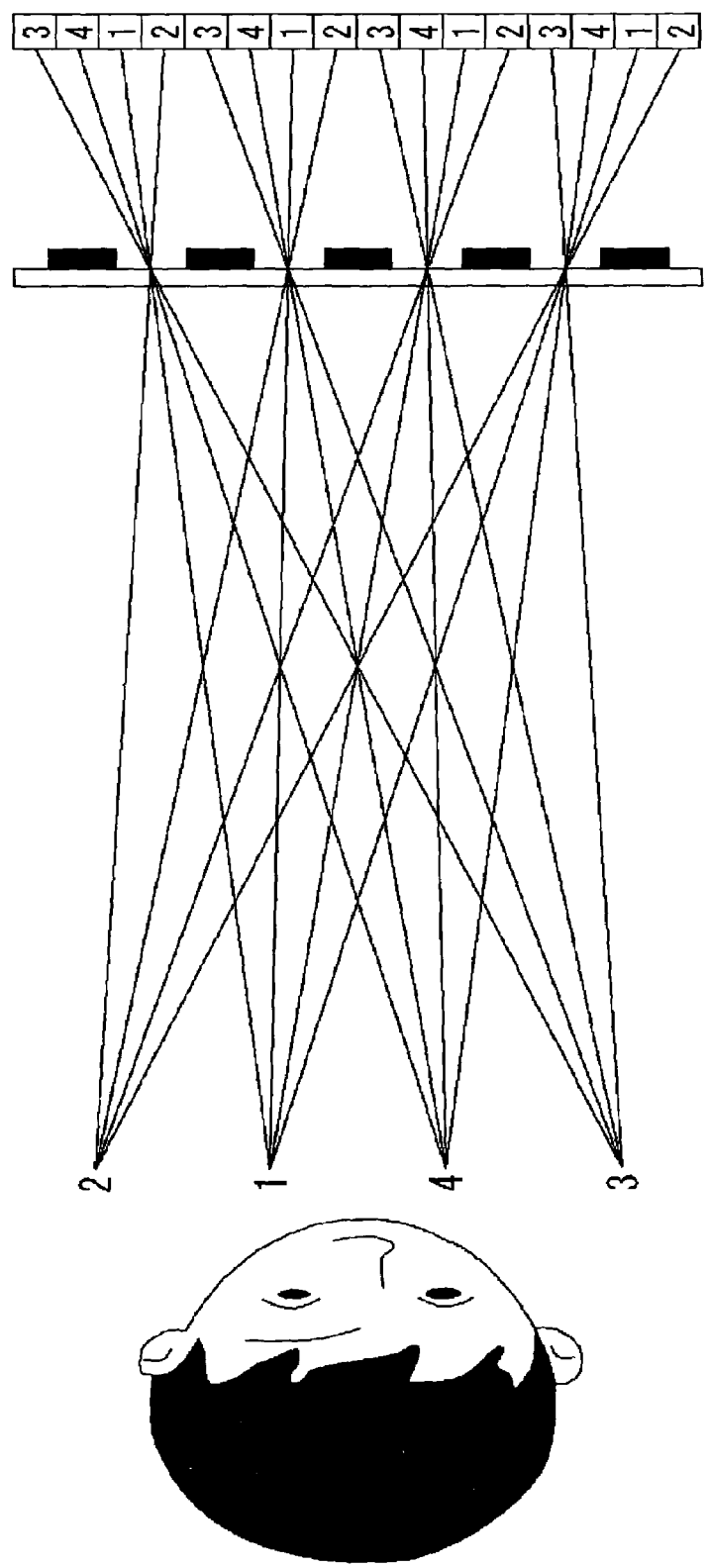
FIG. 28 shows a relationship between an observer, and a multiplex image and a parallax barrier which are not in a proper position.

FIGS. 26, 27 and 28 show the relationship between a multiplex image 3151, a parallax barrier 3152, and an observer. The multiplex image 3151 is composed of four kinds of parallax images, which are the first to the fourth ones. Each rectangle indicates a dot and the assigned numerals 1 to 4 correspond to the parallax image number. Namely, it means that for the dots to which "1" is assigned, the dots of the first parallax image are used, and likewise for the dots to which "2" is assigned, the dots of the second parallax images are used. Hereinafter, the dot of the multiplex image, for which the dot of the n-th parallax image is used, is also simply called "dot n".

Now let the number of the parallax images be 4, the dot pitch P, and n an integer. In FIG. 26, if a shift amount of the image is P multiplied by 4n, there is a possibility that the edge of the image cannot be stereoviewed but any serious problem does not arise, however, in the other cases a relation with the user position greatly breaks. That is to say, only if a pair of the parallax images is either of (4,3), (3,2), (2,1), the user can view the stereoscopic image.

If the shift amount is P multiplied by (4n+1) or P multiplied by (4n+3), as shown in FIG. 27, in the case of the front position where the pair of the parallax images is (2,1), the user can view the stereoscopic image, however if the user moves into either a right or a left direction, the user will be soon in a cross view position. If the shift amount is P multiplied by (4n+2), an optimal position is a cross view position, as shown in FIG. 28.

Since the dot pitch of a standard liquid crystal panel is about 0.1 millimeter as mentioned earlier, it is difficult to adjust the window position by a dot unit by a mouse operation. Even if a mechanical fine adjustment function is provided with the parallax barrier, such a fine adjustment is time-consuming.

Moreover, even if this kind of adjustment is once completed and the stereoscopic image becomes visible, it is troublesome for the user to adjust a new multiplex image and the parallax barrier each time he/she views another stereoscopic image.

Moreover, since the order in which the n parallax images are arranged and synthesized is not always the same depending on environments of generating the multiplex images, readjustment might need to be made from the beginning, even if another image is displayed in the same region after a proper adjustment is made for one image. If the synthesizing is made in a reverse order, the stereoscopic display could be impossible.

Figure 29:
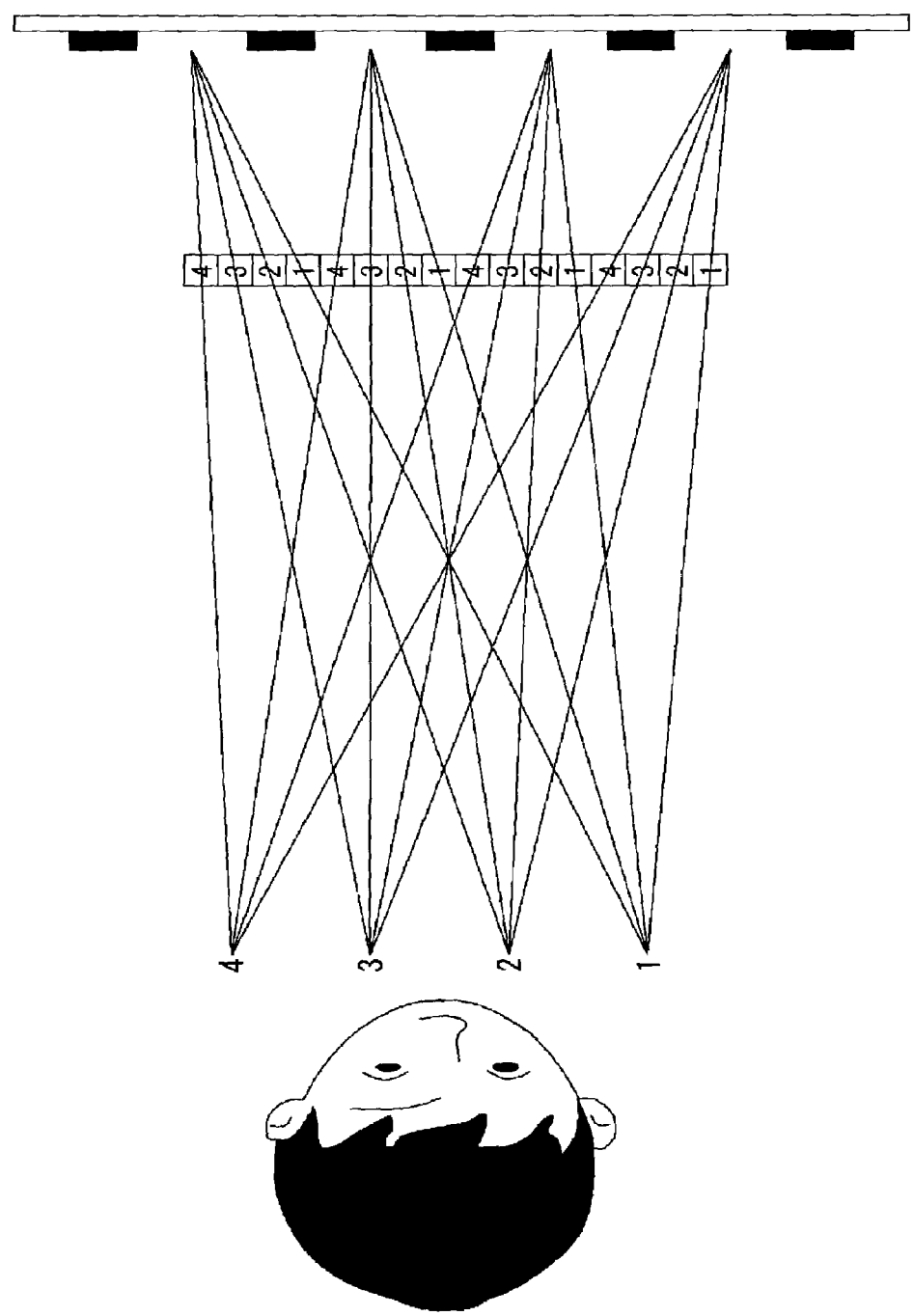
FIG. 29 shows a situation in which a parallax barrier is arranged in the outgoing side of a liquid crystal panel.

It is meant by the reverse synthesizing order that the arrangement of the parallax images are opposite depending on which configuration is used, the configuration of FIG. 29 where the parallax barrier is arranged in the outgoing side of the liquid crystal panel, or the configuration of FIG. 26 where the parallax barrier is arranged in the incoming side, and it is a creator of the image who decides for which configuration the image is generated.

In addition, when the number N of the parallax images is two, it is the creator who decides which parallax image is selected for the first dot column and therefore the selection is not fixed.

A viewer according to Embodiment 5 overcomes the above-mentioned problems. This viewer also has a function of internally moving the multiplex image properly.

Figure 30:
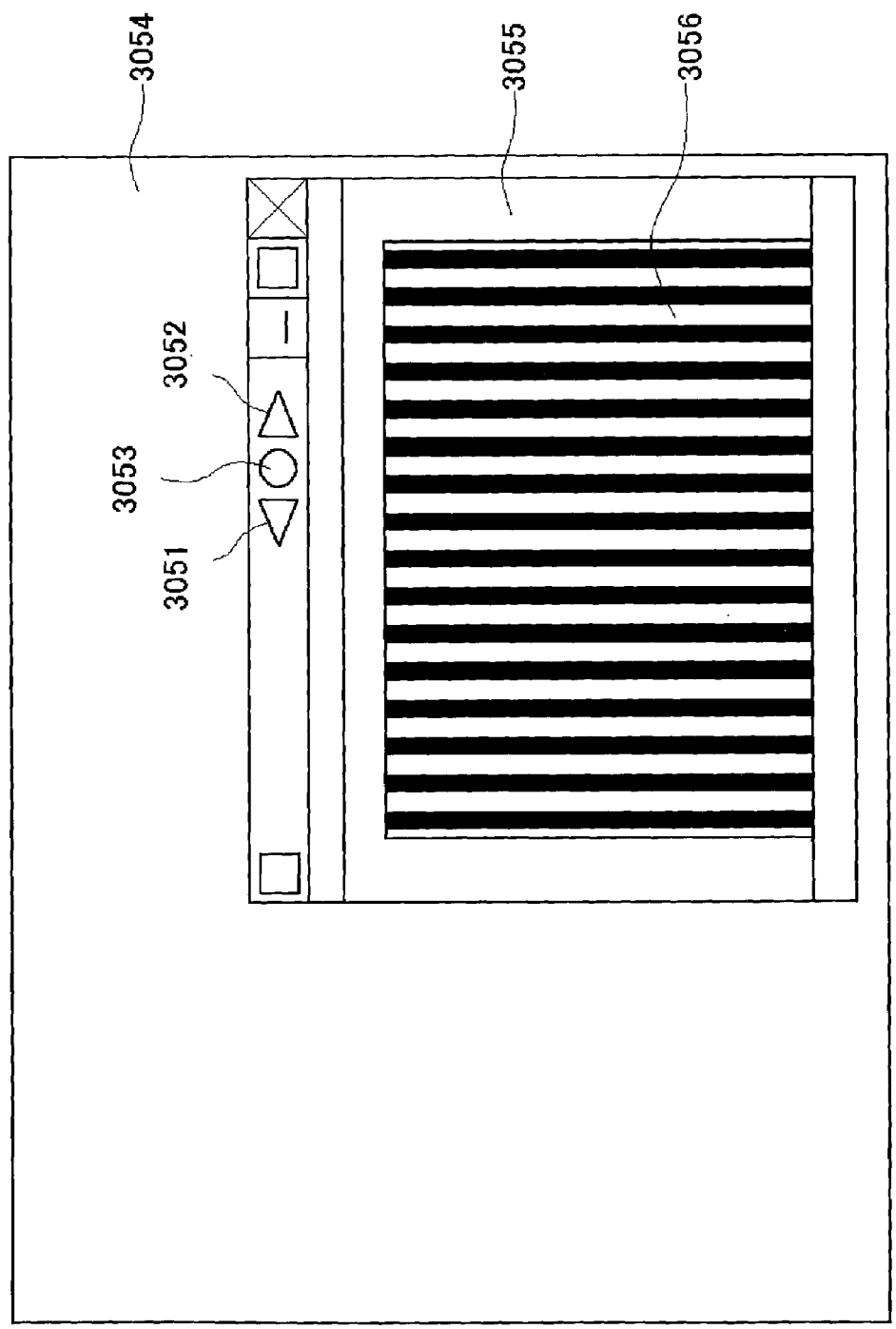
FIG. 30 shows a situation in which a positional relationship between a viewer and a parallax barrier according to the fifth embodiment is adjusted.
Figure 31:
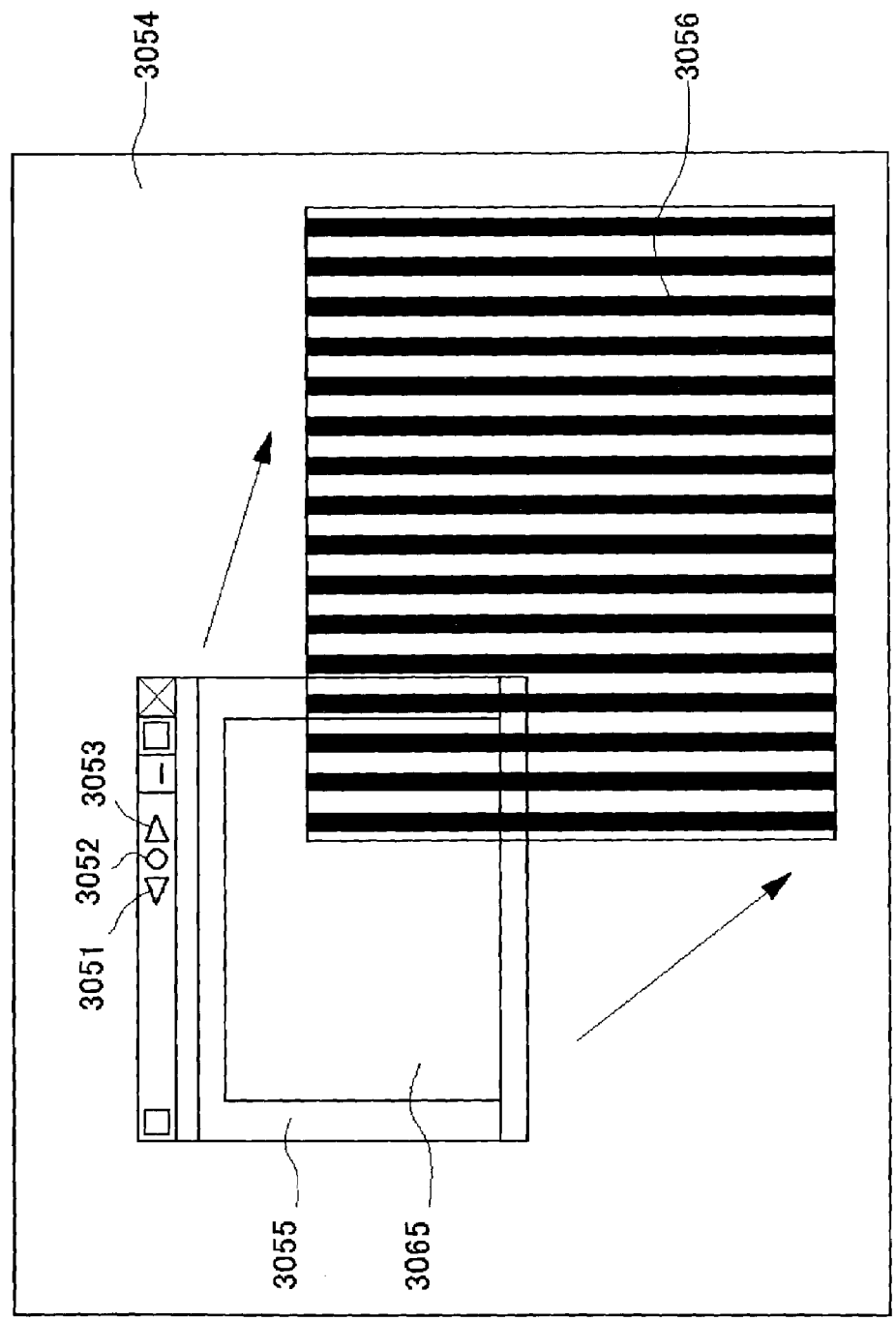
FIG. 31 shows a situation in which a positional relationship between a viewer and a parallax barrier according to the fifth embodiment goes wrong.

FIG. 30 shows a viewer 3055 which displays a multiplex image on an LCD 3054 and a parallax barrier 3056 which is stuck on the part of the LCD 3054. Three buttons 3051, 3052 and 3053 are arranged on the viewer 3055. In the viewer 3055, a multiplex image with four viewpoints is displayed, in which four kinds of parallax images with some parallax in a horizontal direction are arranged alternately by a dot column unit. The viewer 3055 can be moved from a position 3065 away from the parallax barrier 3056 as shown in FIG. 31 to near a position where the parallax barrier 3056 wraps over, by a mouse operation or the like, and its size can be adjusted.

When the left button 3051 is operated under this condition, as shown in FIG. 32a, by a built-in program every four dots are made into one group in an image display region 3032a in the viewer 3055 and the dot sequence in each group is shifted to the right by a dot and an overflowing dot is arranged to the left end of the group, and thus the image region 3032a becomes from an initial state 3031 to an adjusted state 3311a. Thereby, the region where a stereoscopic image is visible from the viewing position shifts to the left by one region.

Moreover, when the right button 3052 is operated, by the built-in program a reverse process is applied and the image region 3032a becomes from the initial state 3031 to an adjusted state 3312a. Thereby, the region where a stereoscopic image is visible from the viewing position shifts to the right by one region. Thus, whenever one dot is shifted, the region where a stereoscopic image is visible shifts one-by-one. Unlike the shift within one group, the image display region 3032b as a whole may uniformly shift in the same direction so as to become an adjusted state 3311b or 3312b as shown in FIG. 32b, when the buttons are operated.

In a color liquid crystal panel, one pixel is composed of three dots divided in a horizontal direction in a color of red (R), green (G) or blue (B).

Figure 33A:
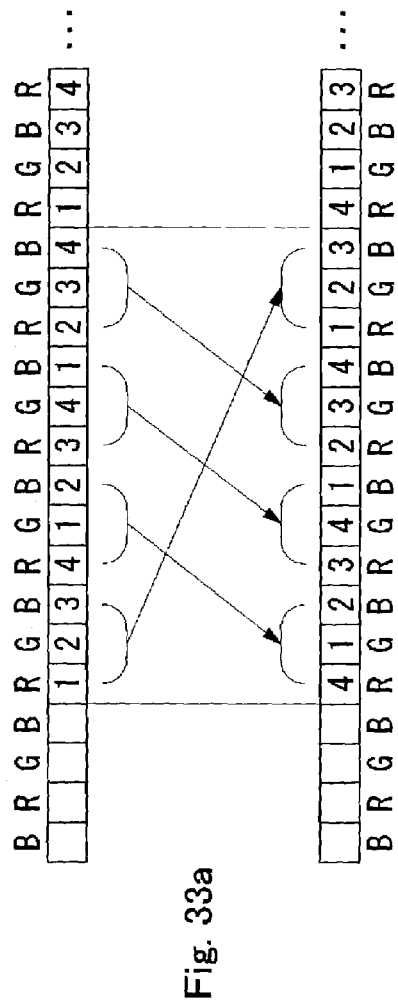
FIGS. 33a and 33b show two examples of a method for shifting an image display region by three dots.
Figure 33B:
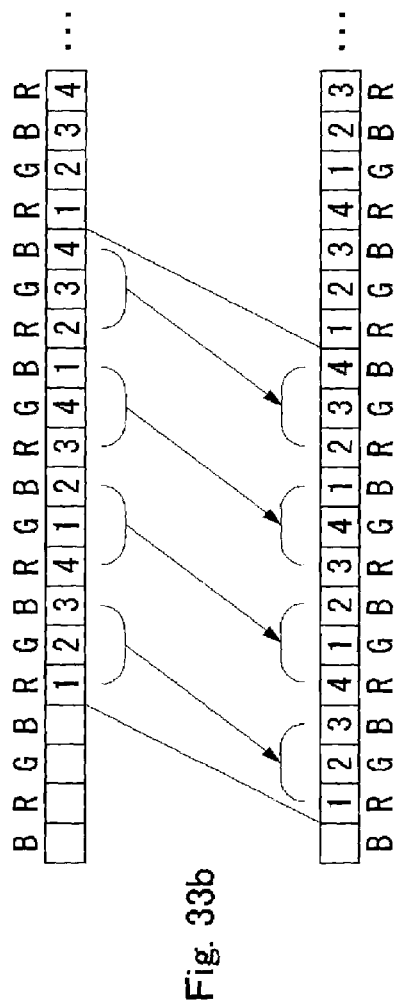

In order to represent a pixel for each of four kinds of parallax images, a total of 12 (=4×3) dots are required. In a normal image display process, a pixel is considered as the minimum unit, however, an optimal stereoscopic display is realized by exchanging dots between the pixels. For this reason, 12 dots may be handled as one group and the order in each group may be changed by a pixel unit, herein a unit of three dots of RGB, as shown in FIG. 33a. Moreover, the image display region as a whole may be shifted by a unit of the three dots, as shown in FIG. 33b. In this case, the region, where a stereoscopic image is viewed, shifts by three regions with a single button operation. In other words, for instance, the dot displayed on a certain position changes from "dot 1" to "dot 4".

Figure 34A:
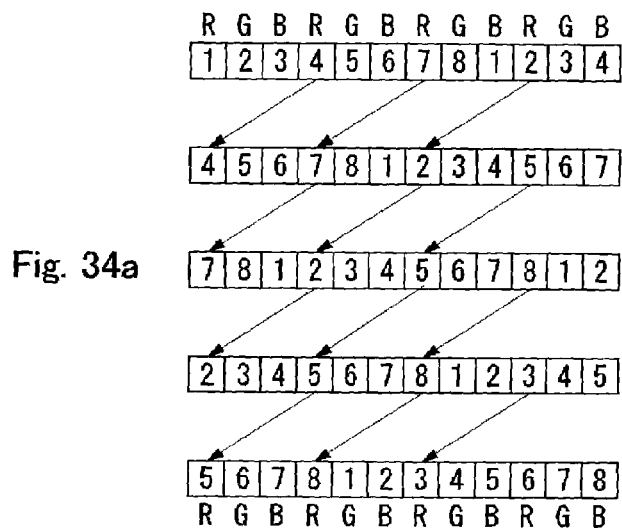
FIGS. 34a and 34b illustrate how an image display region is shifted in the case of eight viewpoints.

In case that the number of the viewpoints is eight, for instance, when the dot for which the number of the first region is 1 is considered, the number changes as 1, 4, 7, 2, 5, 8, 3, 6 and so on, as shown in FIG. 34a. In this case, the number of the pixels shifted from the initial state is 0, 1, 2, 3, 4, 5, 6, 7 and so on.

Figure 34B:
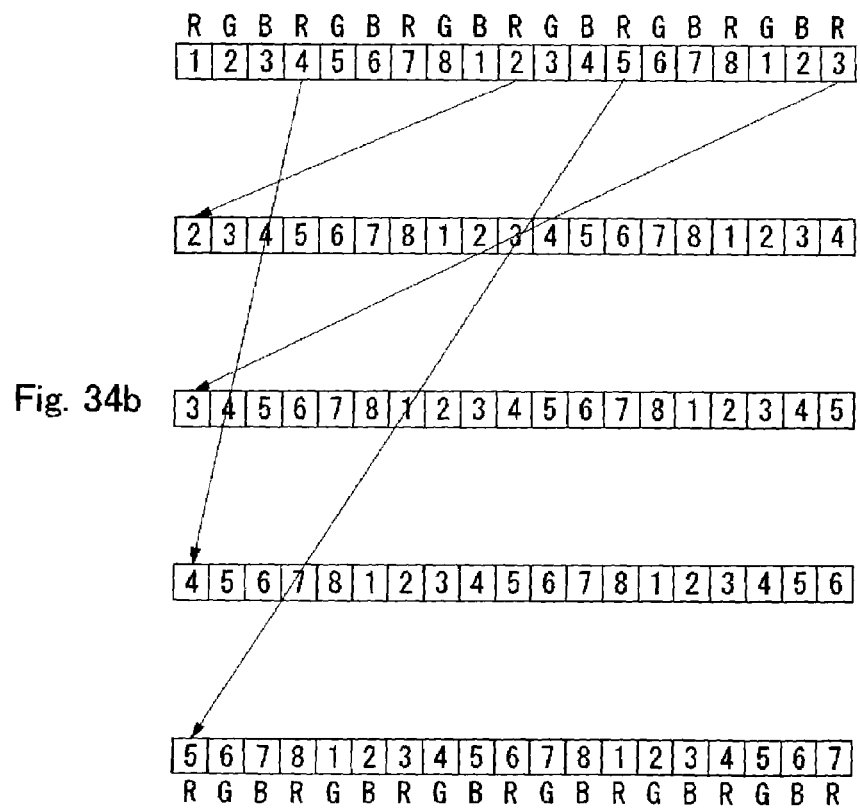

Thus the shift is made for every three regions by a single operation, however, the shift may be made for every one region by a single operation. As shown in FIG. 34b, the dot on the left end is "dot 1" in a color of R. In order to move one region, it is necessary that the dot on the left end is "dot 2" in a color of R. Therefore, in this case, if the number of pixels to be shifted from the initial state for every operation is made every three pixels such as 0, 3, 6, 1, 4, 7, 2, 5 and so on, the region number on the left end changes as 1, 2, 3, 4, 5, 6, 7, 8 and so on. The same procedure can be made for the different number of the parallax images.

Figure 35A:
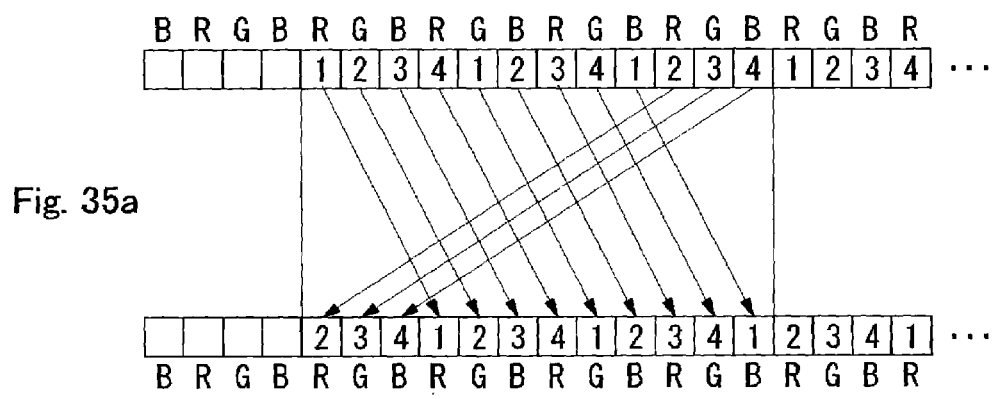
FIGS. 35a and 35b illustrate how an image display region is shifted.
Figure 36:
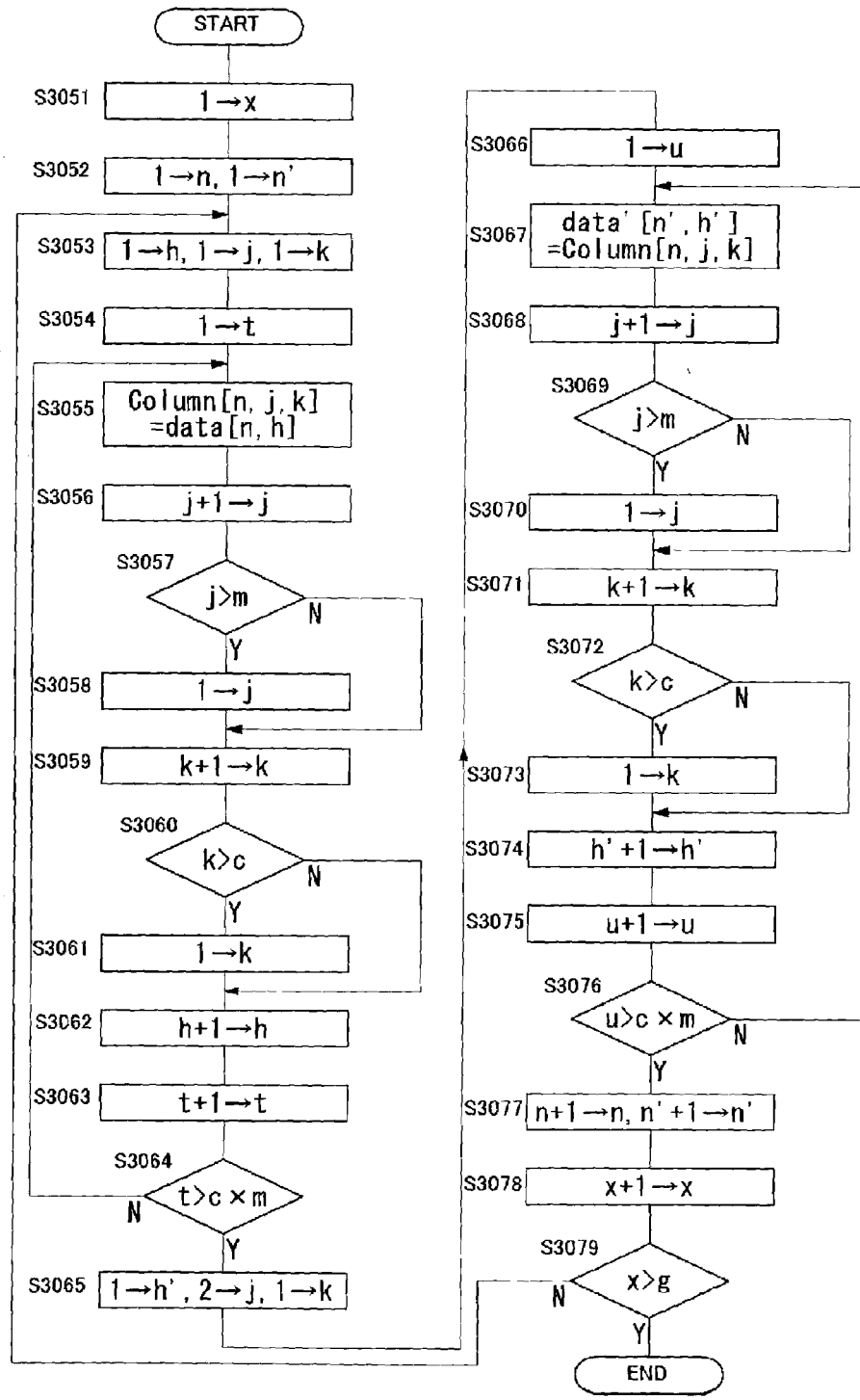
FIG. 36 is a flowchart showing a process of shifting the region where a stereoscopic image is visible to the right by one region.

Moreover, as shown in FIG. 35a, 12 dots are handled as one group and they may be shifted by a process shown in FIG. 36.

FIG. 36 is a flowchart showing a process of shifting the region, where a stereoscopic image is observed, to the right by one region. Let g be the number of the group, m the number of the parallax images, c the number of dots forming one pixel, let data[n,h] be brightness information of the h-th dot in a group n, and let data'[n', h'] be brightness information of the h'-th dot in a new group n'. Column[n,j,k] is used for temporarily storing the brightness information of the image before shifting, along with the parallax image number and RGB information, and generating new image data after shifting. For instance, m=2 for a two-viewpoint type or in the case of two parallax images, and m=4 for a four-viewpoint type, and c=3 for an LCD in which one pixel is composed of three dots of RGB.

Firstly a variable x is initialized to be 1 (S3051). Next variables n and n' are initialized to be 1 (S3052). Likewise, variables h, j and k are initialized to be 1 (S3053), and variable t is also initialized to be 1 (S3054). Next, The value of the brightness information data[n,h] is assigned to Column[n,j,k] (S3055). The variable j is incremented by 1 (S3056), and if the incremented variable j is more than m (Y of S3057), the variable j becomes 1 (S3058). The variable j is not more than m (N of S3057), the variable j remains unchanged. Next, the variable k is incremented by 1 (S3059). If the variable k is more than c (Y of S3060), the variable k becomes 1 (S3061). If the variable k is not more than c (N of S3060), the variable k remains unchanged.

Next, the variable h is incremented by 1 (S3062), and the variable t is also incremented by 1 (S3063). If the variable t is not more than cm (N of S3064), the procedure returns to the step S3055 and the steps S3055 to S3063 are repeated. If the variable t is more than cm (Y of S3064), the procedure goes to the next step S3065. By repeating the steps S3055 to S3063, the brightness information of one group of the image before shifting becomes data with the parallax image number and RGB information. Then the variable h' and the variable k is initialized to be 1 and the variable j to be 2 (S3065). The variable u is initialized to be 1 (S3066). The value of Column[n,j,k] is assigned to data'[n',h']. Then the variable j is incremented by 1 (S3068). If the variable is more than m (Y of S3069), the variable j becomes 1 (S3070). If the variable j is not more than m (N of S3069), the variable j remains unchanged.

Next, the variable k is incremented by 1 (S3071). If the variable k is more than c (Y of S3072), the variable k becomes 1 (S3073). If the variable k is not more than c (N of S3072), the variable k remains unchanged. Then the variable h' is incremented by 1 (S3074). The variable u is incremented by 1 (S3075). If the variable u is not more than cm (N of S3076), the procedure returns to the step S3067 and the steps S3067 to S3075 are repeated. If the variable u reaches the value of cm (Y of S3076), the procedure goes to the next step S3077. By repeating the steps S3067 to S3075, the brightness information of one group of the image after shifting is generated. Next, the variables n and n' are incremented by 1 (S3077). The variable x is incremented by 1 (S3078). If the variable x is not more than g or the number of the groups (N of S3079), the procedure returns to the step S3053 and the steps S3053 to S3078 are repeated. If the variable x is more than g (N of S3079), the procedure ends.

Figure 35B:
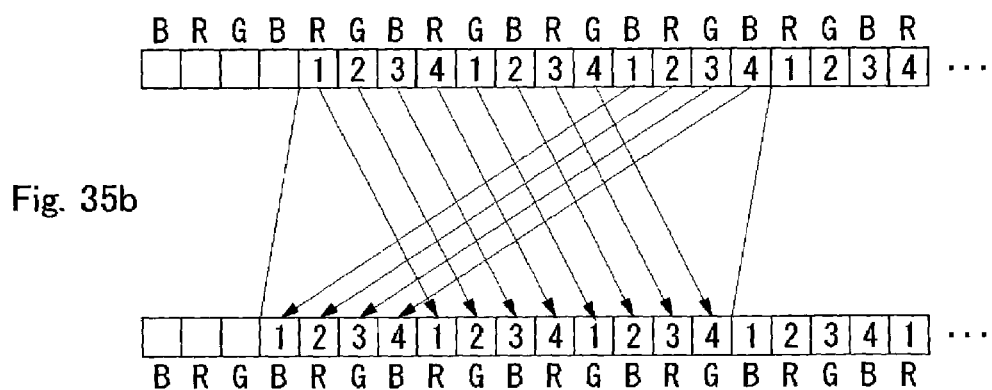

As shown in FIG. 35b, the whole image display region may shift by a pixel unit. In this case, stereoscopic image information and window background information can mix together by a pixel unit in the pixels around the image display region, however, the occurrence of unnatural color can be prevented by setting the window background to be colorless. It might be considered as a method that the pixels in which such information can mix are not displayed on the screen.

The shift amount of the region where a stereoscopic image is observed by a single operation may be not only a region unit, but also more regions. In the latter case, the shift amount of dots in a group becomes a value other than 1.

Figure 37:
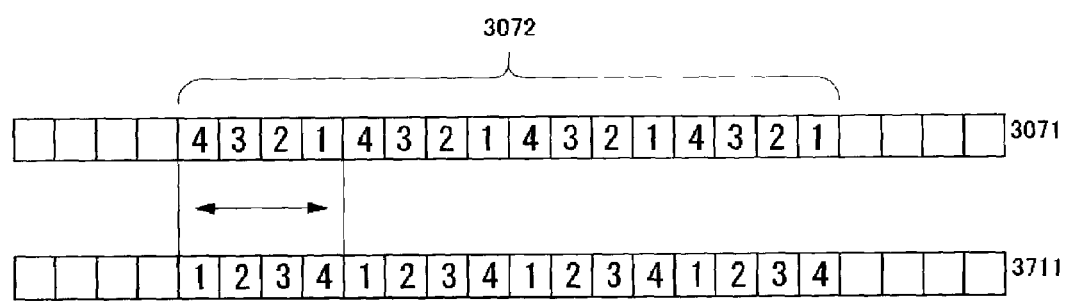
FIG. 37 illustrates how an image display region is shifted.

Furthermore, when the middle button 3053 of FIG. 30 is operated, by the built-in program the sequence of four adjacent dots as one group in an image region 3072 on the window becomes in a reverse order, and the synthesizing order (4, 3, 2, 1) in an initial state 3071 becomes the synthesizing order (1, 2, 3, 4) in an adjusted state 3711, as shown in FIG. 37. By the reversion of the dot sequence, the order of the region where a stereoscopic image is visible from the view position is reversed. Herein the synthesizing order (1, 2, 3, 4) indicates that the parallax images are arranged alternately dot-by-dot in order from the left to the right, namely one dot from the first parallax image and another dot from the second parallax image and so on, when a multiplex image is synthesized.

Figure 38:
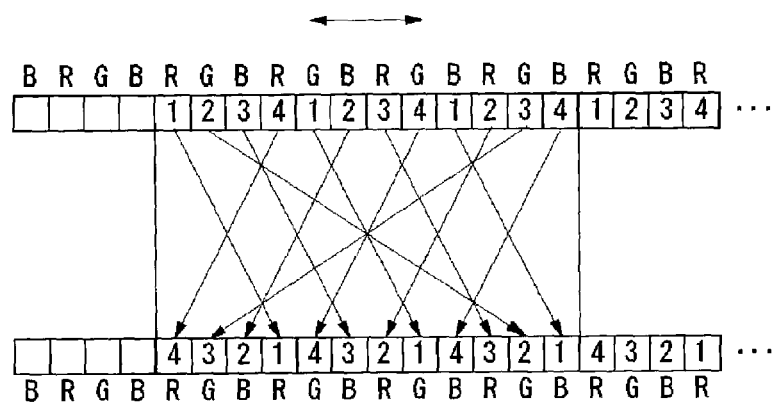
FIG. 38 illustrates how an image display region is shifted.
Figure 39:
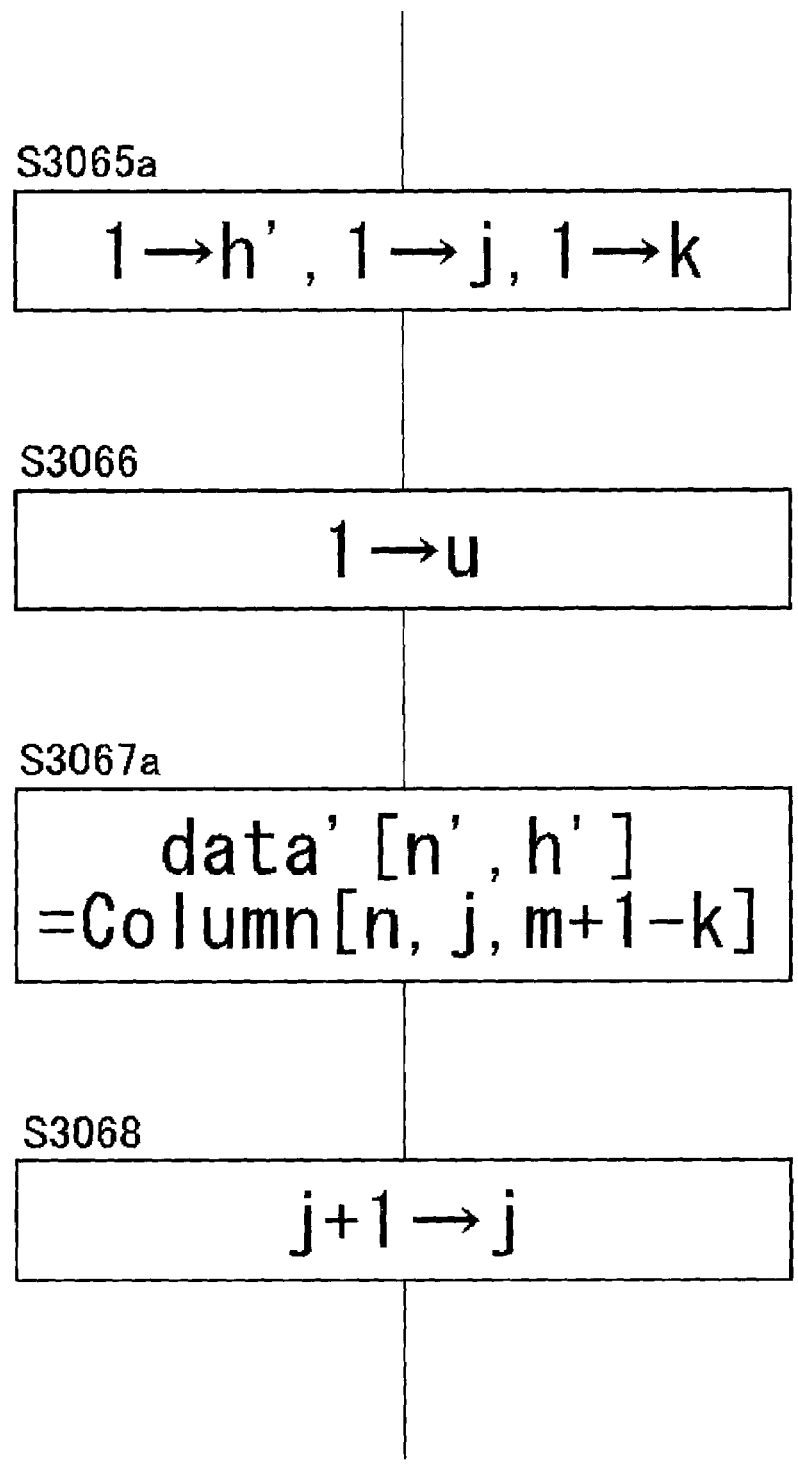
FIG. 39 is a flowchart showing a process in which conversion is applied to 12 dots of an image as one group.

In this case, if a pixel is composed of a plurality of dots, the first RGB dots of four kinds of images are all represented in the first to the twelfth columns, and therefore if the conversion is applied to the 12 dots as one group, the order can be reversed substantially, as shown in FIG. 38. FIG. 39 is a flowchart showing this conversion procedure. It is noted that FIG. 39 shows only the points different from FIG. 36.

The step S3065 of FIG. 36 is changed to the step S3065a, and the step S3067 of FIG. 36 to the step S3067a. As a result of this change, while the flowchart of FIG. 36 shows the process of shifting the region where a stereoscopic image is observed to the right by one region, the flowchart of FIG. 39 shows the process of reversing the order in which the parallax images are synthesized.

By the processes shown in FIG. 36 and FIG. 39, the horizontal shift and the horizontal reversion of the region where a stereoscopic image is visible are conducted. Moreover, the vertical shift and the vertical reversion of the region where a stereoscopic image is visible are likewise conducted. Therefore, by repeating these operations, the relationship between the stereoscopic image and the parallax barrier is rendered optimal and the region where the stereoscopic image is visible becomes in a proper position.

Figure 40:
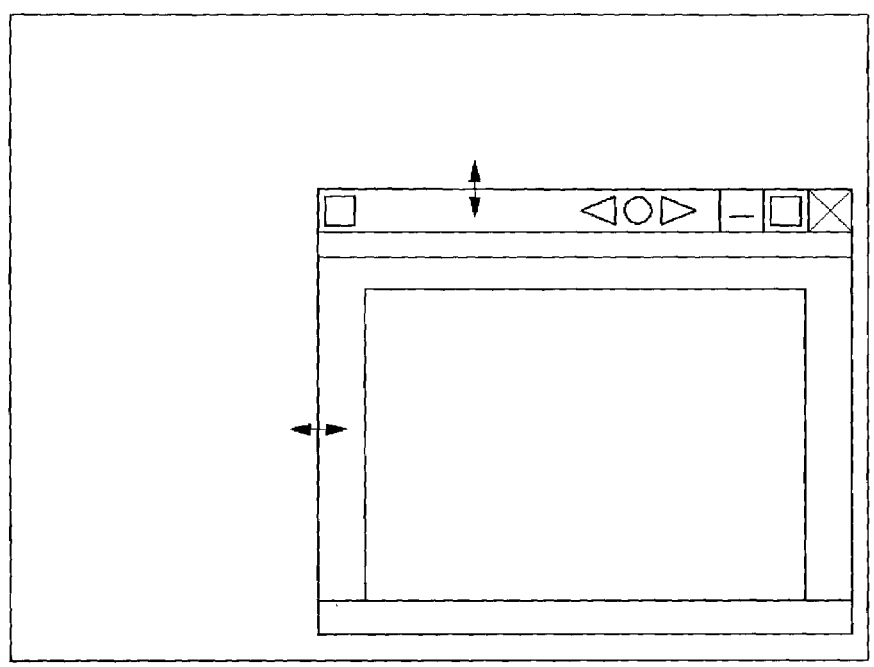
FIG. 40 illustrates how the position of a window having an image display region is moved by a pixel unit or by a dot unit.
Figure 41:
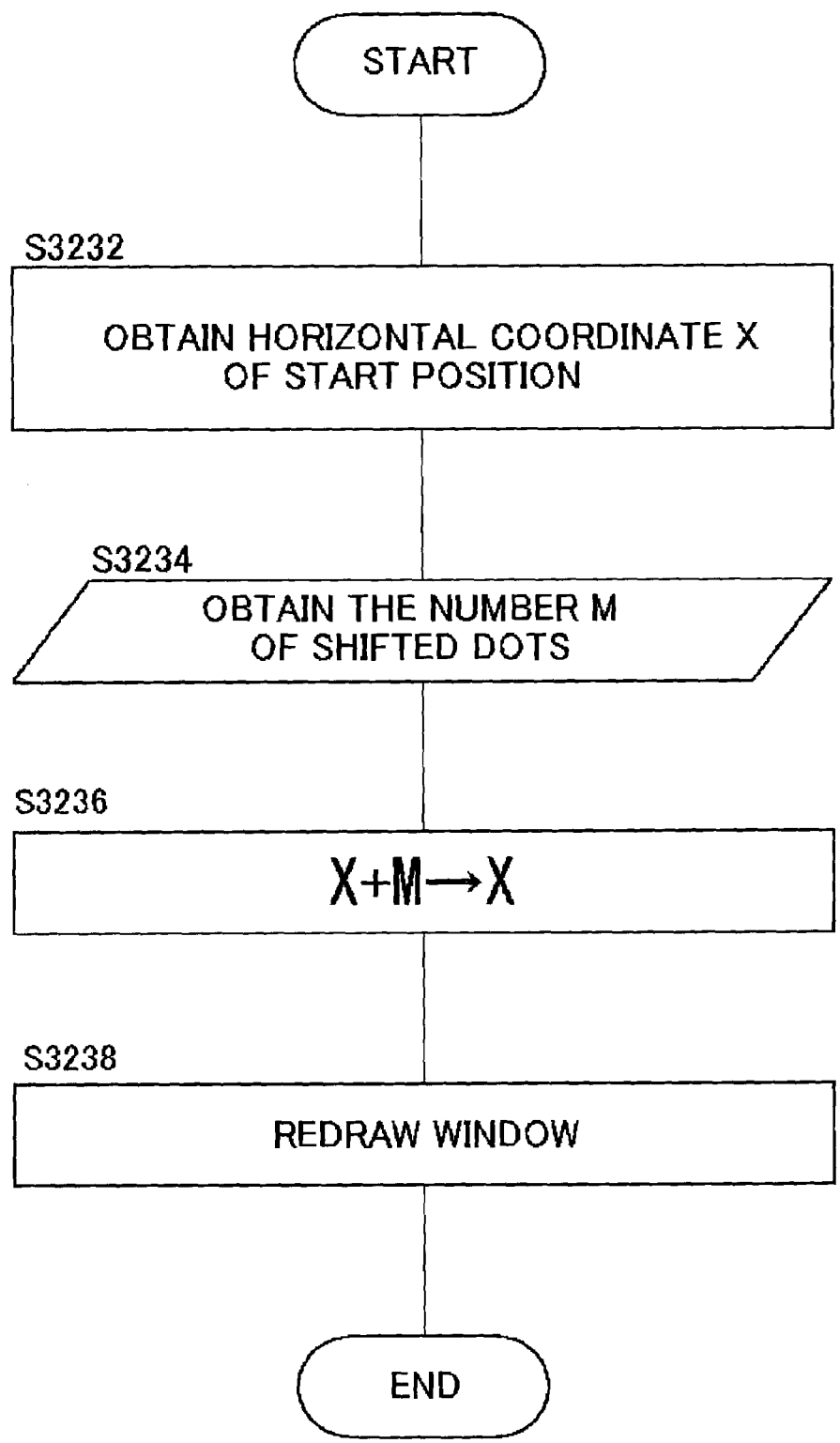
FIG. 41 is a flowchart showing a horizontal shift process.

The operation of the horizontal or vertical shift may be conducted by moving the position of the window having the image display region by a pixel unit or by a dot unit, as shown in FIG. 40. FIG. 41 shows a flowchart of the horizontal shift process. First, the horizontal coordinate X of the start position of the window is obtained (S3232). Next, the number M of dots to be shifted is obtained (S3234). The horizontal coordinate X added by the number M of dots to be shifted is assigned to the horizontal coordinate X of the start position of a new window (S3236). Finally, a new window is drawn (S3238).

The shift of the window may be made by a unit of three dots and the shift of the effective display region may be made by a dot unit, and by the combining of them, if the effective display region is shifted by three dots for instance, the window frame may be shifted by three dots without any change in the position of the effective display region, so that the position of the effective display region in the window can be controlled to be always optimal. As a matter of course, it is possible to change the shift unit of the dots of the image display region or the shift unit of the dots when the window is moved.

Figure 42:
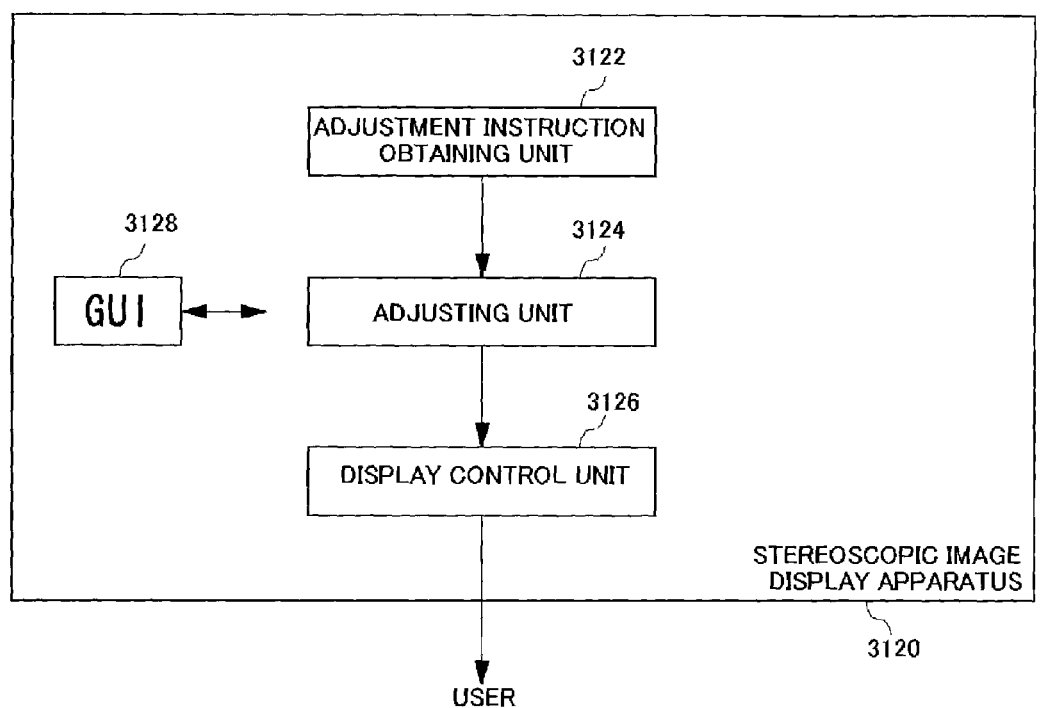
FIG. 42 shows a stereoscopic image display apparatus according to the fifth embodiment.

FIG. 42 shows a stereoscopic image display apparatus 3120 to realize the above-mentioned functions. The stereoscopic image display apparatus 3120 includes an adjustment instruction obtaining unit 3122 which accepts an instruction to adjust a multiplex image from a user, an adjusting unit 3124 which applies an adjustment to the multiplex image according to the instruction, a display control unit 3126 which displays the adjusted multiplex image, and a GUI 3128 which makes it easy to receive instructions from the user.

The adjustment instruction obtaining unit 3122 receives instructions for the above-mentioned processes such as the rearrangement of the image data composing the image, and the process of shifting to a proper position. The adjusting unit 3124 receives such an instruction and conducts a process on the multiplex image.

Embodiment 6

Figure 43A:
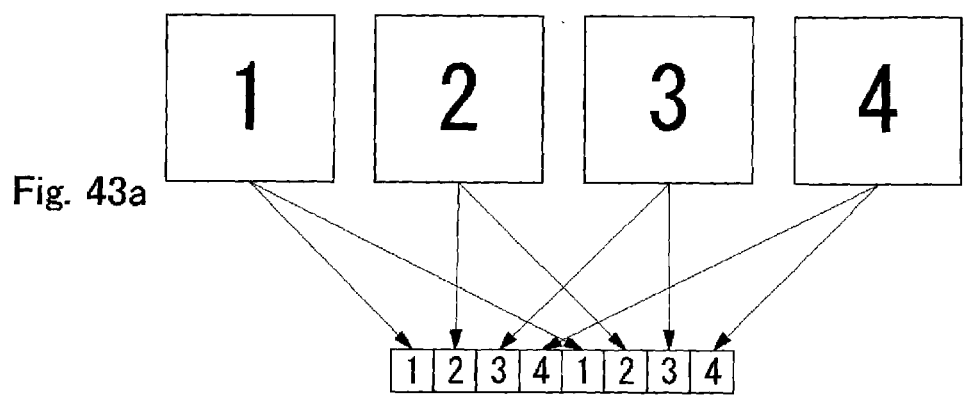
FIGS. 43a and 43b schematically shows a method of composing a multiplex image with four viewpoints.
Figure 43B:
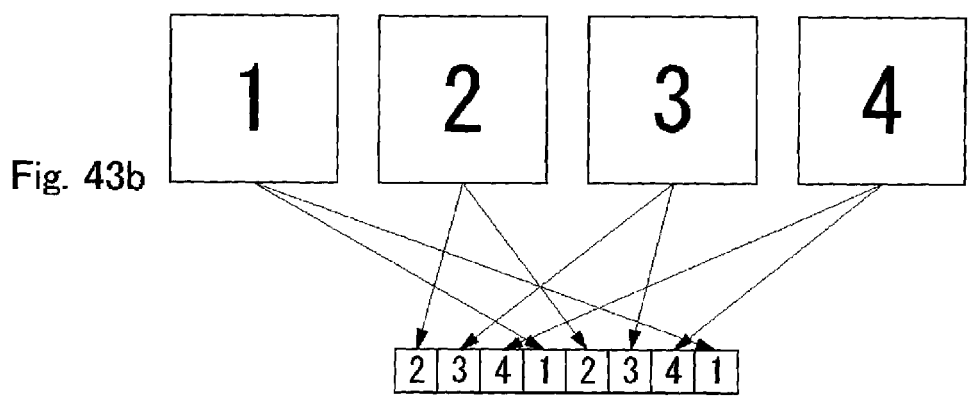

In Embodiment 6, a method for synthesizing parallax images into a multiplex image is described. FIGS. 43a and 43b show this synthesizing method schematically. Software for displaying an image performs a process of synthesizing a plurality of parallax images into a multiplex image and such a program is incorporated that the order of synthesizing in the multiplex image displayed in the window can be changed by a button operation on the window. Namely, if there are the first to the fourth parallax images and the order of synthesizing the images is (1, 2, 3, 4), the synthesizing order is shifted by one and changed to (2, 3, 4, 1) by a button operation. By another button operation, the synthesizing order becomes (4, 1, 2, 3). By repeating such button operations, the synthesizing order can be changed sequentially.

The button operation is conducted by a mouse operation. Every time the synthesizing order is shifted by one, the region where the image is visible at a view position shifts one-by-one. Another button is provided on the window and a program is incorporated to reversely change the state of the synthesized image from the synthesizing order (1, 2, 3, 4) to (4, 3, 2, 1).

By the combination of these two operations, it becomes easier to adjust the image into a proper positional relation. In addition, when another image in which the synthesizing order is different is displayed, readjustment becomes easier.

The operation of reversing the synthesizing order may be conducted by a button prepared for changing the synthesizing order, and the synthesized image may be changed in eight kinds of the synthesizing order (1, 2, 3, 4), (2, 3, 4, 1), (3, 4, 1, 2), (4, 1, 2, 3), (4, 3, 2, 1), (3, 2, 1, 4), (2, 1, 4, 3), and (1, 4, 3, 2).

Figure 44:
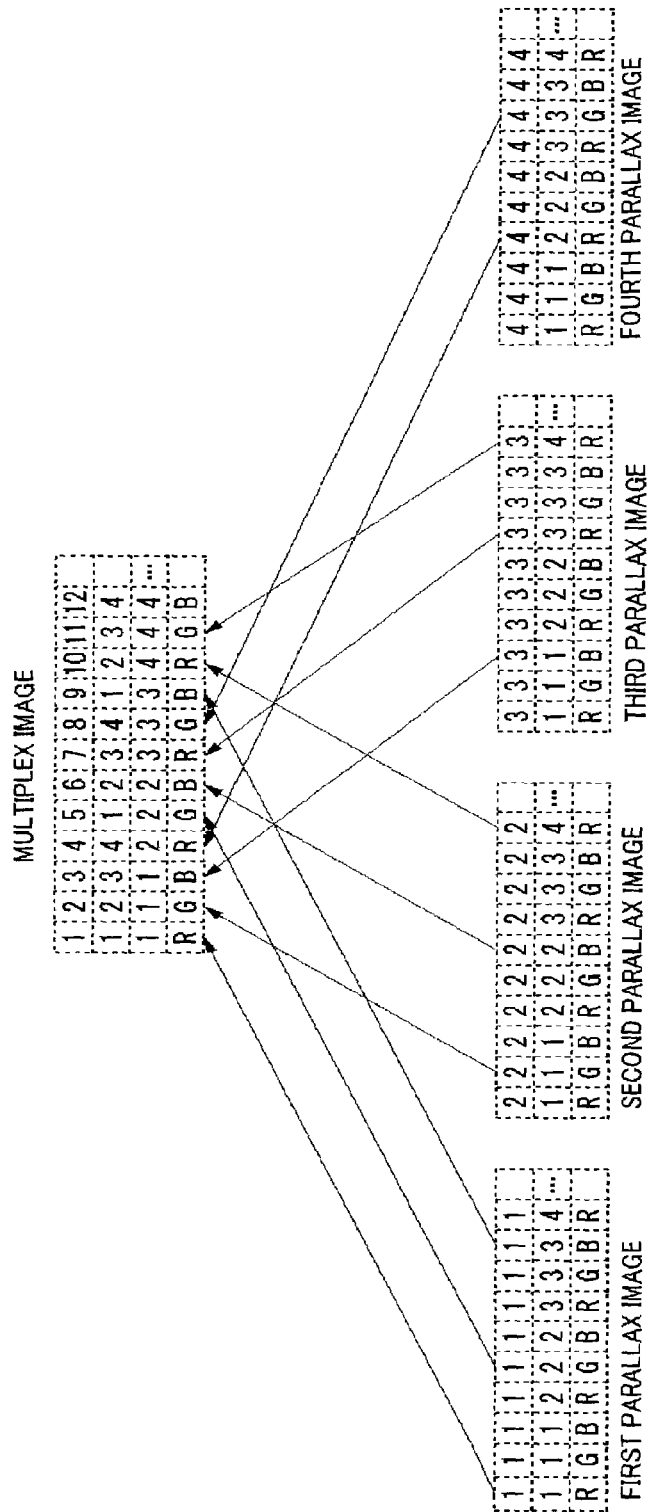
FIG. 44 shows a method of composing a multiplex image with four viewpoints.

If the dots in three colors of RGB compose one pixel as an LCD panel and the first to the fourth parallax images have the same number of dots as the synthesized image, R (red) element of the first column of the first parallax image is selected as the dot of the first column in the synthesizing order (1, 2, 3, 4). This element is represented by 111R, as shown in FIG. 44, the sequence of the dots are represented in the order of 111R, 221G, 331B, 442R, 512G, 622B, 733R, 843G, 913B and so on from the left end. Herein 843G indicates that the dot of the eighth column is selected from G (green) element of the third column of the fourth parallax image. When the synthesizing order changes to (2, 3, 4, 1) by the button operation, the dots to be selected change as 121R, 231G, 341B, 412R, 522G, 632B, 743R, 813G, 923B and so on from the left end. As a result, when the multiplex image is synthesized, one-fourth of each of the parallax images is used. The same is the case with the other states.

For the image in which the first to the fourth images are compressed beforehand in a horizontal direction and which has the same number of the dots as the synthesized image, the dot sequence is in the order of 111R, 221G, 331B, 441R, 511G, 621B, 731R, 841G, 911B and so on from the left end for the synthesizing order (1, 2, 3, 4). When the synthesizing order changes to (2, 3, 4, 1) by the button operation, the dot sequence is arranged in the order of 121R, 231G, 341B, 411R, 521G, 631B, 741R, 811G, 921B and so on. The same is the case with the other states.

In the operation of reversing the order, if the first to the fourth images have the same number of dots as the synthesized image, for the synthesizing order (4, 3, 2, 1) the dot sequence becomes in the order of 141R, 231G, 321B, 412R, 542G, 632B, 723R, 813G, 943B and so on from the left.

On the other hand, for the image which is compressed in a horizontal direction, for the synthesizing order (4, 3, 2, 1), the dot sequence is 141R, 231G, 321B, 411R, 541G, 631B, 721R, 811G, 941B and so on.

It is to be noted that for the two-viewpoint type of stereoscopic display, the shift of the dots, the shift of the window, and the change of the order of the right and the left images have the same effect, and therefore any one of these functions suffice as a stereoscopic display means for the two-viewpoint type.

The above-mentioned operation may be conducted by selecting from a list menu on the window which functions by a mouse operation, or may be conducted by a key operation on a keyboard, by a remote control operation, or by a voice.

The image separating means such as an optical filter may be arranged not only on the part of the screen but also on the whole screen. The stereoscopic display may be conducted not only on the window but also on the whole screen.

The image separating means can be anything having the effect similar to the parallax barrier, such as a lenticular lens or the like.

Figure 45:
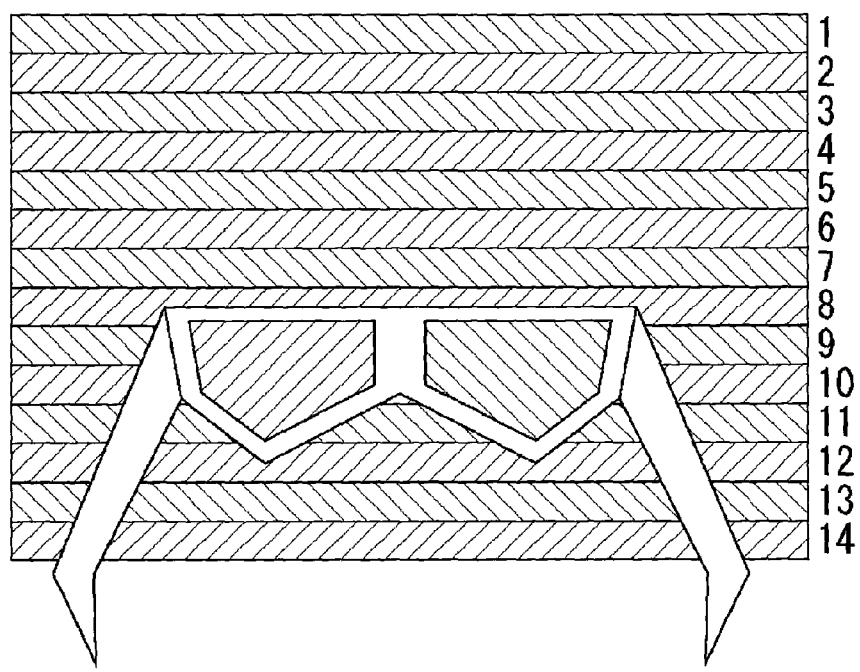
FIG. 45 shows how a stereoscopic image is displayed using polarizing glasses with a micro polarizer.

Moreover, the image separating means may be a stereoscopic display apparatus for which polarizing glasses with a micro polarizer is employed, as shown in FIG. 45. The micro polarizer is a half wavelength type with a fine processing in a stripe pattern, and when it is arranged in the front of a polarizing plate at the outgoing side of a liquid crystal panel, the angle of polarized light can be changed by 90 degrees for every other line. If the polarizing glasses, the polarized angle of which is different by 90 degrees between the right and the left, are worn, the right and the left images are separated and a stereoscopic image can be viewed. In this example, since the micro polarizer is formed in a horizontal direction, the parallax images are displayed by a row unit and the image is shifted in a up-and-down direction.

The shift in the up-and-down direction is necessary for a multi-viewpoint type of a stereoscopic image with some parallax in a vertical direction.

Embodiment 7

Figure 46A:
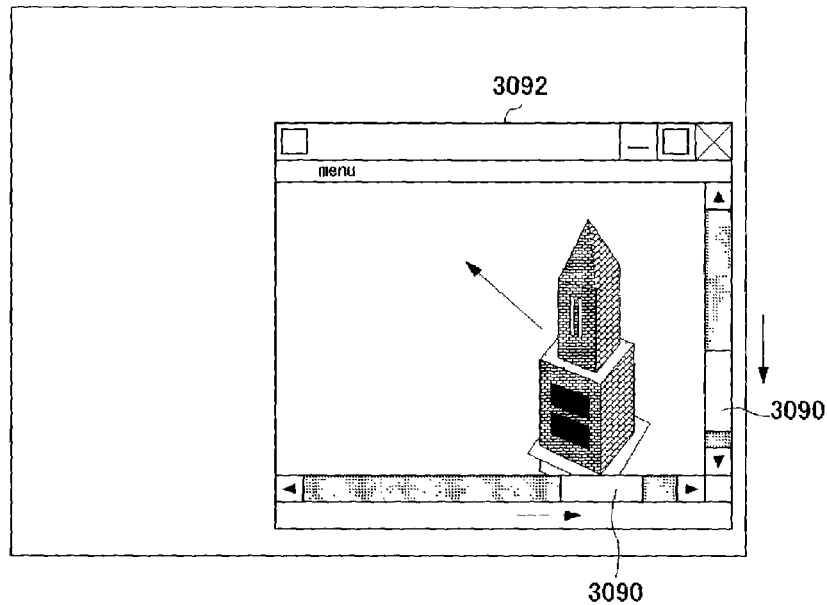
FIGS. 46a and 46b illustrates how a region to be displayed is shifted by a scroll bar.
Figure 46B:
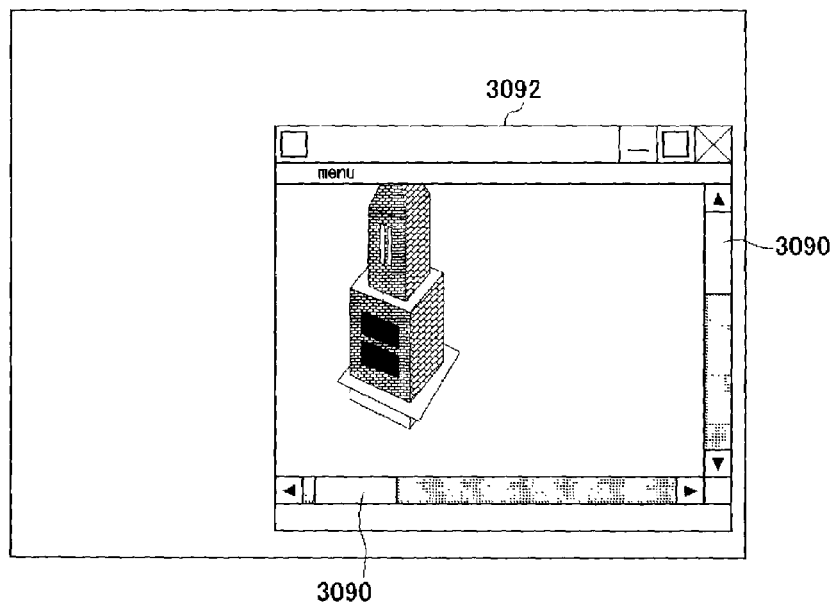

An image displayed in a viewer 3092 is normally shifted by a scroll bar 3090 as shown in FIGS. 46a and 46b, and its display state changes from FIG. 46a to FIG. 46b and thus the region to be displayed moves.

Figure 47:
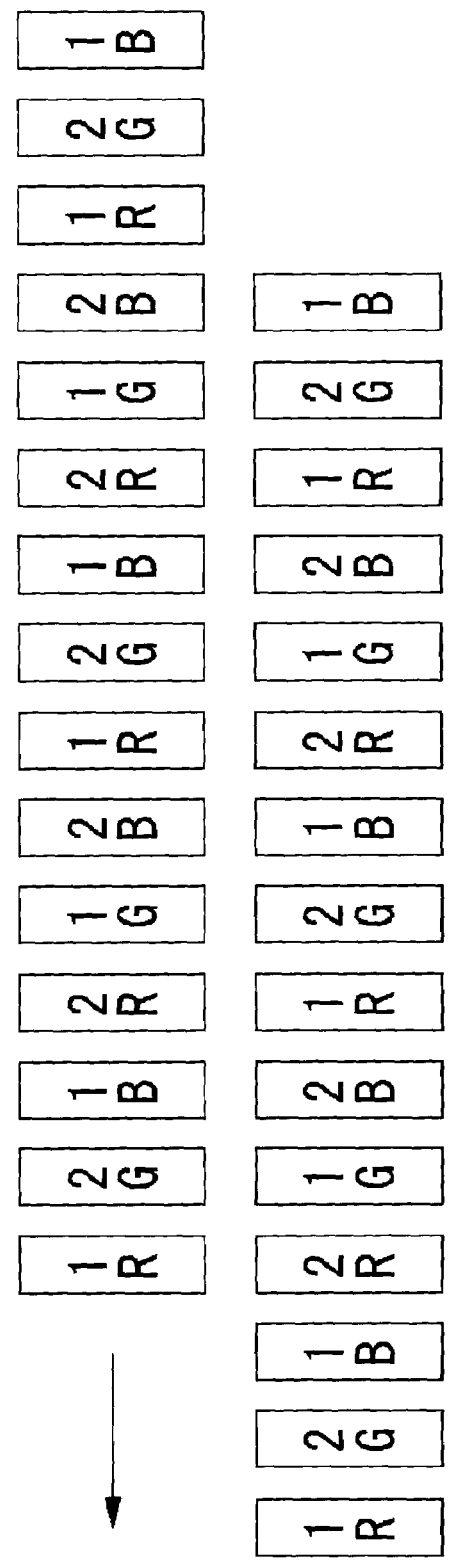
FIG. 47 illustrates how an image with two viewpoints is shifted by three dots.

In the case of a stereoscopic image, if the shift amount is an integer multiplication of the number of dots that composes one pixel, a pair of the image to be viewed can change although an observer does not change his/her head position. FIG. 47 shows the shift amount in the case of two viewpoints. The numeral in the figure indicates the viewpoint number or the parallax image number. For instance, the dot 1R indicates that an R element of the first parallax image is used. The dots composing a pixel are three dots of RGB and the image is herein shifted by this three dots. After shifting, the viewpoint number changes from 1 to 2, and if the observer does not move, reversion between uncrossed view and crossed view occurs.

Figure 48:
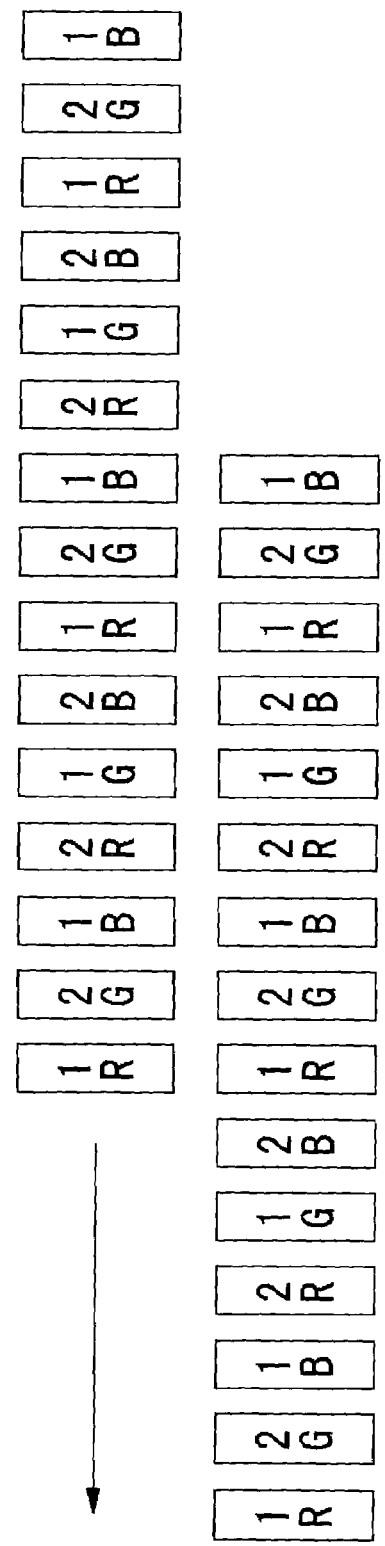
FIG. 48 illustrates how an image with two viewpoints is shifted by six dots.

The method to overcome this problem is stated below. The shift amount is set to an integer multiplication of the number of viewpoints of the image multiplied by the number of dots which composes a pixel. Herein the number of viewpoints is 2 and the number of dots which composes a pixel is 3. Therefore the shift amount is set to an integer multiplication of 6. FIG. 48 shows the state in which the image is shifted by 6 dots. The viewpoint numbers 1 and 2 are not exchanged before and after the shift. Therefore the shift does not have any bad effect on viewing the stereoscopic image. The same is the case when the number of the viewpoints increases. The method is also applicable to a stereoscopic image with some parallax in a vertical direction.

Figure 49:
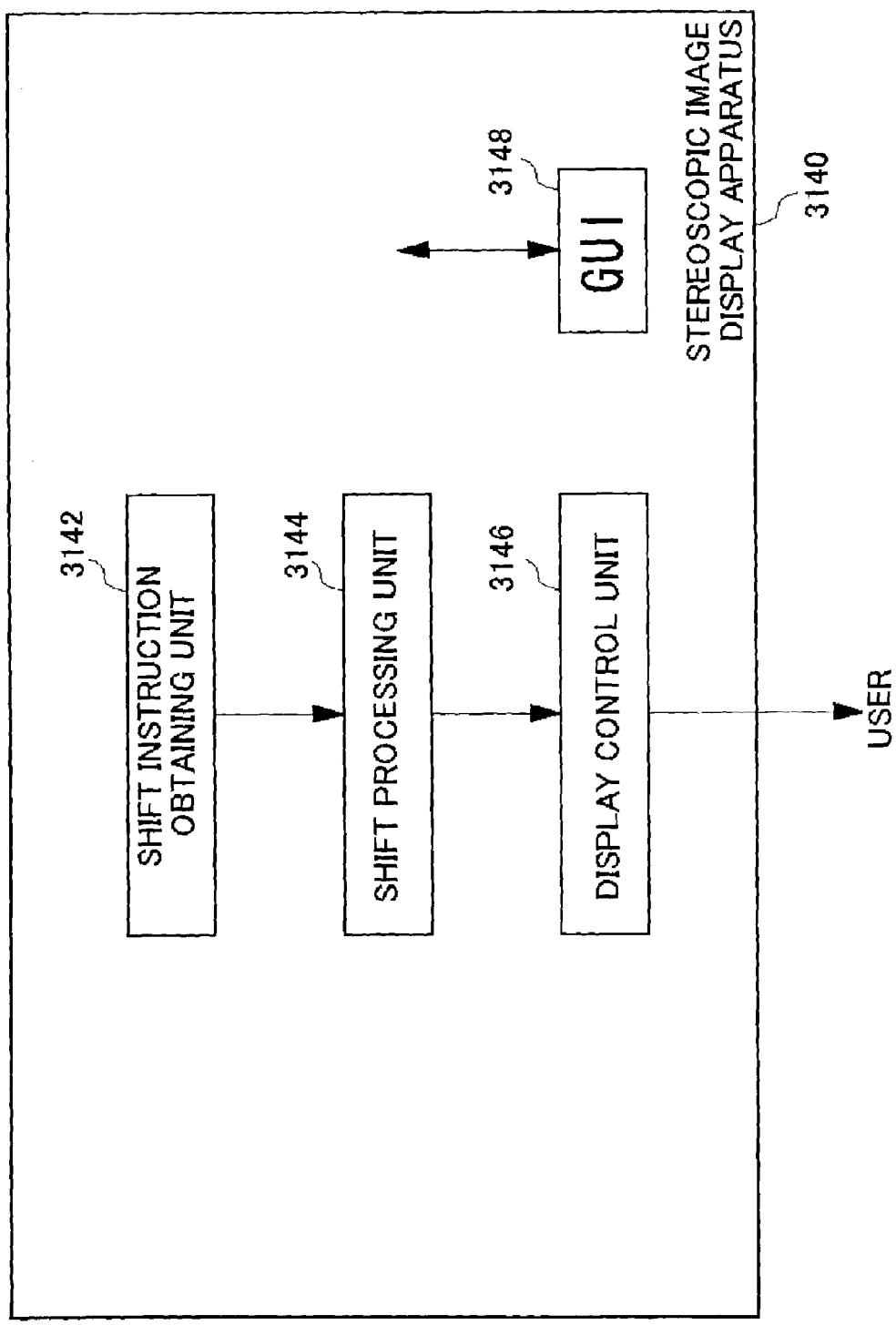
FIG. 49 shows a stereoscopic image display apparatus according to the seventh embodiment.

FIG. 49 shows a stereoscopic image display apparatus 3140 to realize the above-mentioned method. The stereoscopic image display apparatus 3140 includes a shift instruction obtaining unit 3142 which accepts an instruction from a user to shift a multiplex image, a shift processing unit 3144 which shifts the multiplex image according to the accepted instruction, a display control unit 3146 which displays the multiplex image, and a GUI 3148 which presents an object such as the scroll bar 3090 or the like to the user.

The shift instruction obtaining unit 3142 accepts an instruction for shifting through the scroll bar 3090 operated by the user. If the instruction indicates a horizontal shift, the shift processing unit 3144 shifts the multiplex image by a unit of the number of the parallax images multiplied by the number of the dots composing a pixel.

In Embodiments 4 to 7, many changes and substitutions may be made by those skilled in the art. Some such alterations are stated as follows.

In the above-mentioned embodiments, the case in which the parallax barrier covers a part of the LCD screen is illustrated, however, as a matter of course, the same processes can be conducted in the case in which the parallax barrier covers the whole LCD screen. In particular, in case that the parallax barrier covers the whole LCD screen, there are many situations other than a scroll in a window, in which crossed view should be avoided.

For instance, a user may change a way of displaying a window on a screen between two modes: a multi-window mode in which the window is displayed on a part of the screen with the other windows, and a full screen mode in which only the window is displayed on the whole screen. When the user enlarges or reduces an image, the image may be automatically arranged around the center of the screen. Moreover, since the parallax barrier covers the whole screen, the range of moving the window expands and the user is likely to move the position of the window into various positions and then stereoview the image. When the way of displaying is thus changed, it is necessary to redraw the image and the start position for drawing must be adjusted so that normal stereovision can be realized.

As described in Embodiment 4, there is a plurality of appropriate start positions for redrawing. Namely, the appropriate start positions are not only the stored position as an appropriate start position in the first drawing, but also the positions which are away from the stored position by a distance of an integer multiplication of the number of viewpoints multiplied by the number of dots composing a pixel.

In redrawing an image, the position adjusting unit 3112 of the stereoscopic image display apparatus 3102 according to Embodiment 4 may adjust the drawing position of the image by selecting one of the appropriate start positions. For instance, when the window display mode is changed to the full screen mode, an appropriate start position as close to the end of the screen as possible may be selected. When the user drags a window by a mouse and moves the window to a desired position, an appropriate start position closest to the position where the dragging is released may be selected.

It is to be noted that at the end of the screen there may be a region where the image is not displayed in the full screen mode, because the appropriate start position generally shifts from the end of the screen. In that sense, strictly speaking, it is not a full screen display. The region at the end of the screen, which has no dot information, may be set invisible or drawn in a background color, or may be interpolated using surrounding dots.

Figure 50A:
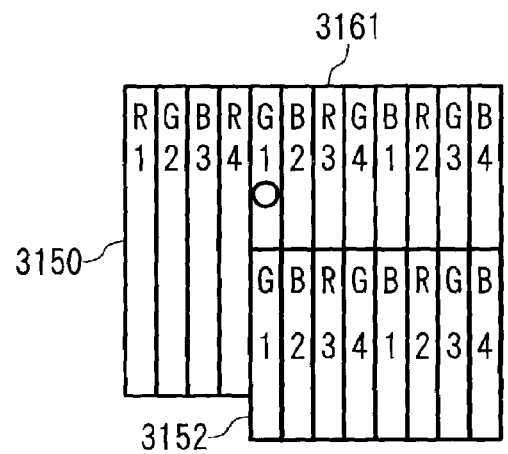
FIGS. 50a, 50b and 50c explain an appropriate start position of an image for an optical filter such as a parallax barrier.
Figure 50B:
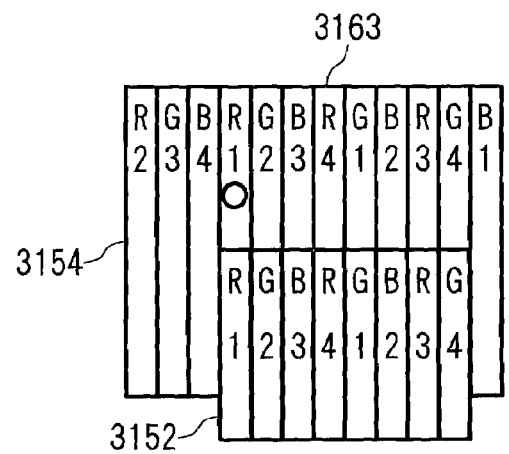
Figure 50C:
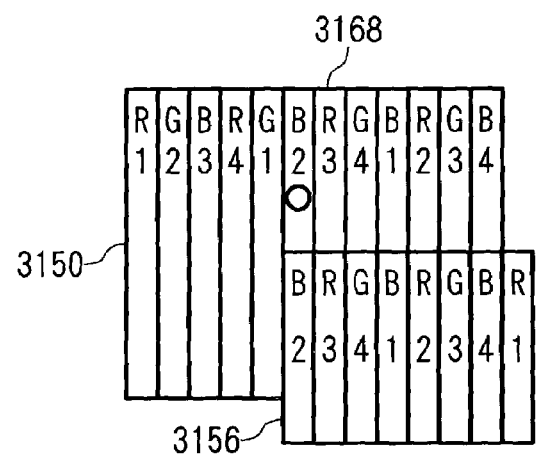

FIGS. 50a, 50b and 50c explain the appropriate start position of the image for an optical filter such as a parallax barrier. The relationship between the optical filter and the screen determines the parallax image number namely the viewpoint number to be displayed at each dot. FIG. 50a shows an image 3152 drawn at an appropriate position for the columns 3150 of the viewpoint numbers each of which is to be displayed at each dot. The viewpoint numbers of the parallax images synthesized into the image 3152 corresponds to the viewpoint numbers each of which is to be displayed at each dot, and the RGB color of each dot also corresponds to each other. The appropriate start position of drawing the image 3152 is a position 3161. The positions that are a 12 multiplication away from the position 3161 are also the appropriate positions. This number 12 is 4 or the number of the viewpoints multiplied by 3 or the number of dots which composes a pixel. In this example, the image 3152 is drawn from the position 3161 as a start position, and in case of a full screen mode, four dot columns at the left side from the start position have no dot information.

In FIG. 50b the positional relationship between the optical filter and the screen is different from that of FIG. 31a. The same image 3152 as in FIG. 50a is drawn at an appropriate position for the columns 3154 of the viewpoints each of which is to be displayed at each dot. In this case, the appropriate start position of drawing the image 3152 is a position 3163 and the positions that are a 12 multiplication away from the position 3163 are also the appropriate start positions. The image 3152 is drawn from the position 3163 as a start position, and in case of a full screen mode, three dot columns at the left side from the start position have no dot information.

In FIG. 50c, the positional relationship between the optical filter and the screen is the same as in FIG. 50a, but the arrangement of the viewpoints of the parallax images synthesized into an image 3156 is different from that of FIG. 50a. The image 3156 is drawn at the appropriate position for the columns 3150 of the viewpoints each of which is to be displayed at each dot. In this case, the appropriate start position of drawing the image 3156 is a position 3168 and the positions that are a 12 multiplication away from the position 3168 are also the appropriate start positions. The image 3156 is herein drawn from the position 3168 as a start position, and in case of a full screen mode, five dot columns at the left side from the start position have no dot information.

It is to be noted that in the above-mentioned examples, the appropriate start positions are defined for any one of R, G and B dots, however, since R, G and B dots are handled as a set in a normal image, the appropriate start positions usually exist only for R dot at intervals of 12 dots.

In redrawing, instead of the adjustment of the drawing start position, the synthesizing order of the parallax images which compose an image may be changed so that crossed view can be avoided. When a user moves a window or enlarges or reduces an image, and it is necessary to redraw an image, the same effect of avoiding cross view can be obtained by changing the synthesizing order of the parallax images instead of changing the image position.

Figure 51A:
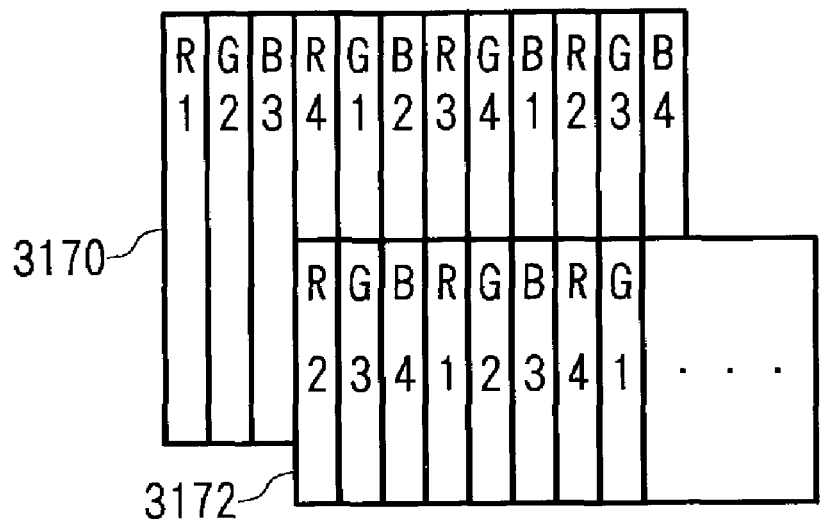
FIGS. 51a shows a relationship between a moved image and an optical filter.
Figure 51B:
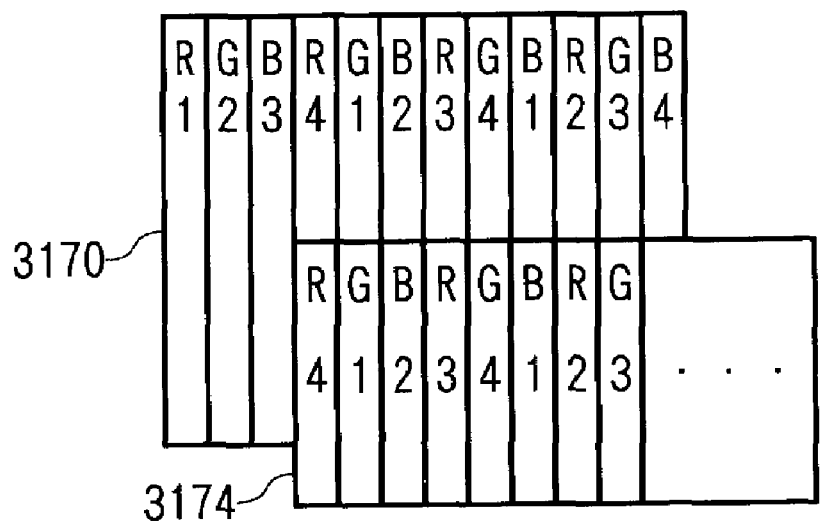
FIGS. 51b shows a relationship between a rearranged image and an optical filter.

In FIG. 51a, a freely moved image 3172 is displayed for the columns 3170 of viewpoint numbers each of which is to be displayed at each dot and which are determined on the basis of the relationship between the optical filter and the screen. In this situation, the viewpoint numbers of the parallax images synthesized into the image 3172 do not correspond to the viewpoint numbers each of which is to be displayed at each dot. Therefore the order of the parallax images synthesized into the image 3172 is changed. FIG. 51b shows an image 3174 in which the synthesizing order of the parallax images is changed. The viewpoint numbers of the parallax images synthesized into the image 3174 correspond to the viewpoint numbers each of which is to be displayed at each dot, and the RGB color of each dot also corresponds to each other. The methods described in Embodiment 6 can be utilized for the process of changing the synthesizing order of the parallax images and rearranging the dots.

Embodiment 8

Hereinafter a light ray regeneration type of a stereoscopic display apparatus is exemplified and a parallax barrier is exemplified as an optical filter.

Figure 52:
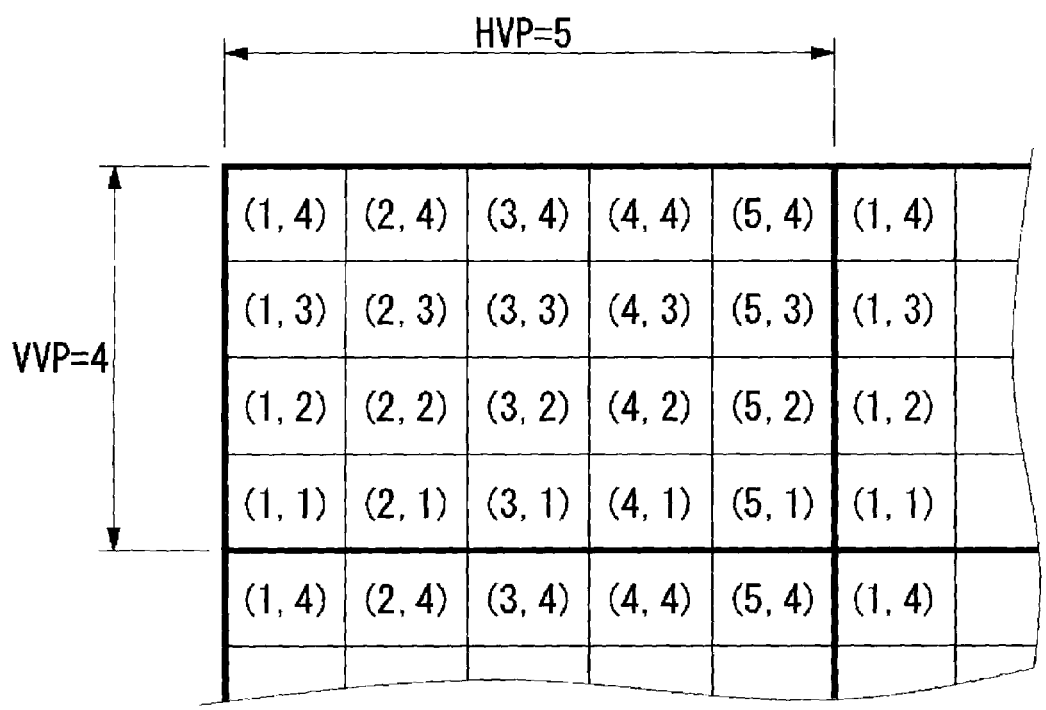
FIG. 52 shows an enlarged part of a multiplex image in a final image data format for stereoscopic display.

FIG. 52 shows an example of a multiplex image 4020 when the number of horizontal viewpoints HVP is "5" and the number of vertical viewpoints VVP is "4". Herein the region denoted by (i, j) indicates a dot to be viewed from the point defined by the i-th horizontal viewpoint and the j-th vertical viewpoint. As shown in the figure, the number i changes cyclically as 1, 2, 3, 4, 1, . . . in the horizontal direction and likewise the number j changes cyclically as 1, 2, 3, 4, 1, . . . in the vertical direction. When all the dots denoted by (i, j) are collected, one parallax image to be viewed from the point defined by the i-th horizontal viewpoint and the j-th vertical viewpoint (hereinafter also called the "ij-th parallax image") can be restored. Conversely, if 20 (=5×4) parallax images are divided by a dot unit and rearranged as in FIG. 52, a multiplex image is obtained. When the image shot at the point defined by the i-th horizontal viewpoint and the j-th vertical viewpoint is prepared as the ij-th parallax image, natural stereovision can be realized.

Figure 53:
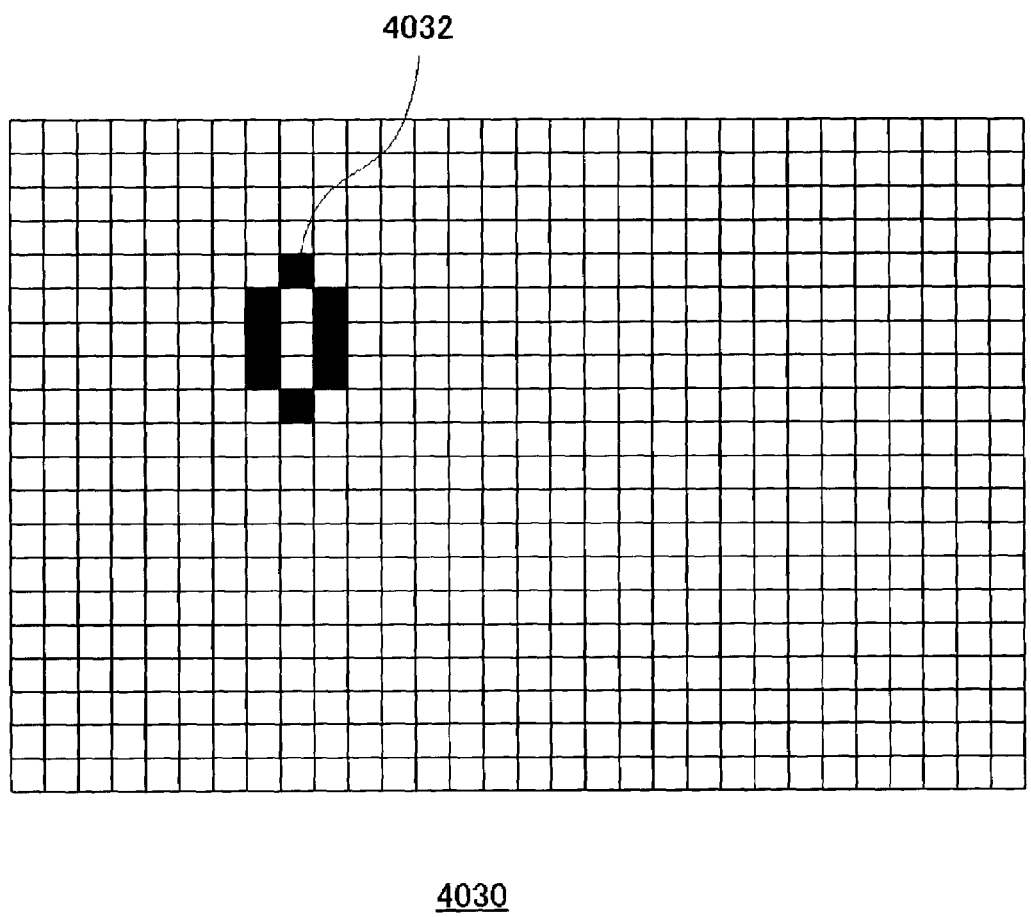
FIG. 53 shows a part of an original image before a process by the eighth embodiment.

FIG. 53 shows an original image 4030 before being processed by the present embodiment, which is displayed on a part of a screen of a display apparatus. Each of small squares of the figure corresponds to one dot and it is to be noted that its scale is different from that of FIG. 52. FIG. 53 is, for instance, an initial screen of a personal computer and a two-dimensional object 32, typically an icon, is schematically displayed. In order to emphasize that the size of the object 4032 is small, the width of the black dots at its border is herein made one dot.

Now a parallax barrier is stuck on this screen in consideration of the multiplex image of FIG. 52. In this case, if the original image 4030 is viewed from a viewpoint, only one dot at intervals of 5 dots in a horizontal direction and one dot at intervals of 4 dots in a vertical direction are visible. Namely, only one-twentieth of the image is visible. Therefore there is very little possibility that the object 4032 is visible from a user, and in general fine patterns and small characters cannot be seen, or even if they are seen, considerable amount of information may be lost and it cause a big problem in the aspect of readability.

Figure 54:
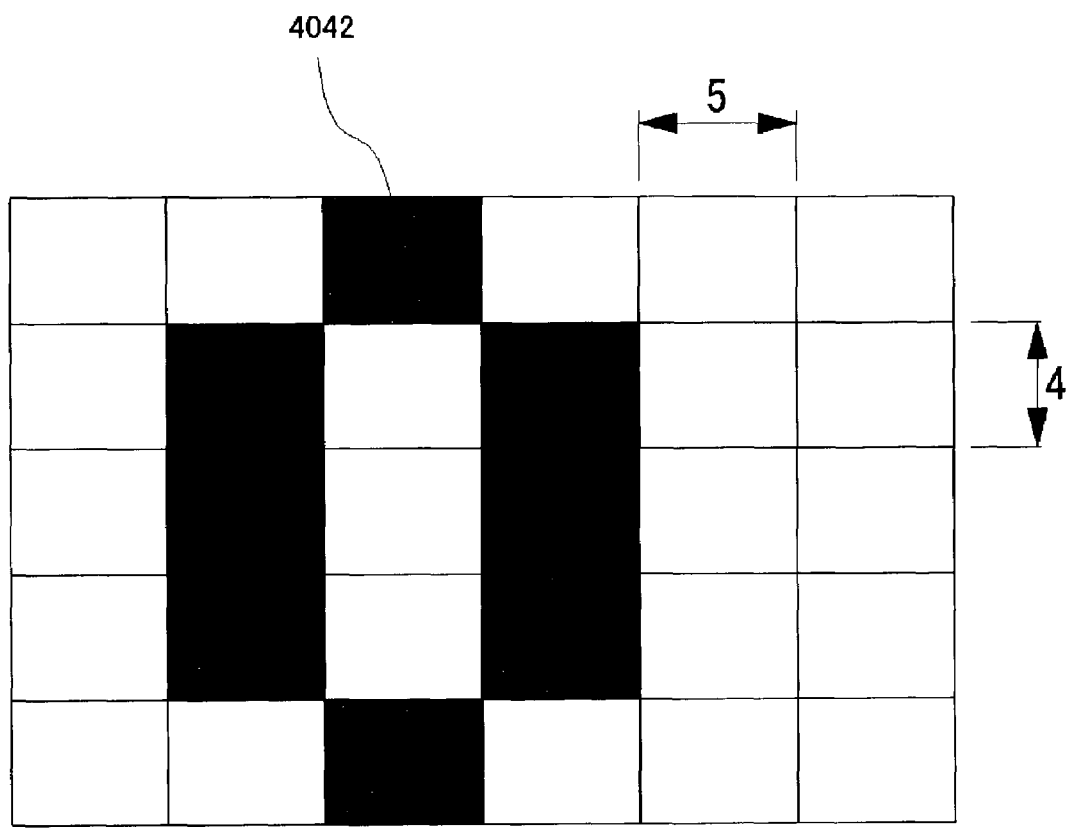
FIG. 54 shows a part of an improved image after an enlargement process by the eighth embodiment.

FIG. 54 shows an improved image 4040 in which the above-mentioned problem is solved by the present embodiment. The essence of the solution lies in the point of generating an improved object 4042 by enlarging the object 32. In general, if the object 4032 is enlarged and the improved object 4042 is displayed, the readability and visibility through the parallax barrier can increase.

In the present embodiment, the enlargement ratio of the object is determined on the basis of the design specification of the parallax barrier. To be concrete, since the parallax barrier is now designed on the assumption that the number of the horizontal viewpoints and the number of the vertical viewpoints are respectively 5 and 4, each of the dots of the object 52 is enlarged 5 times in the horizontal direction and 4 times in the vertical direction. A part of the dots of the improved object 4042 is thereby visible to a user from any one of the viewpoints. As a result, the embodiment can reduce bad effects by the parallax barrier or the optical filter that only causes an obstruction to visibility for two-dimensional display.

FIG. 55 shows a structure of an object display apparatus 4100 which conducts the above-mentioned processes. This structure can be realized by hardware, such as a CPU, a memory and other LSIs of arbitrary computers, or by software, such as a program or the like loaded in the memory, which has functions of detecting display modes and enlarging dots of an image. In the figure, however, functions only, which are realized by combination of such hardware and software, are shown in blocks. Thus, it should be understood by those skilled in the art that these functional blocks can be realized by various modes such as hardware only, software only or a combination thereof. The object display apparatus 4100 can be a body of a personal computer or the other information equipment.

This object display apparatus 4100 conducts a process of enlarging an object when a parallax barrier 4104 is stuck on a display unit 4102 such as LCD, PDP or the like which enables stereovision. A sensor 4106 is provided on the display unit 4102, which detects whether the parallax barrier 4104 is stuck or not. The sensor 4106 may be an optical sensor such as a CCD, an electromagnetic sensor that detects electromagnetically whether there are the parallax barrier 4104 or not, a mechanical sensor such as a switch that is pressed down when the parallax barrier 4104 is stuck, and so on, and its method and shape does not matter. In any cases the sensor 4106 can detect the condition of the parallax barrier 4104 being stuck.

The object display apparatus 4100 includes a mode judging unit 4110 which judges the current display mode using the detection result by the sensor 4106 or the mode setting by the user. There are a "stereoscopic display mode" and a "two-dimensional display mode", and when the sensor 4106 detects that the parallax barrier 4104 is stuck, the mode judging unit 4110 judges that the current mode is the "stereoscopic display mode". When the user specifies the mode explicitly, the mode judging unit 4110 can use the set mode as a judgment result.

An expanding unit 4112 is notified of the judgment result. The expanding unit 4112 enlarges each of the dots of the object 4032 on the basis of the above-mentioned principle, when the current mode is the stereoscopic display mode. Some relevant functions of an operating system, which is not shown in the figure, are utilized through API (Application Programming Interface) 4114. To be concrete, the functions for directly operating graphic data to be finally displayed on a screen can be utilized and its method is known for the operating system.

By a cooperative work of the expanding unit 4112 and the API 4114, a process of converting the graphic data is conducted on a display control unit 4116. The display control unit 4116 is for instance a VGA chip with its related functions. The processed data are sent to the display unit 4102 and the image is displayed.

In Embodiment 8, many changes and substitutions may be made by those skilled in the art. Some such alterations are stated as follows.

In the embodiment, when the number of horizontal viewpoints and the number of vertical viewpoints of parallax images are respectively m and n, each of the dots of a two-dimensional object is enlarged m times in the horizontal direction and n times in the vertical direction. In this respect, there are some alterations described below.

1. Each of the dots is enlarged more than m times in the horizontal direction and more than n times in the vertical direction. In principle, the object can be seen from each of the viewpoints by this method. In particular, when the enlargement ratio is set to be an integer multiplication of m or n, such as km (k>1), a plurality of the dots can be properly seen from any one of the viewpoints.

2. Each of the dots is enlarged less than m times in the horizontal direction and less than n times in the vertical direction. For instance, if the values of m and n are large, the enlargement ratio of the object can be too large. Therefore this method is helpful in some cases. In the case of m=10 for instance, if each of the dots is enlarged 5 times in the horizontal direction, each of the dots can be seen once for at least every other viewpoints. The visibility can be improved considerably even in this case.

In the embodiment, the color of the dot is not considered. When a pixel is composed of three dots of R, G and B, the enlargement ratio in the horizontal and vertical directions can be set to be a multiple of 3. In this case, since the enlargement is conducted by a pixel unit, such a problem as a mixture of colors can be solved. It is noted that it depends on applications whether such a setting is really necessary or not.

The functions of the object display apparatus 4100, especially the mode judging unit 4110 and the expanding unit 4112 may be distributed from a prescribed Web site as a plug-in program for a browser for instance. If the site provides a service of distributing stereoscopic images charged or free of charge, it is useful in the aspect of the consistency of the service.

What is claimed is:

1. A stereoscopic image display method comprising:
    displaying an image to be stereoviewed on a screen of a display apparatus; and
    shifting the image on the screen, and wherein,
    a shift amount of the image is restricted to an integer multiplication of the number of different parallax images which compose the image multiplied by the number of dots which composes a pixel.

2. The method of claim 1, wherein in case that the image is displayed in a window, the shift unit is referred to at least on an occasion of scrolling the image in the window.

3. A stereoscopic image display apparatus comprising:
    a shift instruction obtaining unit which obtains an instruction to shift an image to be stereoviewed on a screen; and
    a shift processing unit which shifts the image according to the instruction, and wherein,
    the shift processing unit shifts the image in such a manner that a shift amount of the image is restricted to an integer multiplication of the number of different parallax images which compose the image multiplied by the number of dots which composes a pixel.

4. The apparatus of claim 3, further comprising a window display unit which displays a window for displaying the image on the screen, and wherein the shift processing unit puts a restriction by the shift unit on scrolling the image in the window.

* * * * *